United States Patent
Takahashi et al.

(10) Patent No.: US 6,731,632 B1
(45) Date of Patent: May 4, 2004

(54) INTERNETWORKING SYSTEM AND METHOD

(75) Inventors: Soichi Takahashi, Kanazawa (JP); Hirokazu Hatanaka, Kawasaki (JP); Takuya Okamoto, Kanazawa (JP); Hiroyuki Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/551,622

(22) Filed: Apr. 17, 2000

(30) Foreign Application Priority Data

Jul. 16, 1999 (JP) .......................... 11-202579
Dec. 15, 1999 (JP) .......................... 11-355513

(51) Int. Cl.[7] ............................. H04L 12/28; H04J 3/16
(52) U.S. Cl. .................... 370/392; 370/401; 370/466
(58) Field of Search ................. 370/254, 400, 370/401, 389, 386, 392, 466, 469, 352–356; 709/249, 227, 230, 311

(56) References Cited

U.S. PATENT DOCUMENTS

| | | | |
|---|---|---|---|
| 5,742,762 A | | 4/1998 | Scholl et al. |
| 6,335,919 B1 | * | 1/2002 | Maegawa ............... 370/254 |
| 6,584,102 B1 | * | 6/2003 | Lu .......................... 370/389 |

FOREIGN PATENT DOCUMENTS

| | | |
|---|---|---|
| JP | 10327152 | 8/1998 |
| WO | WO 96/35988 | 11/1996 |
| WO | WO 97/44957 | 11/1997 |
| WO | WO 98/47309 | 10/1998 |
| WO | WO 99/19988 | 4/1999 |
| WO | WO 99/33226 | 7/1999 |

* cited by examiner

*Primary Examiner*—Duc Ho
(74) *Attorney, Agent, or Firm*—Katten Muchin Zavis Rosenman

(57) ABSTRACT

An internetworking system and method enabling efficient communication between networks that use different protocols. A network management station comprises a first connection setting unit, a downstream frame generator, and a frame communication unit. The first connection setting unit establishes a first connection over a network A to reach a gateway network element. The downstream frame generator produces a downstream frame containing identifiers of remote network elements. The frame communication unit sends out the downstream frame through the established first connection, and/or processes an upstream frame received through the same. The gateway network element serves as a mediation device, comprising a second connection setting unit and a frame mediation unit. The second connection setting unit establishes a second connection reaching the network elements, over networks B and C whose protocols are different from that of the network A. The frame mediation unit mediates the transport of downstream frames toward the network elements through the second connection. It also mediates the transmission of upstream frames toward the network management station.

13 Claims, 51 Drawing Sheets

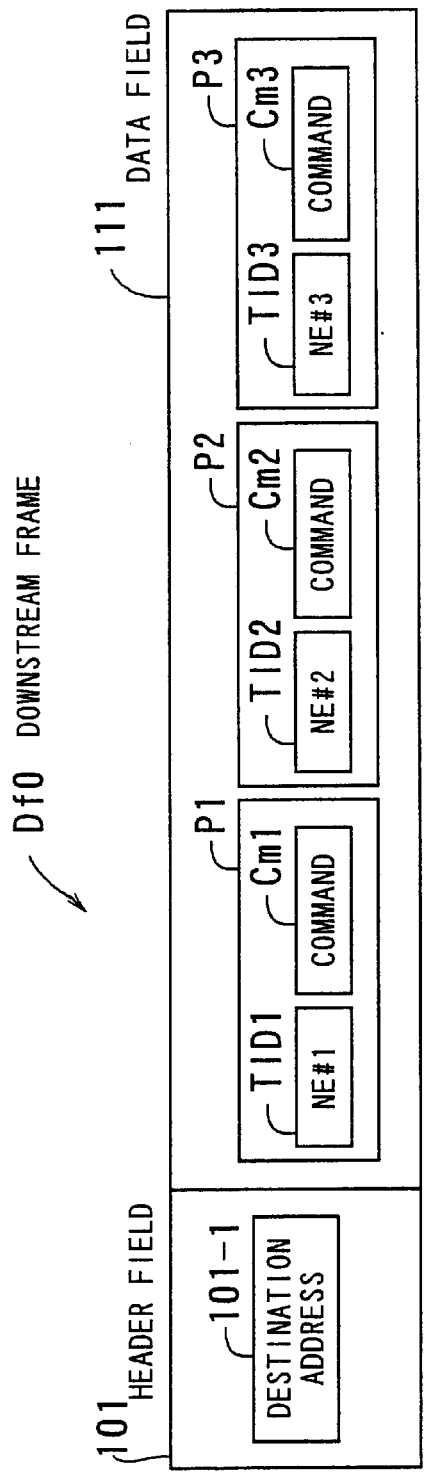
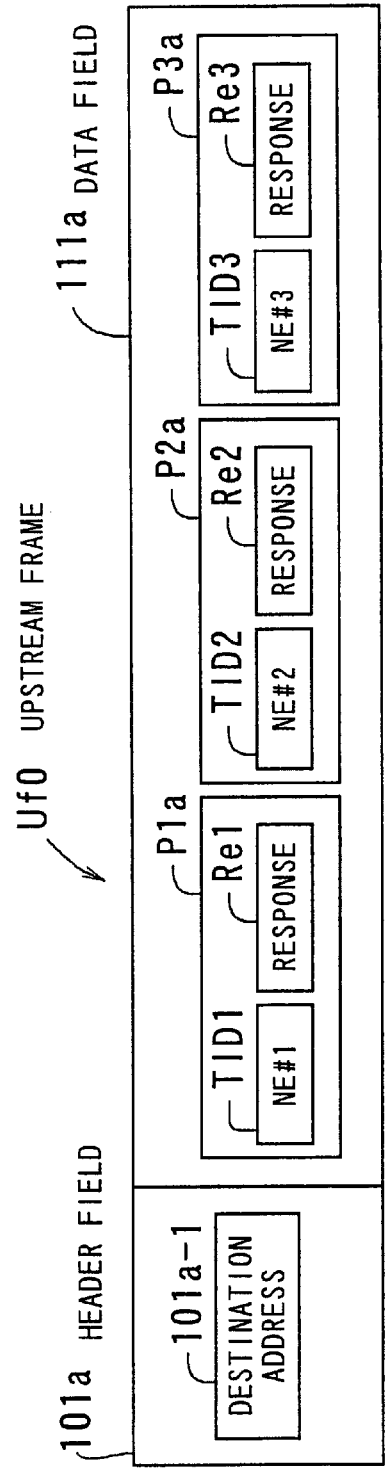
FIG. 2(A)
FIG. 2(B)

23 CONNECTION DATABASE

| TABLE No. | TCP/IP NETWORK | OSI NETWORK | TID |
|---|---|---|---|
| TABLE #1 | PORT#01 | SEQ#01 | NE#1 |
| TABLE #2 | PORT#01 | SEQ#02 | NE#2 |
| TABLE #3 | PORT#01 | SEQ#03 | NE#3 |

FIG. 13

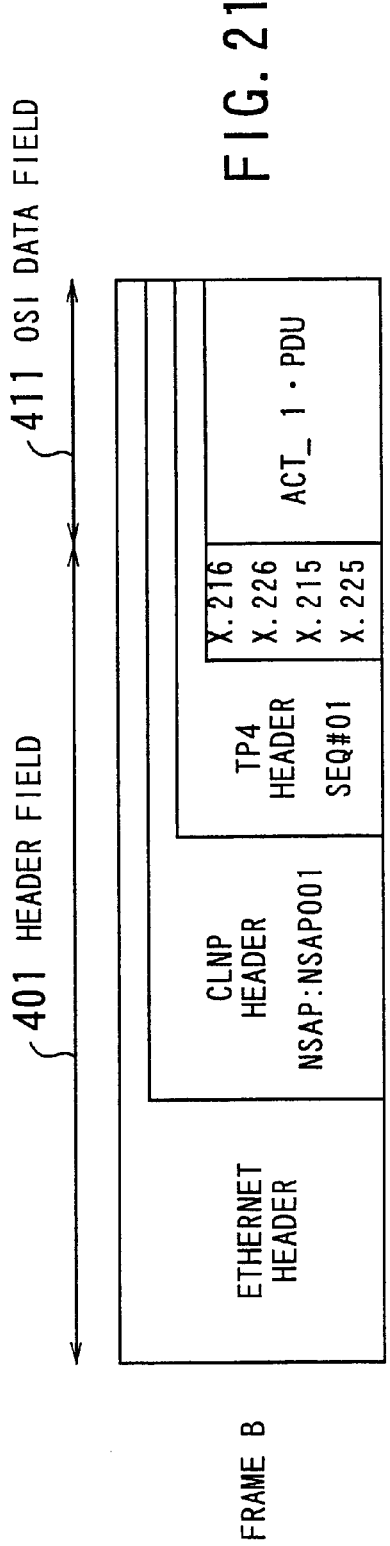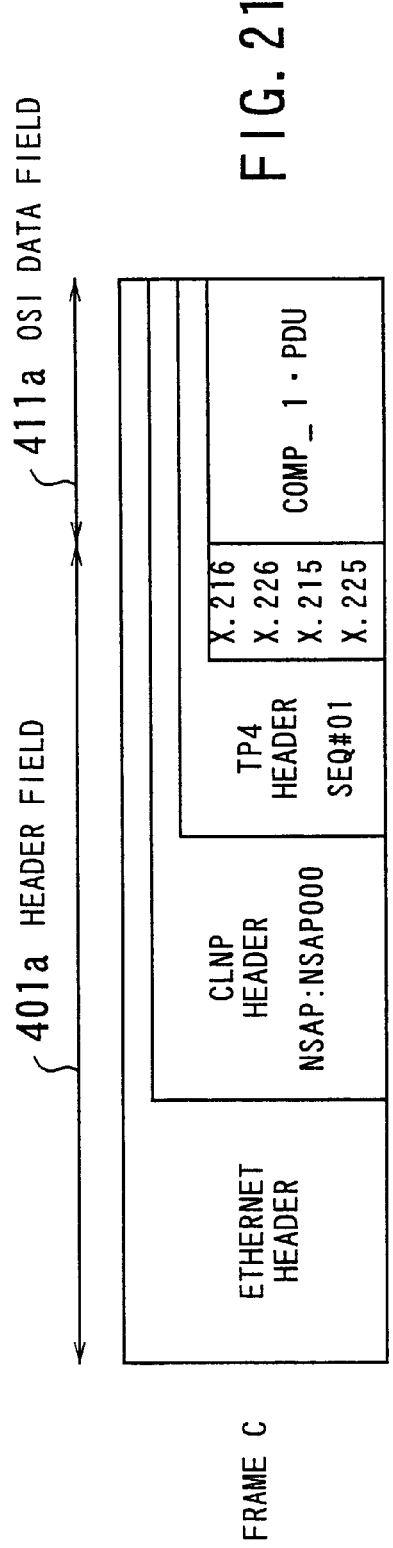

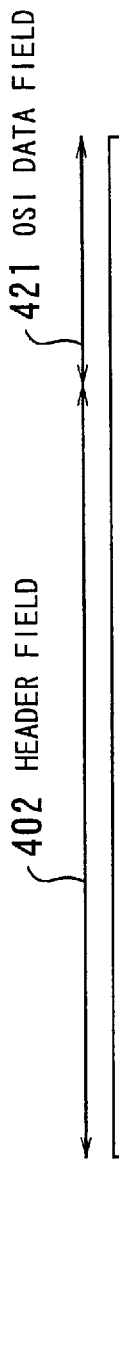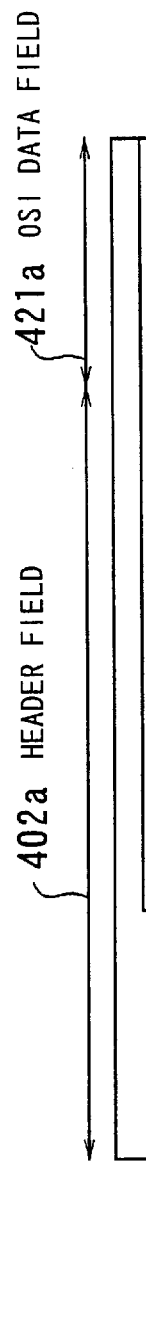
FIG. 22 (A)
FIG. 22 (B)

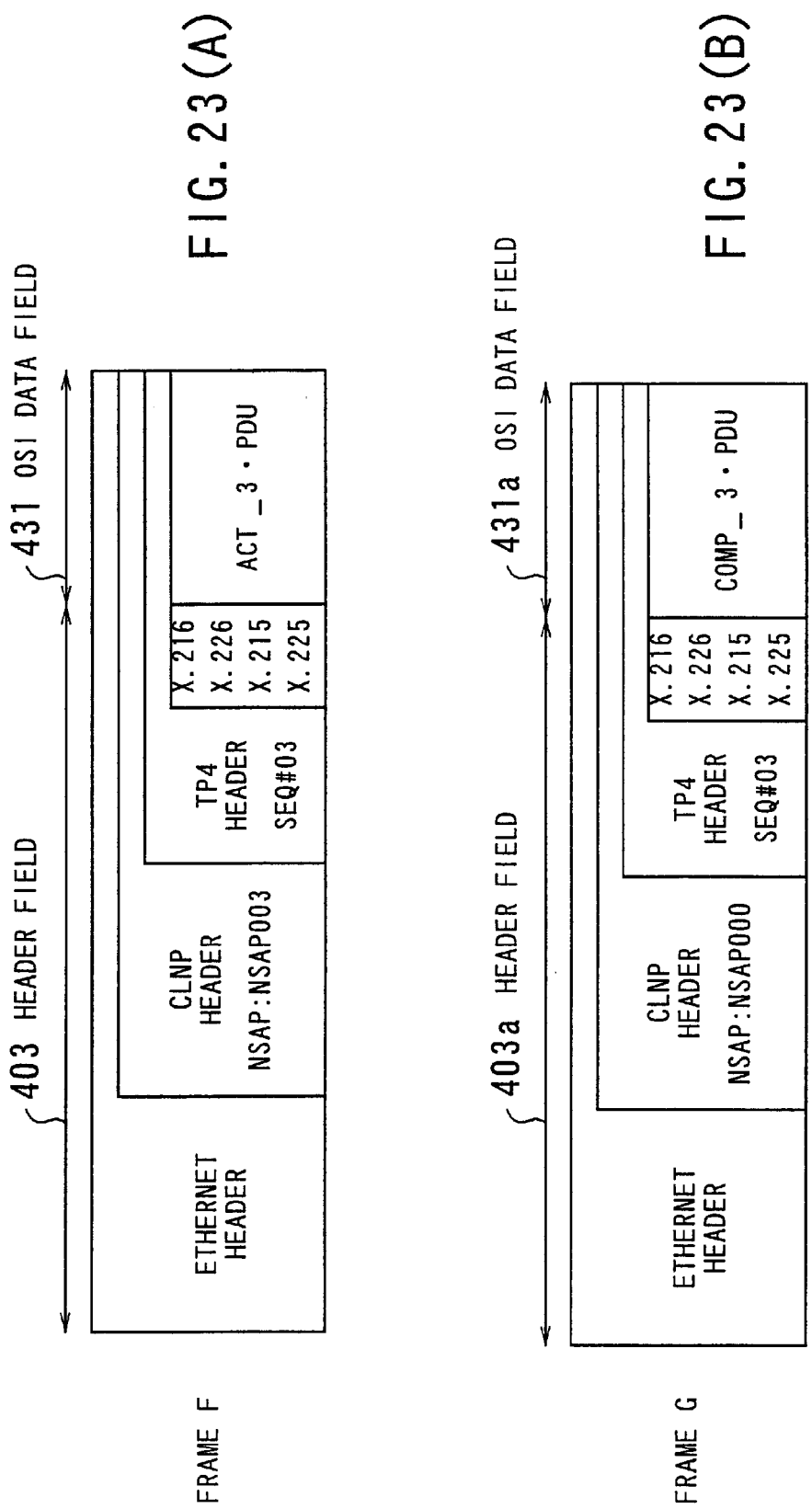

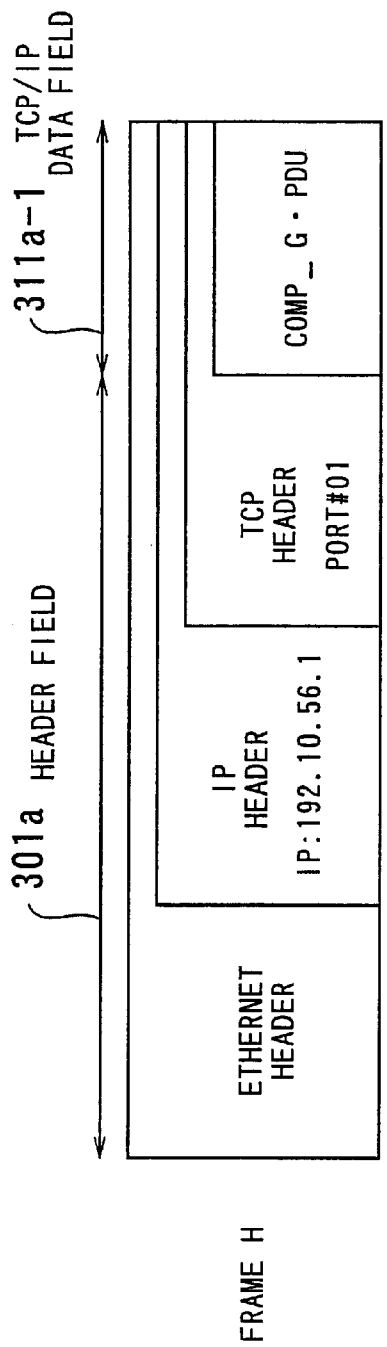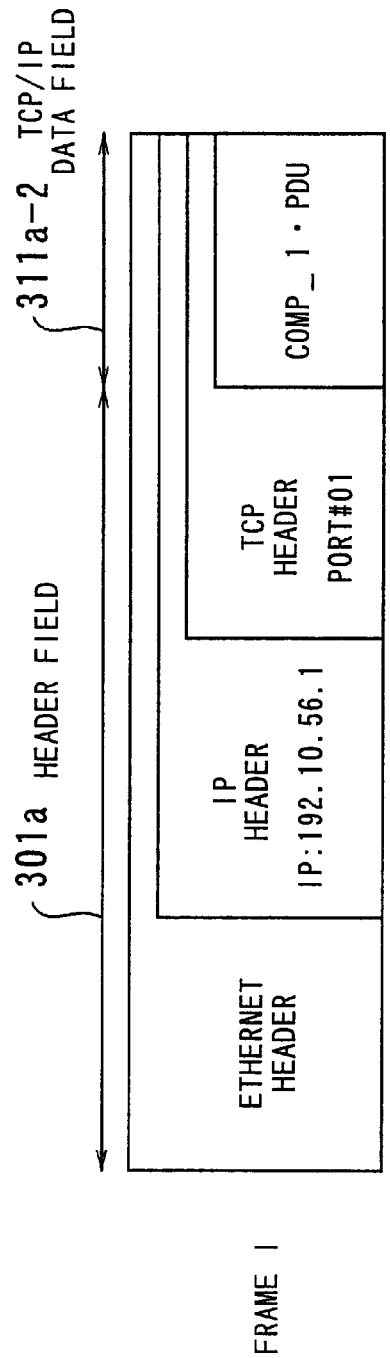
FIG. 24(A)
FIG. 24(B)

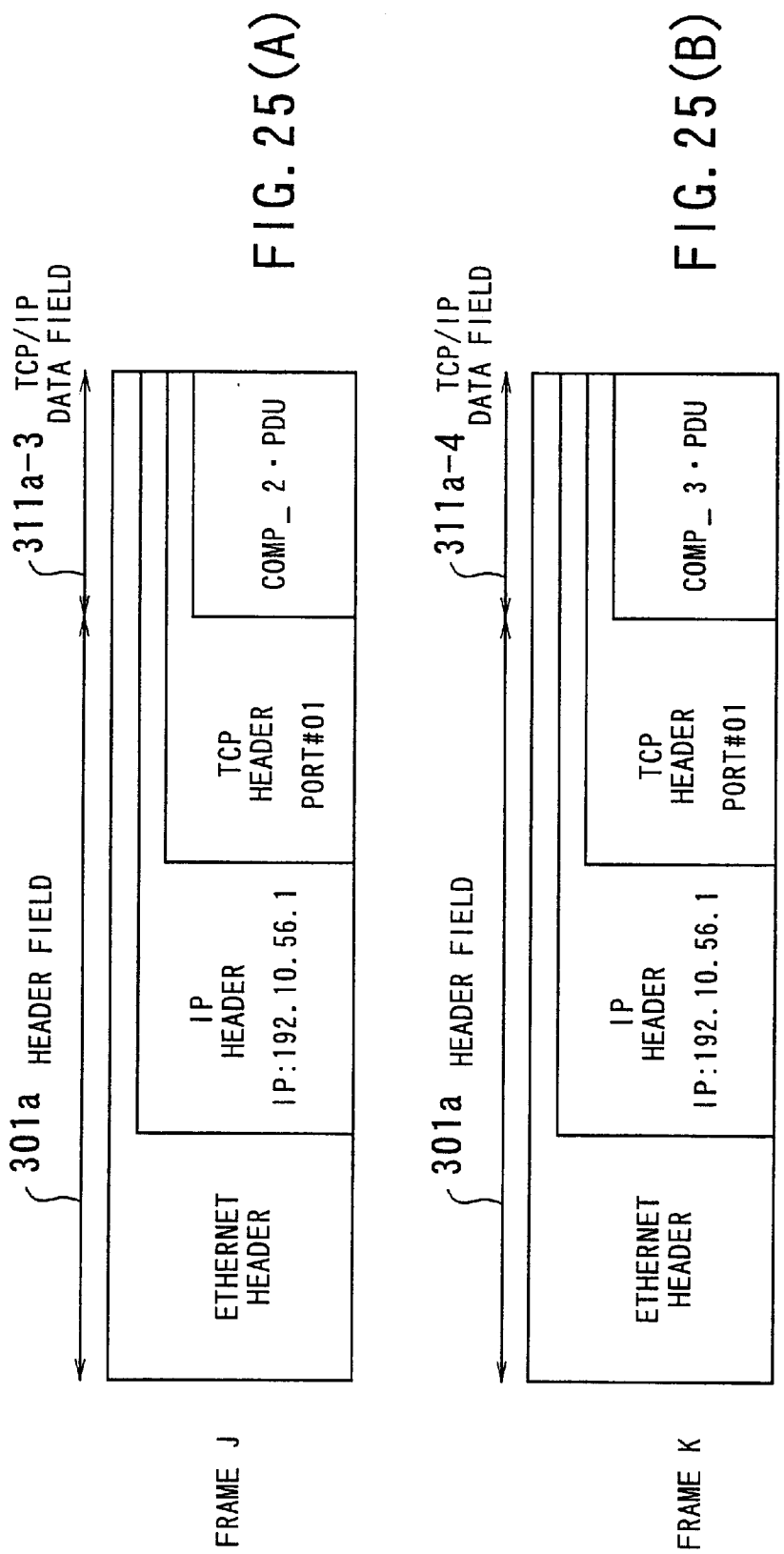

FRAME A

FRAME B

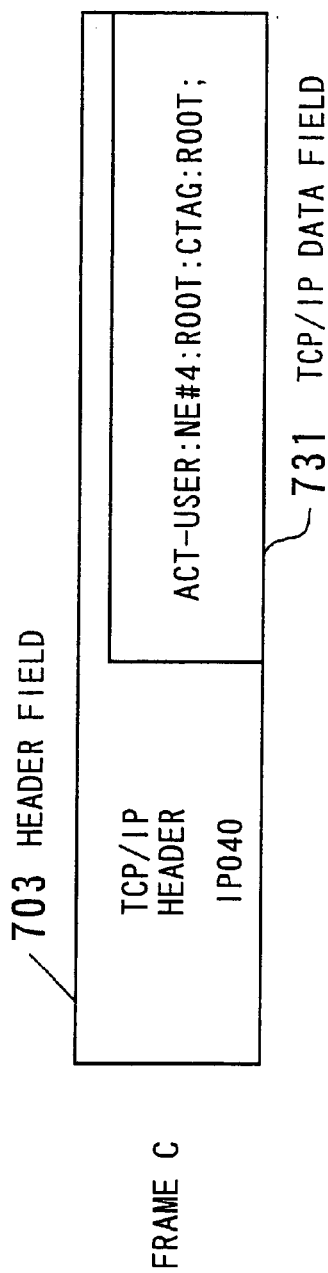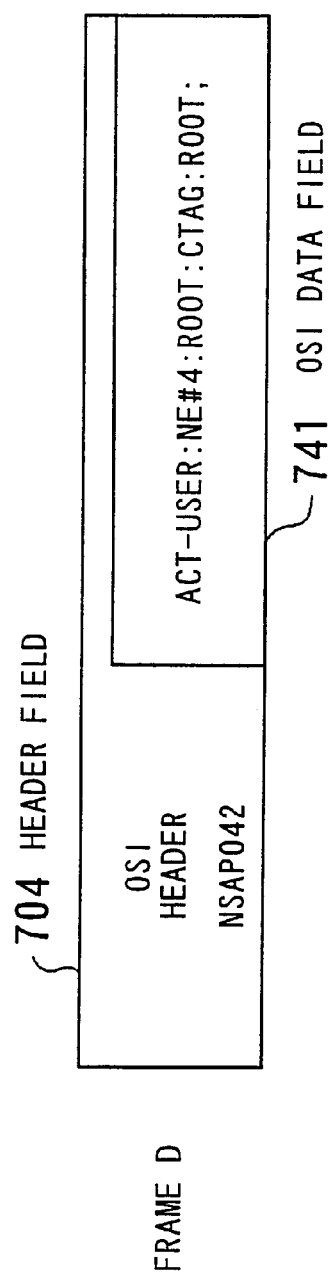
FIG. 31(A) FRAME C
FIG. 31(B) FRAME D

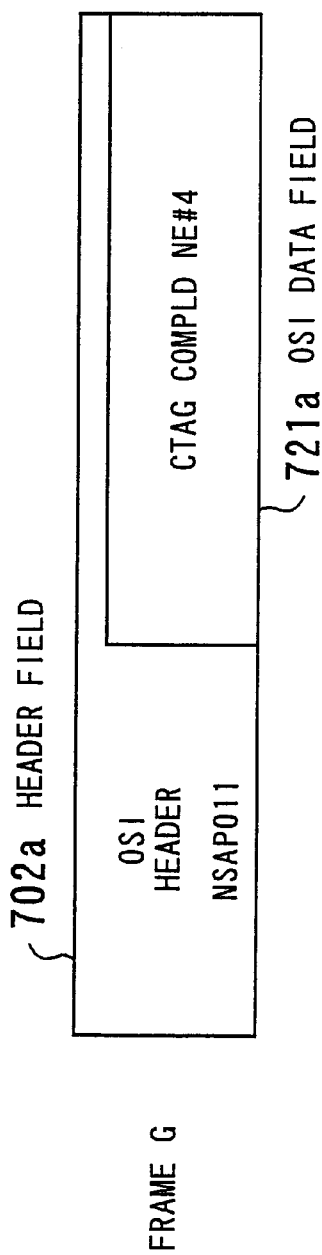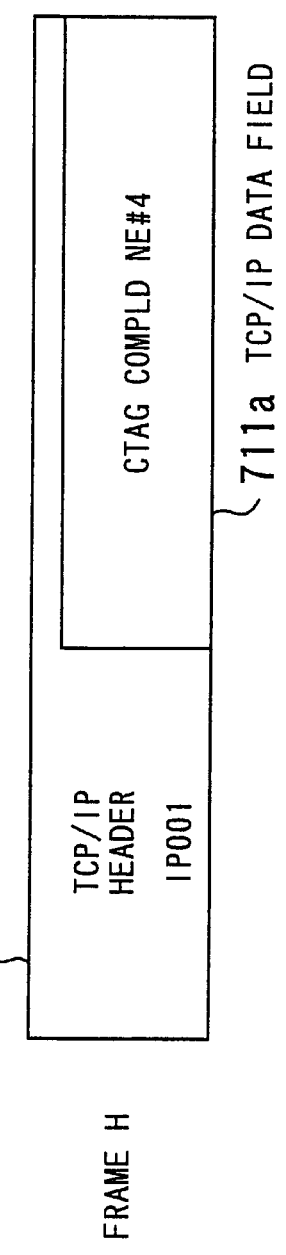
FIG. 33 (A)
FIG. 33 (B)

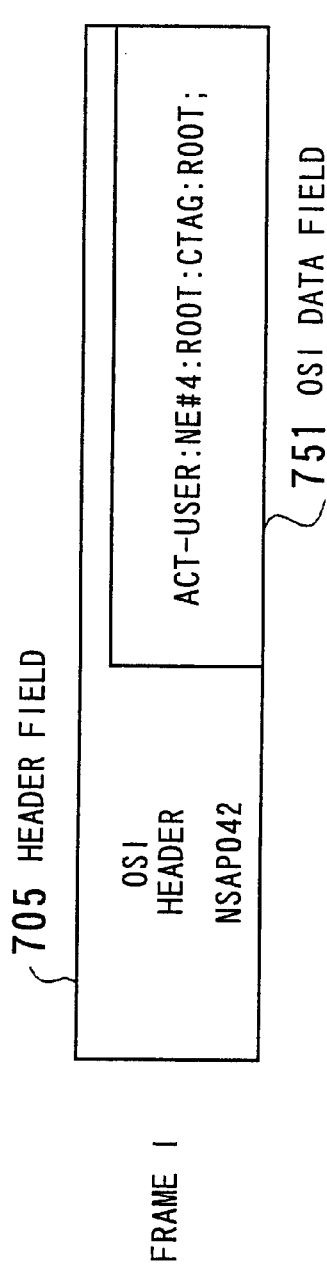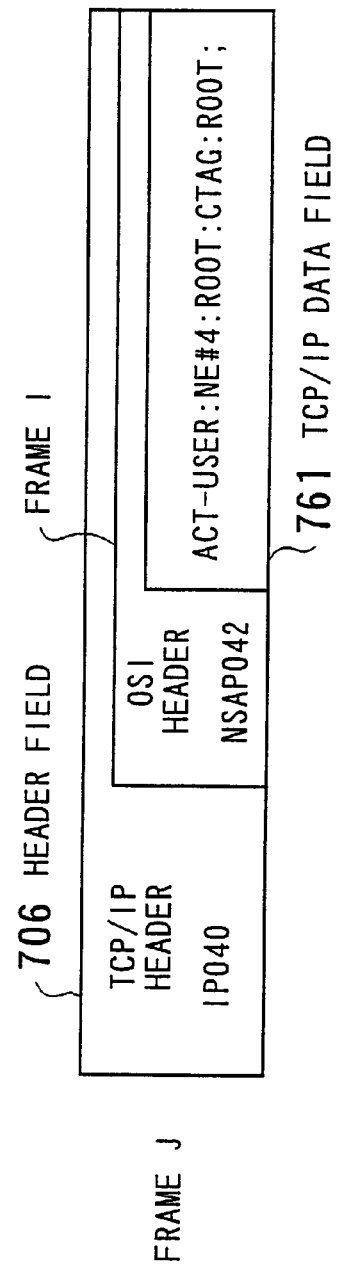

INTERNETWORKING SYSTEM AND METHOD

BACKGROUND OF THE INVENTION

1. Field of the Invention

The present invention relates to an internetworking system and method, and more particularly to an internetworking system and method for interconnecting a plurality of networks that use different protocols.

2. Description of the Related Art

Today's network systems have increased in size and complexity to serve the diverse user needs for telecommunications services. The proliferation of multi-protocol routers, gateways, and other like devices has become a driving force for interworking between local networks, as opposed to isolated networks in the past. This also promotes the rapid development of heterogeneous network environments where dissimilar protocols are used together. In order to monitor and control such a sophisticated environment, many of conventional network management systems deploy a dedicated network management station (NMS) for each individual network. In recent years, however, there is an increasing demand for more efficient network management systems which can supervise network elements (NEs) deployed over different networks in. a centralized manner.

The Japanese Unexamined Patent Application Publication No. 10-327152 (1998) is one example of conventional network management techniques. According to this publication, a network management system employs all kinds of necessary protocol stacks, thereby supervising the entire network environment using different protocols.

FIG. 50 shows a conventional network management system. In this system, an NMS 500 is coupled to a network A, and NEs 301 and 302 are located on another network B, where the two networks A and B use different communication protocols. A gateway network element (GNE) 600 is interposed between the networks A and B to provide network mediation services to control internetworking processes between them.

To illustrate how the network B is managed, it is assumed here that the NMS 500 now intends to access the remote NE 301. Having a lower-layer protocol stack of the network B being monitored, the NMS 500 produces a header that complies with the protocol specifications used in the network B. Since the network A, on the other hand, has its own frame format, the NMS 500 inserts the above header to the data field of a frame for the network A to which the NMS 500 belongs to. In this way, the NMS 500 creates a hybrid frame containing information about both protocols. After setting up a connection C10 to reach the NE 301 via the GNE 600, the NMS 500 sends out the hybrid frame.

The above-described technique enables the NMS 500 to have an end-to-end access to the NE 301 located on the network B, whose protocol is different from the network A's. The NMS 500 can communicate with the other remote NE 302 in a similar way. That is, the NMS 500 asks the GNE 600 to establish a connection C20 extending to the NE 302, creates a like hybrid frame, and sends it toward the NE 302.

Such conventional internetworking techniques, however, have the following disadvantages. First, it requires the NMS 500 to set up a dedicated connection to every destination NE, which produces a number of connections at a time. This naturally causes increased traffic and consequent slow access to a plurality of NEs.

Second, in the conventional internetworking system, the NMS 500 has to create a hybrid frame containing information about both protocols used in the networks A and B, when transporting data in this heterogeneous environment. Such a construct of hybrid frames may result in a large amount of data to be transmitted over the networks, thus causing a substantial increase in the network traffic.

Third, the conventional internetworking system is quite limited in its service coverage area. Actually, the NMS 500 only covers its local network A and its neighboring network B, which is immediately adjacent to the network A. FIG. 51 shows another conventional system which consists of three networks A, B, and D whose protocols are different from one another. The network D is linked with the network B via a GNE 601, and an NE 303 is located on this network D. In such a conventional system, the NMS 500 is unable to monitor the network D, because it is not directly linked with the network A, where the NMS 500 resides. The problem is that the NMS 500 cannot resolve the address of the NE 303 on the network D, since the network D and its neighboring network B do not share their address resolution protocols. For this reason, the NMS 500 cannot communicate with the NE 303.

SUMMARY OF THE INVENTION

Taking the above into consideration, an object of the present invention is to provide an internetworking system which efficiently interconnects heterogeneous networks by mediating between different protocols.

Another object of the present invention is to provide an internetworking method which efficiently interconnects heterogeneous networks by mediating between different protocols.

To accomplish the first object note above, according to the present invention, there is provided an internetworking system for interconnecting a plurality of networks that use different protocols. This internetworking system comprises a network management station and a mediation device. The network management station comprises the following elements:

a first connection setting unit which establishes a first connection over a first network in a point-to-point fashion;

a downstream frame generator which produces a downstream frame containing an identifier of a network element that the network management station intends to interact with, wherein the network element being on a second network whose communication protocol is different from that of the first network; and a frame communication unit which sends out the downstream frame through the first connection, and/or processes an upstream frame received through the first connection.

The mediation device, on the other hand, comprises the following elements:

a second connection setting unit which establishes a second connection in a point-to-point or point-to-multipoint fashion over the second network to reach the network element; and a frame mediation unit which receives the downstream frame through the first connection and forwards the received downstream frame to the network element through the second connection, or receives an upstream frame from the network element through the second connection and forwards the received upstream frame to the network management station through the first connection.

Further, to accomplish the second object note above, the present invention provides an internetworking method for interconnecting heterogeneous network environments that use different protocols. This internetworking method comprises the following steps:

(a) establishing a first connection over a first network in a point-to-point fashion;

(b) producing a downstream frame containing an identifier of a network element that is to be reached, the network element being on a second network whose communication protocol is different from that of the first network;

(c) sending out the downstream frame through the first connection, or processing an upstream frame received through the first connection;

(d) establishing a second connection in a point-to-point or point-to-multipoint fashion over the second network to reach the network element; and (e) receiving the downstream frame through the first connection and forwarding the received downstream frame to the network element through the second connection, or receiving an upstream frame from the network element through the second connection and forwarding the received upstream frame through the first connection.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 2(A) is a diagram which shows the structure of downstream frames flowing over a connection between NMS and GNE;

FIG. 2(B) is a diagram which shows the structure of upstream frames flowing over a connection between NMS and GNE;

FIG. 13 is a diagram which shows a connection database;

FIG. 21(A) is a diagram which shows the structure of a frame B;

FIG. 21(B) is a diagram which shows the structure of a frame C;

FIG. 22(A) is a diagram which shows the structure of a frame D;

FIG. 22(B) is a diagram which shows the structure of a frame E;

FIG. 23(A) is a diagram which shows the structure of a frame F;

FIG. 23(B) is a diagram which shows the structure of a frame G;

FIG. 24(A) is a diagram which shows the structure of a frame H;

FIG. 24(B) is a diagram which shows the structure of a frame I;

FIG. 25(A) is a diagram which shows the structure of a frame J;

FIG. 25(B) is a diagram which shows the structure of a frame K;.

FIG. 31(A) is a diagram which shows the structure of a frame C;

FIG. 31(B) is a diagram which shows the structure of a frame D;

FIG. 33(A) is a diagram which shows the structure of a frame G;

FIG. 33(B) is a diagram which shows the structure of a frame H;

FIG. 40(A) is a diagram which shows the structure of a frame I;

FIG. 40(B) is a diagram which shows the structure of a frame J;

DESCRIPTION OF THE PREFERRED EMBODIMENTS

Preferred embodiments of the present invention will be described below, with reference to the accompanying drawings.

Figure 1:
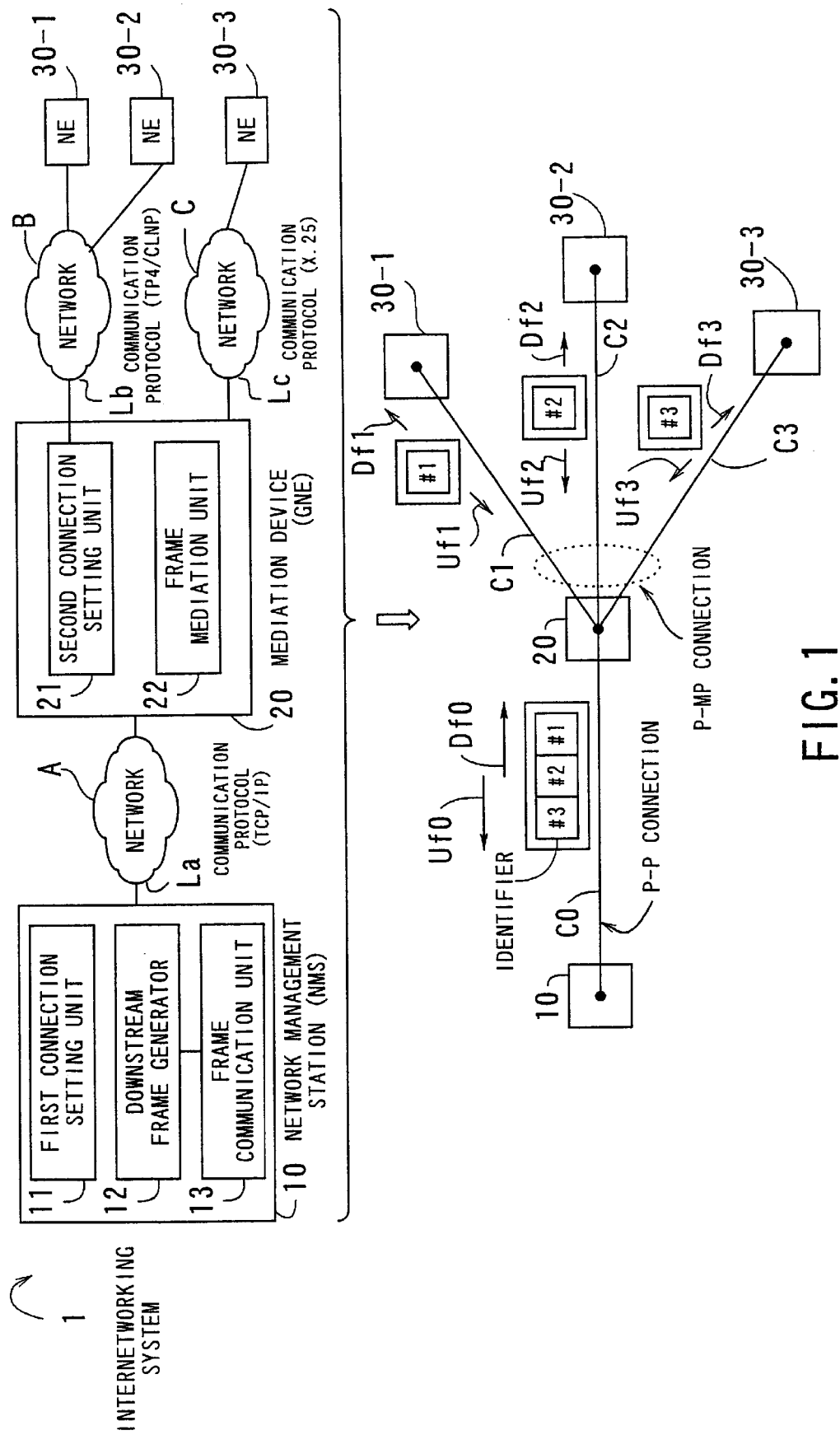
FIG. 1 is a conceptual view of an internetworking system according to the present invention.

FIG. 1 is a conceptual view of an internetworking system according to the present invention. This internetworking system 1 comprises a network management station (NMS) 10, a gateway network element (GNE) 20, and three network elements (NEs) 30-1 to 30-3. The GNE 20 acts as a mediation device which provides mediation services to interconnect other network nodes. While FIG. 1 shows only three NEs, any number of network elements can be connected to the GNE 20 via the illustrated networks or any other networks that use different protocols.

The NMS 10 and GNE 20 are linked via a network A using a communication protocol La. The GNE 20 is also connected to the NEs 30-1 to 30-3 via other networks that use dissimilar protocols other than the communication protocol La. More specifically, FIG. 1 shows that the GNE 20 is linked to the NEs 30-1 and 30-2 via a network B with a communication protocol Lb that differs from La. Further, the GNE 20 reaches the NE 30-3 through a network C with a communication protocol Lc that differs from the others. For illustrative purposes, it is assumed that the network A employs TCP/IP as its communication protocol La. It is also assumed that the network B uses TP4/CLNP as its communication protocol Lb, and the network C adopts X.25 as its communication protocol Lc.

The NMS 10 comprises a first connection setting unit 11, a downstream frame generator 12, and a frame communication unit 13. The first connection setting unit 11 establishes a point-to-point connection C0 between the NMS 10 and GNE 20 over the network A. This connection C0 is referred to herein as the "first connection." In the present invention, the term "connection" is used to mean either (1) a logical connection path established for end-to-end communication over the transport layer, or the layer 4, defined in the Open Systems Interconnection (OSI) reference model, or (2) an association (i.e., logical connection path) established for peer-to-peer communication at the application layer defined in the same model.

The downstream frame generator 12 produces a downstream frame Df0 containing the identifiers of NEs to which the frame is directed. Note here that it can insert to each frame Df0 a plurality of identifiers corresponding to a plurality of destination NEs. Consider, for instance, that the NMS 10 has some data to send to remote NEs 30-1, 30-2, and 30-3. In this case, the downstream frame generator 12 produces a single downstream frame Df0 having the following three identifiers: NE#1 for NE 30-1, NE#2 for NE 30-2, and NE#3 for NE 30-3. The frame communication unit 13 transmits this downstream frame Df0 to the GNE 20 through the connection C0. It may also receive an upstream frame Uf0 that the GNE 20 mediated to the NMS 10 through the connection C0. As seen from the above, the message frames sent from the NMS 10 to remote NEs through the GNE 20 are called the "downstream frames" in the present invention. On the other hand, the term "upstream frames" refers to the message frames transported in the opposite direction, from remote NEs to the NMS 10 via the GNE 20.

The GNE 20 comprises a second connection setting unit 21 and a frame mediation unit 22. When a downstream frame Df0 is received, the second connection setting unit 21 finds destination identifiers in the frame Df0 and establishes a second connection to reach the relevant NEs that are determined by the identifiers. In the current example, the second connection setting unit 21 obtains three identifiers NE#1, NE#2, and NE#3 from the received downstream frame Df0. Therefore, it sets up a point-to-multipoint connection involving three connections C1, C2, and C3 between the GNE 20 and NEs 30-1, 30-2, and 30-3, respectively. If the downstream frame Df0 contained only one NE identifier, the second connection setting unit 21 would establish a single point-to-point connection. Such point-to-point or point-to-multipoint connections produced by the second connection setting unit 21 are referred to herein as the "second connection."

The frame mediation unit 22 mediates the transmission of downstream frames to the NEs through the second connection established between the GNE 20 and NEs, when those frames are addressed to the NEs. In the present example, three downstream frames Df1, Df2, and Df3 addressed to the NEs 30-1, 30-2, and 30-3 are forwarded to their respective destinations through the connections C1, C2, and C3. Generally, the frame mediation unit 22 also mediates the reception of upstream frames by receiving such frames from remote NEs through the pre-established connections and then forwarding them to the NMS 10, which is serving as an upstream device of those NEs. In the present example, it receives upstream frames Uf1, Uf2, and Uf3 from the NEs 30-1, 30-2, and 30-3 through the connections C1, C2, and C3 and forwards them to the NMS 10. The frame mediation unit 22 converts between different protocols with reference to its local connection database (described later) during the process of network mediation control.

Figure 50:
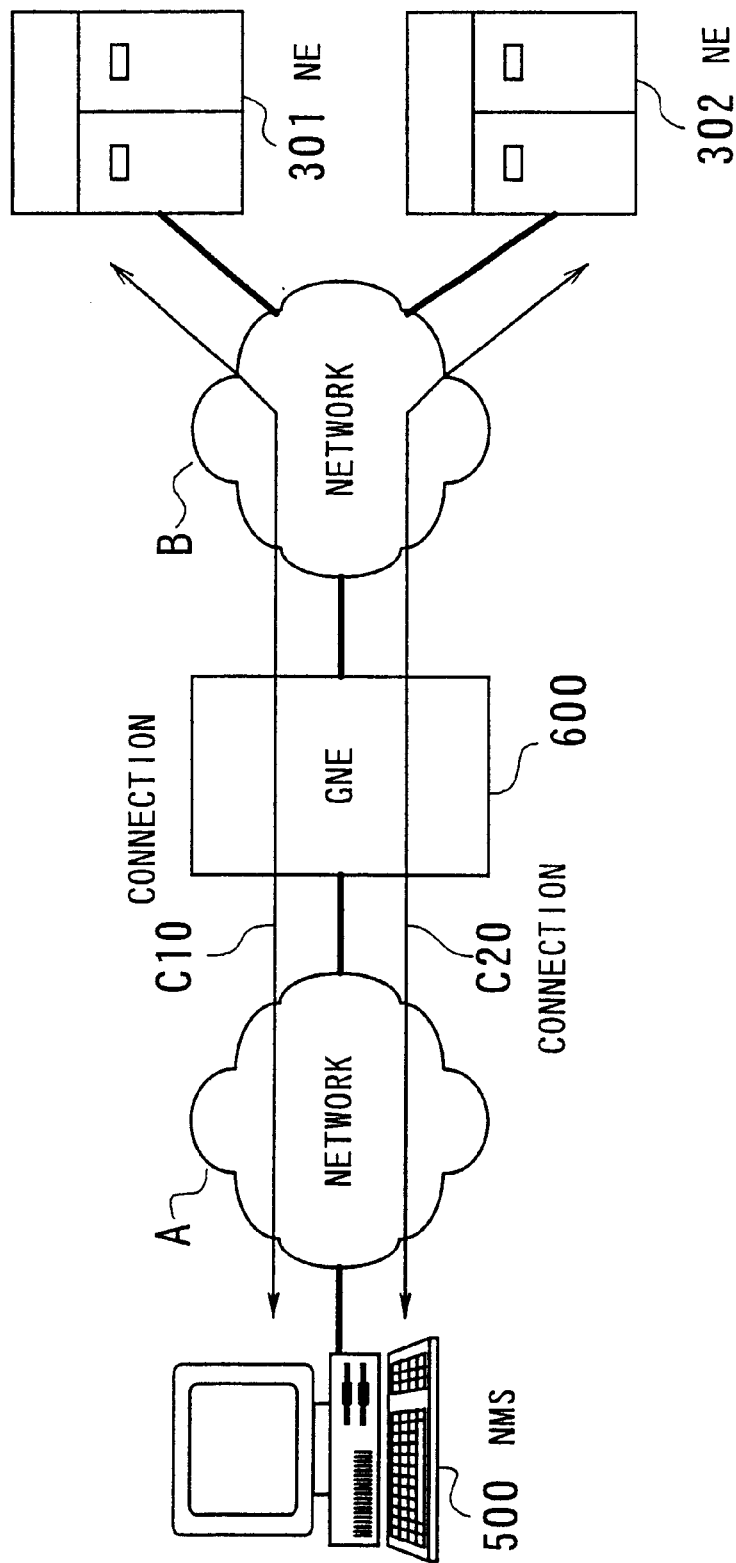
FIG. 50 is a diagram which shows a conventional network management system.
Figure 51:
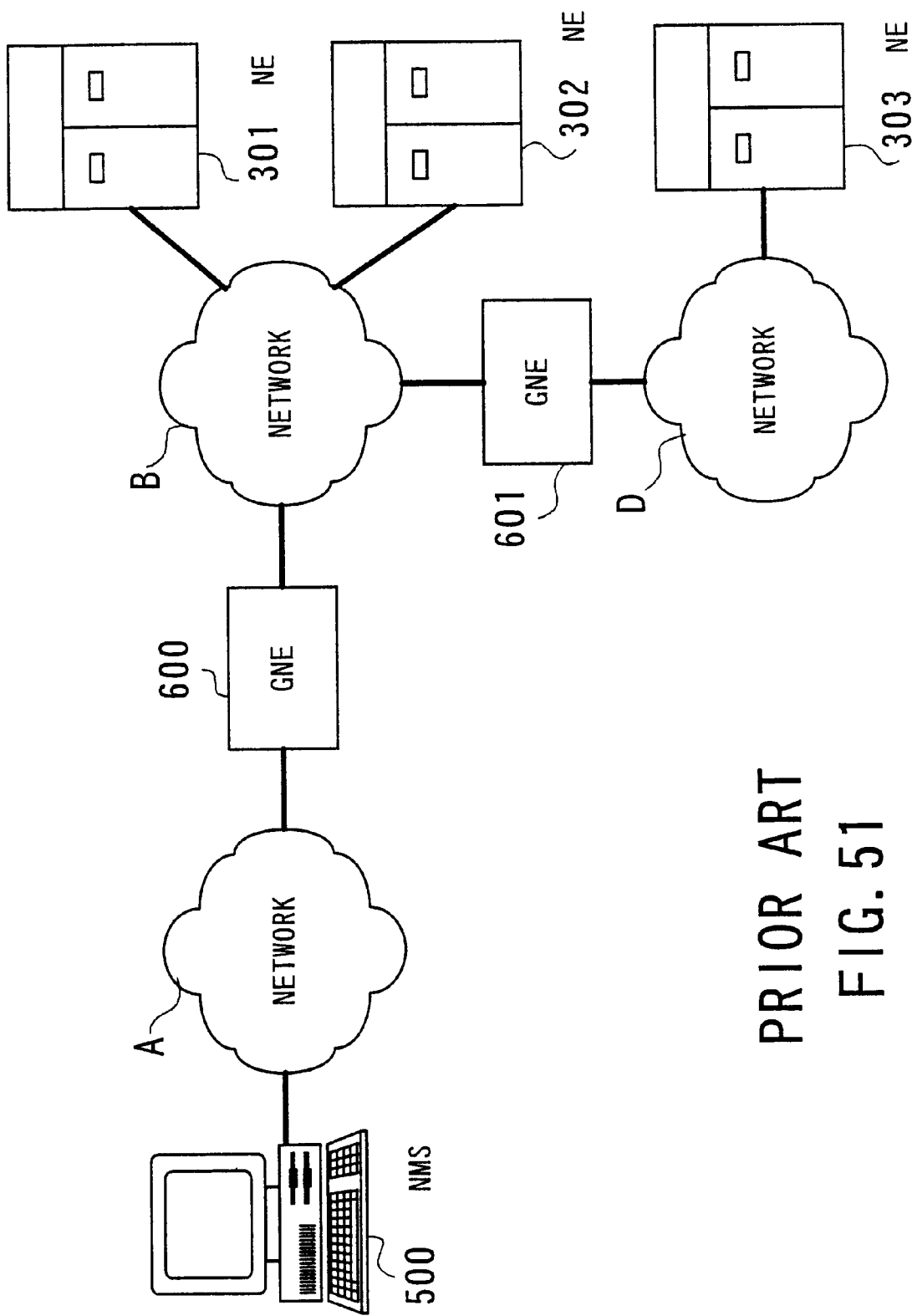
FIG. 51 is a diagram which shows a system consisting of three networks using different protocols.

According to the above-described invention, the internetworking system 1 is configured to establish a point-to-point connection C0 between the NMS 10 and GNE 20, together with a point-to-multipoint connection C1 to C3 between the GNE 20 and NEs 30-1 to 30-3. These connections will form a point-to-multipoint (1:N) connection extending from the NMS 10 to the NEs 30-1 to 30-$n$. As previously discussed in FIG. 50, the conventional network management system requires the NMS to establish a 1:1 connection for each intended NE when attempting to access remote NEs for supervisory purposes. In contrast to this, the present invention permits the NMS to set up a more efficient 1:N connection to reach the NEs, through the use of the GNE 20's mediation services. This configuration liberates the NMS 10 from the tasks of managing a plurality of connections. That is, the NMS 10 only has to set up a single connection to communicate with a plurality of remote NEs.

Another advantage of the invention is its simplified frame structure. In conventional systems, the NMS should create frames with relatively large additional data to meet the specifications of different protocols used in a remote network that interconnects a GNE and NE. As opposed to this, the present invention minimizes the amount of that additional data; the NMS only has to supply information related to the application layer. This reduces the size of each frame, thus alleviating the load on the network traffic. Furthermore, the NMS 10 can send a frame that is addressed to a plurality of NEs at a time. This feature improves the network performance, providing an increased access speed when the NMS 10 interact with remote NEs.

Referring now to FIGS. 2(A) to 5(B), the structures of downstream and upstream frames will be described in more detail below, assuming their use in the internetworking system 1 of FIG. 1.

FIGS. 2(A) and 2(B) show the structure of downstream frames Df0 and upstream frames Uf0 flowing over the connection C0 between the NMS 10 and GNE 20. Those downstream frame Df0 and upstream frame Uf0 each comprise a header field and a data field that conform to the communication protocol La used in the network A.

The general structure of downstream frames Df0 is as follows. Its header field 101 contains the destination address information (identifiers) 101-1, which specifies the GNE 20, connection C0, and the like in this case. The data field 111 carries a plurality of packets P1 to P3. Packet P1 is a packet directed to the NE 30-1, containing an identifier TID1 ("NE#1") of and command Cm1 to the NE 30-1. Packet P2 is a packet directed to the NE 30-2, containing an identifier TID2 ("NE#2") of and command Cm2 to the NE 30-2. Packet P3 is a packet directed to the NE 30-3, containing an identifier TID3 ("NE#3") of and command Cm3 to the NE 30-3.

Upstream frames Uf0, on the other hand, have the following structure. Their header section 101a contains destination address information (identifiers) 101a-1, which specifies the NMS 10 and connection C0 in this case. The data field 111a carries a plurality of packets P1a to P3a. Packet P1a is a packet returned from the NE 30-1, containing an identifier TID1 ("NE#1") of and response Re1 from the NE 30-1. Packet P2a is a packet returned from the NE 30-2, containing an identifier TID2 ("NE#2") of and response Re2 from the NE 30-2. Packet P3a is a packet returned from the NE 30-3, containing an identifier TID3 ("NE#3") of and response Re3 from the NE 30-3.

Figure 3A:
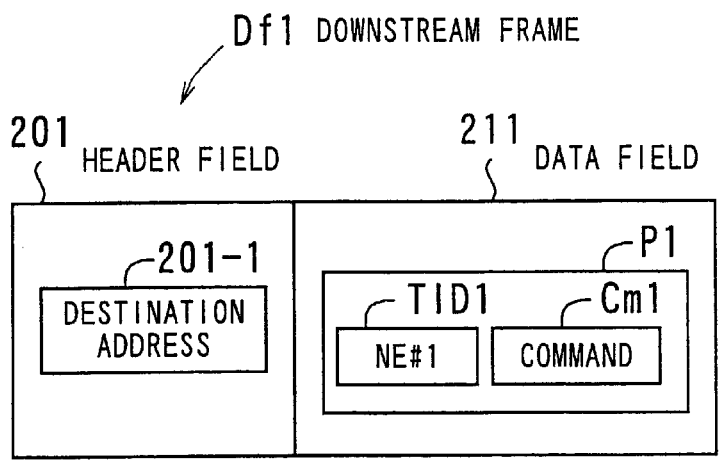
FIG. 3(A) is a diagram which shows the structure of downstream frames flowing over a connection between GNE and NE.
Figure 3B:
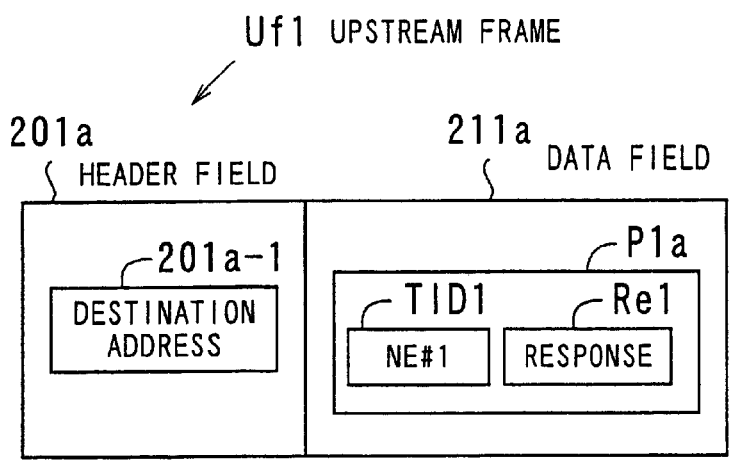
FIG. 3(B) is a diagram which shows the structure of upstream frames flowing over a connection between GNE and NE.

FIGS. 3(A) and 3(B) show the structures of downstream frames Df1 and upstream frames Uf1 flowing over the connection C1 between the GNE 20 and NE 30-1. Those downstream frames Df1 and upstream frames Uf1 each comprise a header field and a data field that conform to the communication protocol Lb used in the network B.

The structure of downstream frames Df1 is as follows. The header section 201 of a frame contains destination address information (identifiers) 201-1, which specifies the NE 30-1, connection C1, and the like. The data field 211 carries the packet P1, one of the aforementioned downstream packets. Upstream frames Uf1, on the other hand, have the following structure. The header section 201a of a frame contains destination address information (identifiers) 201a-1, which specifies the GNE 20, connection C1, and so on. The data field 211a carries the packet P1a, one of the aforementioned upstream packets.

Figure 4A:
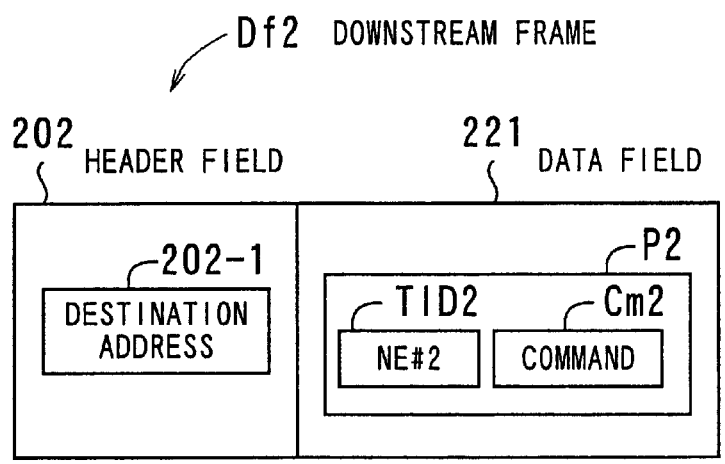
FIG. 4(A) is a diagram which shows the structure of downstream frames flowing over a connection between GNE and NE.
Figure 4B:
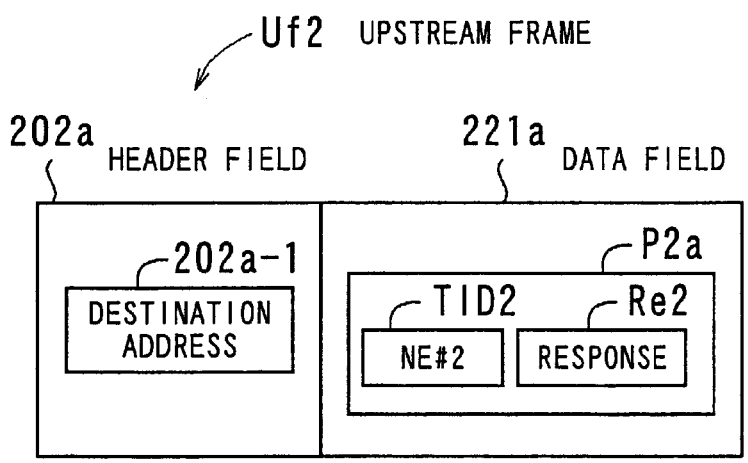
FIG. 4(B) is a diagram which shows the structure of upstream frames flowing over a connection between GNE and NE.

FIGS. 4(A) and 4(B) show the structure of downstream frames Df2 and upstream frames Uf2 flowing over the connection C2 pre-established between the GNE 20 and NE 30-2. Those downstream frames Df2 and upstream frames Uf2 each comprise a header field and a data field that conform to the communication protocol Lb used in the network B.

The structure of downstream frame Df2 is as follows. The header section 202 of a frame contains destination address information (identifiers) 202-1, which specifies the NE 30-2 connection C2, and the like. The data field 221 carries the aforementioned packet P2. Upstream frames Uf2, on the other hand, have the following structure. The header section 202a contains destination address information (identifiers) 202a-1 which specifies the GNE 20, connection C2, and so on. The data field 221a carries one of the aforementioned packets, P2a.

Figure 5A:
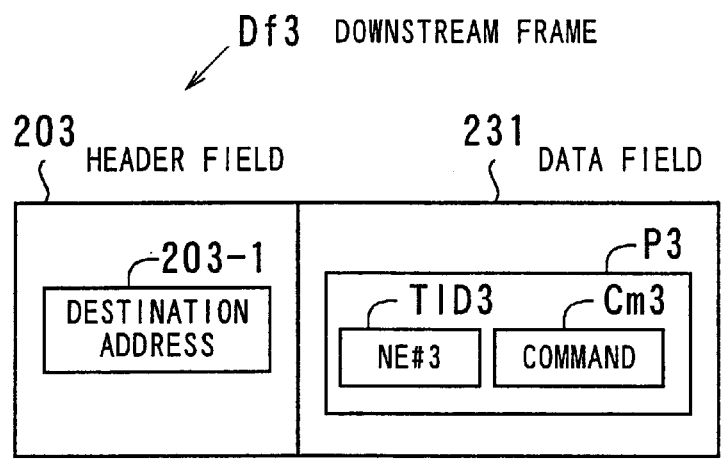
FIG. 5(A) is a diagram which shows the structure of downstream frames flowing over a connection between GNE and NE.
Figure 5B:
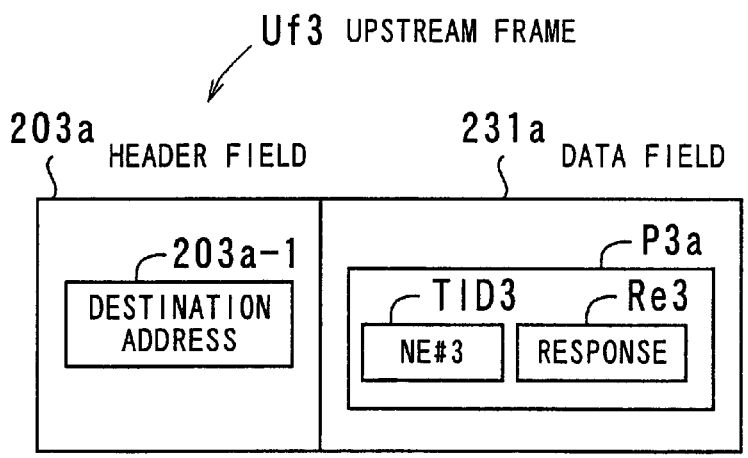
FIG. 5(B) is a diagram which shows the structure of upstream frames flowing over a connection between GNE and NE.

FIGS. 5(A) and 5(B) show the structure of downstream frames Df3 and upstream frames Uf3 flowing over the connection C3 between the GNE 20 and NE 30-3. Those downstream frames Df3 and upstream frames Uf3 each comprise a header field and a data field that conform to the communication protocol Lc used in the network C.

The structure of downstream frames Df3 is as follows. The header section 203 of a frame contains destination address information (identifiers) 203-1, which specifies the NE 30-3 and connection C3. The data field 231 carries one of the aforementioned packets, P3. Upstream frames Uf3, on the other hand, have the following structure. The header section 203a contains destination address information (identifiers) 203a-1 which specifies the GNE 20, connection C3, and so on. The data field 231a carries the aforementioned packet P3a.

Recall that the conventional hybrid frames contain data of a plurality of protocols. According to the present invention, the downstream and upstream frames are unlike those conventional frames, thus imposing only a smaller load on the network traffic.

When connections are established between the NMS 10 and GNE 20, and between the GNE 20 and NEs 30-1 to 30-3, the GNE 20 stores some records necessary for using those connections into a part of its local memory. This storage is called a connection database. The next section will now focus on the connection database.

Figure 6:
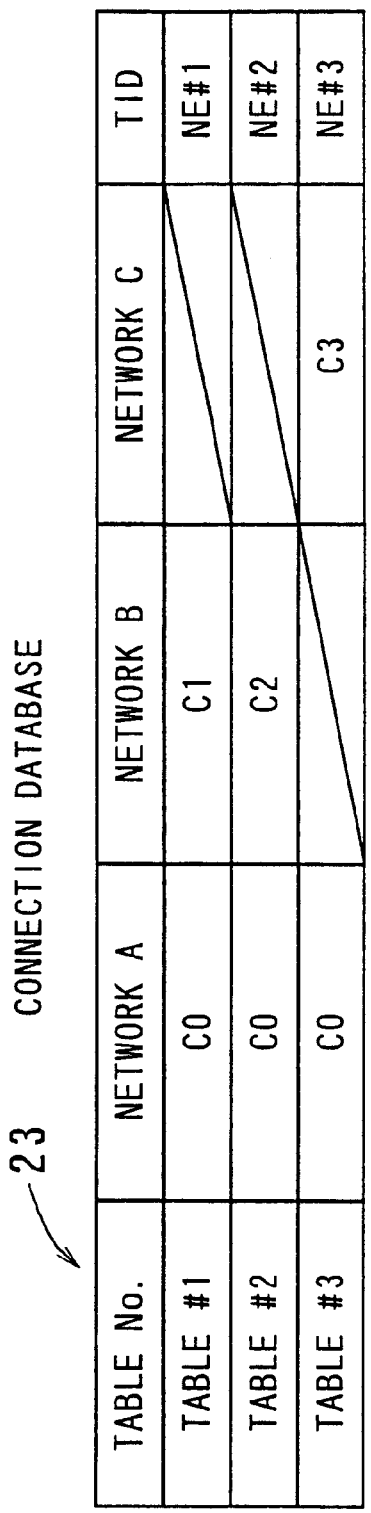
FIG. 6 is a diagram which shows an example of a connection database.

FIG. 6 shows a typical connection database 23 whose records describe the connections being established in the system of FIG. 1. This connection database 23 stores a plurality of entries, herein called "tables," each having the following data fields: table number, network names, and TID. Here, TID denotes a target identifier being assigned to each NE. More specifically, the table #1 contains the following items:

identifier C0 of the connection being established on the network A, identifier C1 of the connection being established on the network B, and TID "NE#1" of the NE 30-1 at the far end of the established connection C1.

The table #2 contains the following items:

identifier C0 of the connection being established on the network A, identifier C2 of the connection being established on the network B, and TID "NE#2" of the NE 30-2 at the far end of the established connection C2.

The table #3 contains the following items:

identifier C0 of the connection being established on the network A, identifier C3 of the connection being established on the network C, and TID "NE#3" of the NE 30-3 at the far end of the established connection C3.

In the GNE 20, the frame mediation unit 22 converts between different protocols, based on the connection database 23, to handle the received downstream frames and upstream frames. This realizes the mediation between the networks A and B, and between the networks A and C.

The present invention can be applied to various communication protocol models. Referring now to FIGS. 7 to 10, several examples of such protocol models will be described below. In all systems illustrated in FIGS. 7 to 10, an NMS 10 is linked with a GNE 20 via a TCP/IP-based network, and the GNE 20 is connected with two NEs 30-4 and 30-5 through an OSI-based network. Further, one connection is established between the NMS 10 and GNE 20, and two associations has been established between the GNE 20 and NEs 30-4 and 30-5. The term "association" refers to a logical communication channel, or connection, between application layer entities. In FIGS. 7 to 10, the lines interconnecting small black circles represent message paths, where each black circle shows that messages are processed at that protocol layer.

Figure 7:
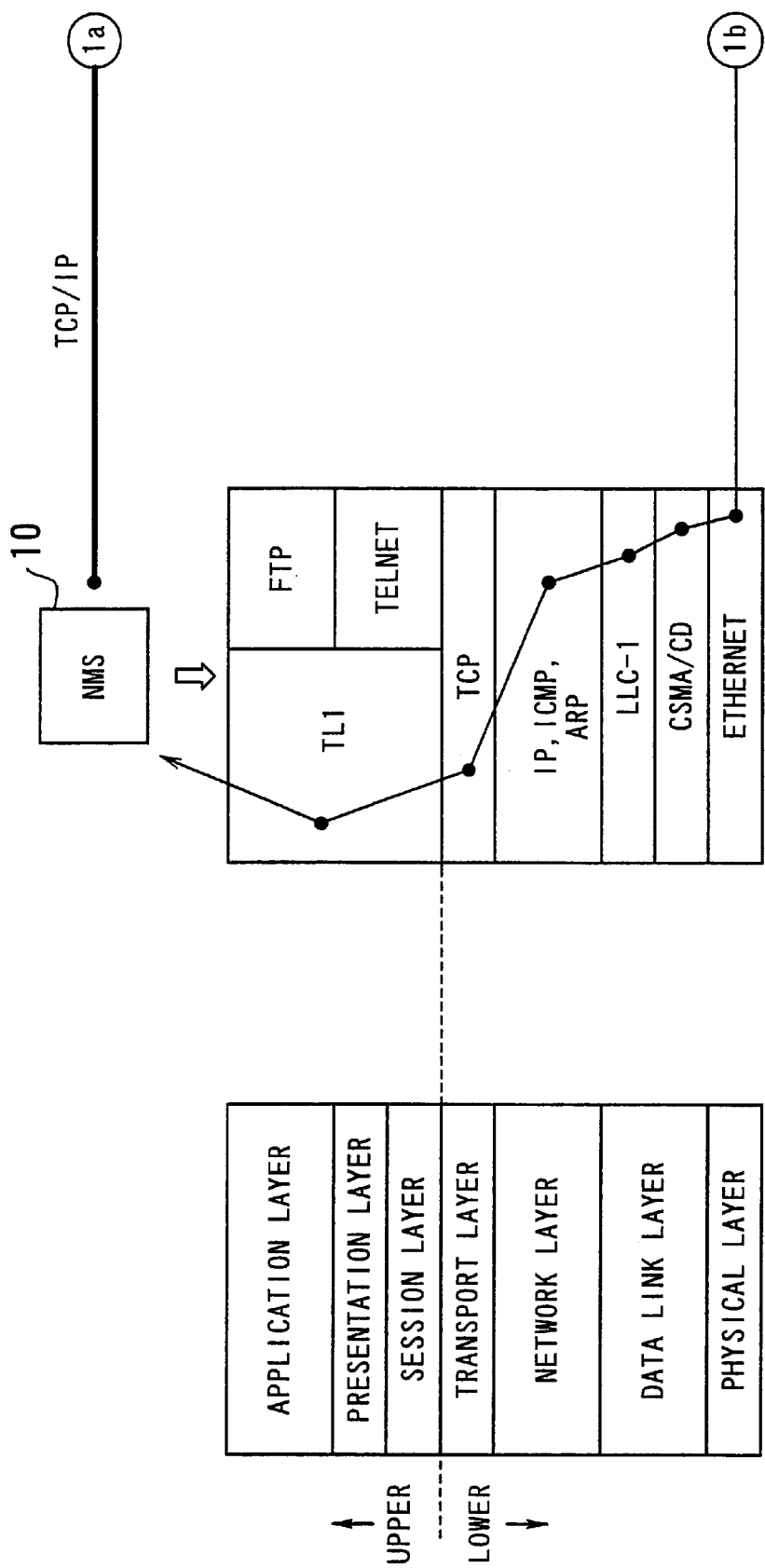
FIGS. 7 to 10 are diagrams which show various communication protocol models.

FIG. 7 shows which communication protocols are implemented in the NMS 10's protocol stack. The NMS 10 uses the Ethernet protocol in its physical layer. Protocols implemented in the data link layer include: Carrier Sense Multiple Access with Collision Detection (CSMA/CD) and Logical Link Control-1 (LLC-1). CSMA/CD is one of the fundamental techniques for Ethernet, which controls signal transmission on a local area network to ensure that there is no conflict between terminals that wish to transmit. LLC sublayer is the upper half of the logical link control layer specified in the IEEE 802.2 standard. LLC-1 supports connectionless data transfer services.

Further, the network layer protocols include: Internet Protocol (IP), Internet Control Message Protocol (ICMP), and Address Resolution Protocol (ARP). IP is a core protocol of TCP/IP networks, providing connectionless services in the network layer. ICMP, part of the IP protocol, handles error conditions in the IP network. ARP provides address resolution services, interpreting each node's logical address (IP address) into its corresponding physical LAN address.

For the transport layer, Transmission Control Protocol (TCP) is implemented. TCP is a connection oriented protocol, which serves as another core protocol in a TCP/IP-based network.

Protocols implemented in the session and presentation layers include: Transaction Language-1 (TL1) and Telecommunication Network Protocol (TELNET). TL1 offers the language for communication between terminals. TELNET is an application protocol to provide virtual terminal capabilities that allow its user to access a remote system. Protocols implemented in the application layer include: TL1 and File Transfer Protocol (FTP). Here, FTP is used in transferring files over a TCP/IP-based network.

Figure 8:
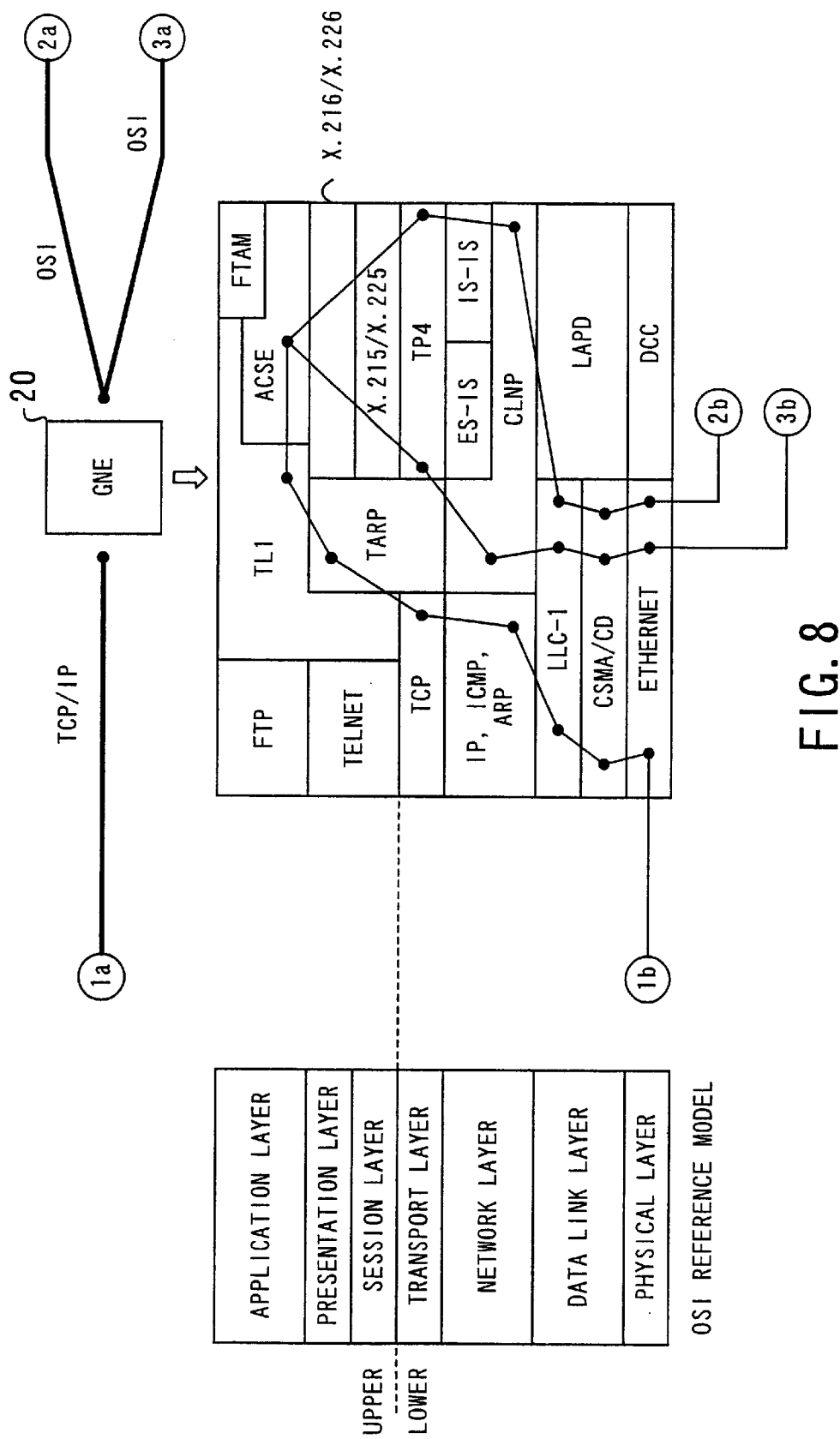

FIG. 8 shows which communication protocols are implemented in the GNE 20's protocol stack. The GNE 20 uses both Ethernet and Data Communication Channel (DCC) in its physical layer. DCC is a data transfer protocol for monitoring and controlling a network. The protocols implemented in the data link layer are: CSMA/CD, LLC-1, and Link Access Protocol for the D channel (LAPD). LAPD is a protocol used to control the D channels of ISDN links.

The network layer has the following routing control protocols: IP, ICMP, ARP, ES-IS, IS-IS, and CLNP. ES-IS (End System to Intermediate System) Routing Protocol is a protocol that defines how to exchange dynamic routing data between an end system (ES) and an intermediary system (IS). IS-IS (Intermediate System to Intermediate System) Routing Protocol defines a procedure of exchanging dynamic routing information between intermediary systems. CLNP (Connectionless Network Protocol) provides connectionless services.

The transport layer protocols include: TCP, TID Address Resolution Protocol (TARP), and Transaction Processing 4 (TP4). TARP interprets a TID into its corresponding logical address, i.e., Network Service Access Point (NSAP) address. TP is a protocol for transaction processing, and TP4 supports additional functions of data error detection and recovery.

The session layer protocols include: TELNET, TL1, TARP, and X.215/X.225. X.215/X.225, among the X.200 series of ITU-T recommendations, defines services (X.215) and protocols (X.225) in the OSI session layer.

The presentation layer protocols include: TELNET, TL1, TARP, and X.216/X.226. Among the X.200 series of ITU-T recommendations, X.216/X.226 defines services (X.216) and protocols (X.226) in the OSI presentation layer.

The application layer protocols are: FTP, TL1, Association Control Service Element (ACSE), and File Transfer, Access and Management (FTAM). ACSE is a protocol for controlling establishment and release of associations. FTAM is used to transfer files in an OSI network.

Figure 9:
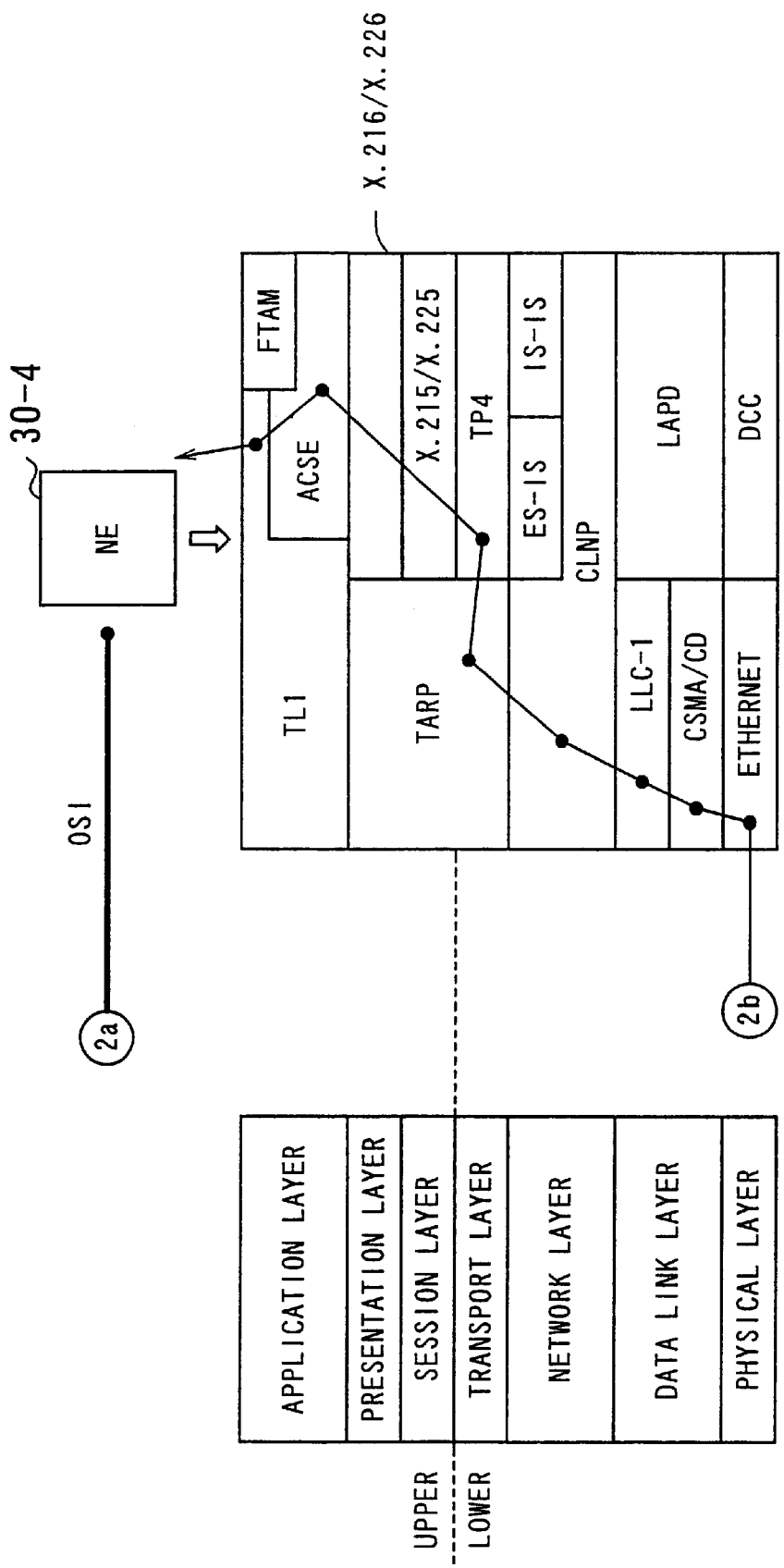

FIG. 9 shows which communication protocols are implemented in the NE 30-4's protocol stack. The physical layer protocols found in this stack are Ethernet and DCC. The data link layer protocols include: CSMA/CD, LLC-1, and LAPD. The network layer protocols are: CLNP, ES-IS, and IS-IS. The transport layer protocols are: TARP and TP4. The session layer protocols are: TARP, and X.215/X.225. The presentation layer protocols are: TARP and X.216/X.226. The application layer protocols are: TL1, ACSE, and FTAM.

Figure 10:
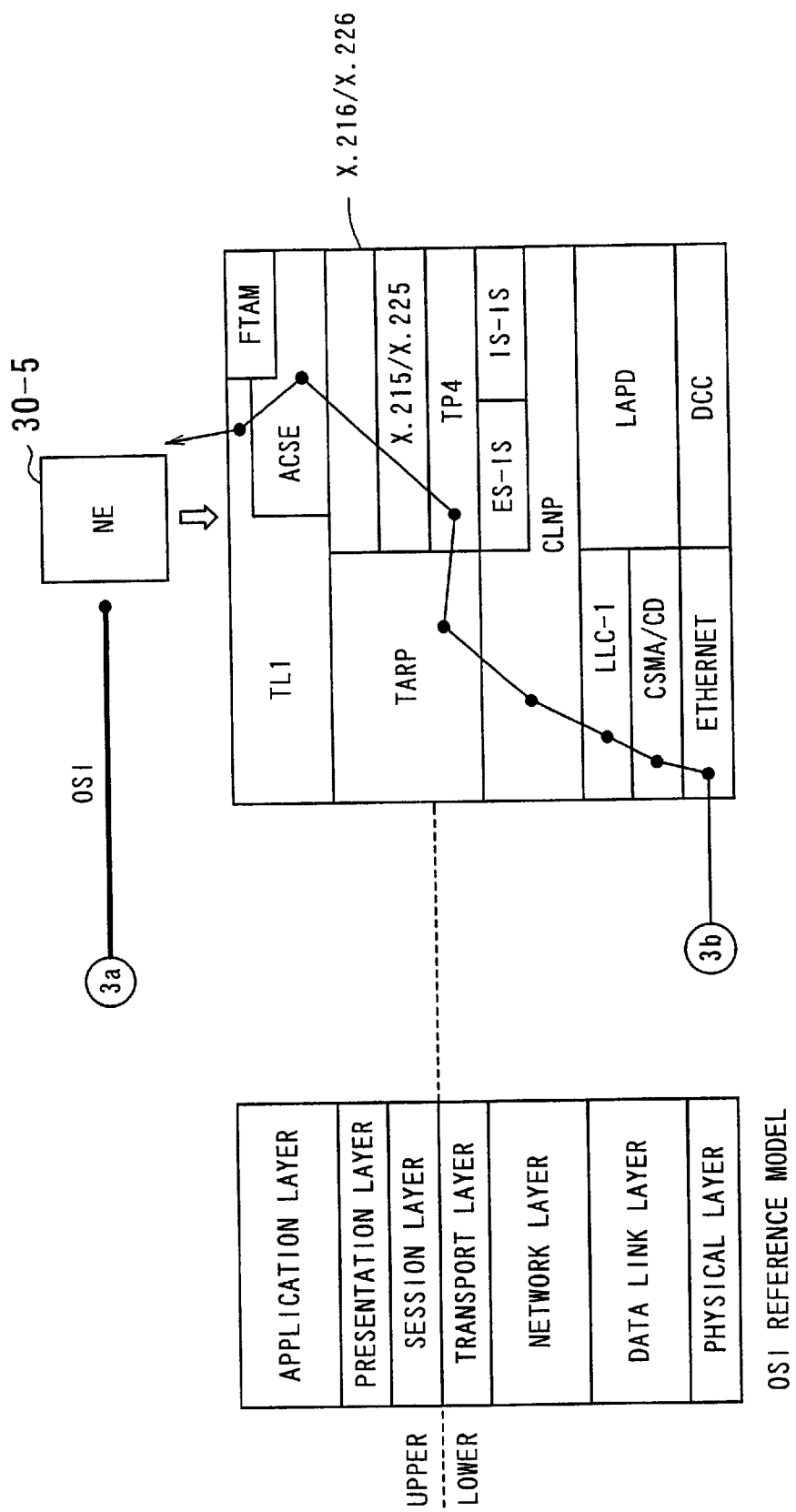

While the above paragraph has described the protocol stack of FIG. 9, the same can apply to that of the NE 30-5 shown in FIG. 10. Therefore, the explanation for the protocol stack of FIG. 10 will not be provided here.

Figure 11:
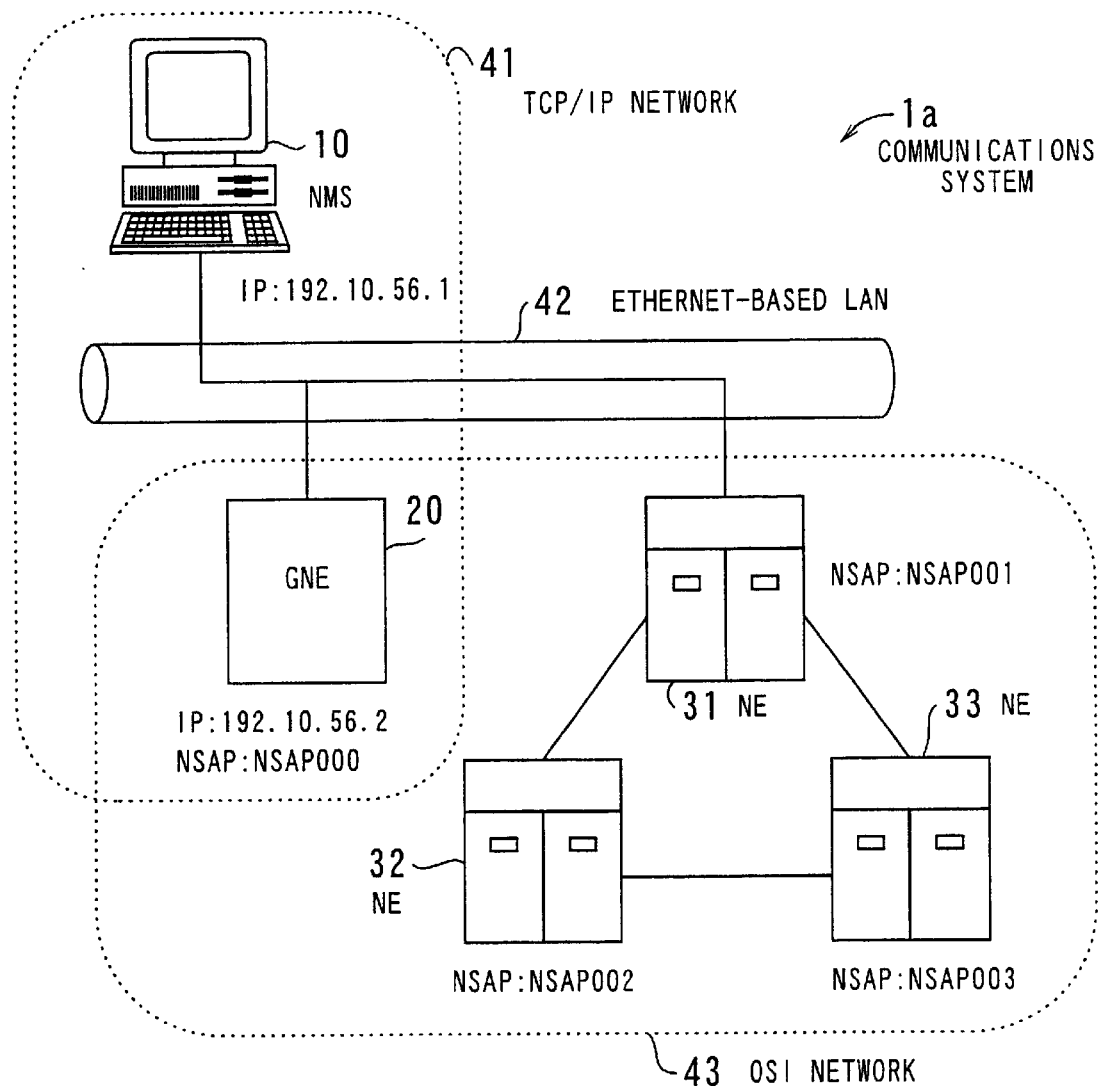
FIG. 11 is a diagram showing the structure of a communications system where the present invention is implemented.

The next section will now describe a specific communications system as a typical implementation of the present invention. FIG. 11 shows the structure of a communications system 1a according to the present invention. This communications system 1a is a heterogeneous network environment which includes a TCP/IP network 41, an Ethernet-based LAN 42, and an OSI network 43. The TCP/IP network 41 includes an NMS 10 and GNE 20 as its network nodes, and the OSI network 43 includes the GNE 20 and NEs 31 to 33. The NMS 10 and GNE 20 communicate over the Ethernet-based LAN 42, as do the GNE 20 and NE 31. The three NEs 31 to 33 are linked together in a ring topology, through fiber optic cables or other transmission media. In such a network configuration, the NMS 10 supports the TCP/IP protocols, while the NEs 31 to 33 are based on the OSI protocols. The GNE 20, on the other hand, supports both protocols to mediate the communication between the NMS 10 and NEs 31 to 33 via the Ethernet-based LAN 42.

The GNE 20 and NEs 31 to 33 have their own TIDs (i.e., GNE#0, NE#1, NE#2, NE#3, respectively), allowing application entities to uniquely identify each of those network elements. They also have network-specific logical addresses. For illustrative purposes, assume that the NMS 10 and GNE 20 on the TCP/IP network 41 have their IP addresses 192.10.56.1 and 192.10.56.2, respectively. Assume further that the GNE 20 and NEs 31 to 33 on the OSI network 43 have their NSAP addresses NSAP000, NSAP001, NSAP002, and NSAP003, respectively.

Suppose here that, in the communications system 1a, the NMS 10 sends an ACT-USER command to all NEs on the OSI network 43 (i.e., GNE 20, NE 31 to 33) through a single TCP connection. "ACT-USER" is a TL1 command that activates a log-in session of a specified network element. When this command is executed, all NEs returns their COMPLD responses to the NMS 10, where "COMPLD" is a message that is defined in the TL1 standard as an indicator of a response to an ACT-USER command. The following provides more details of the above scenario.

Figure 12:
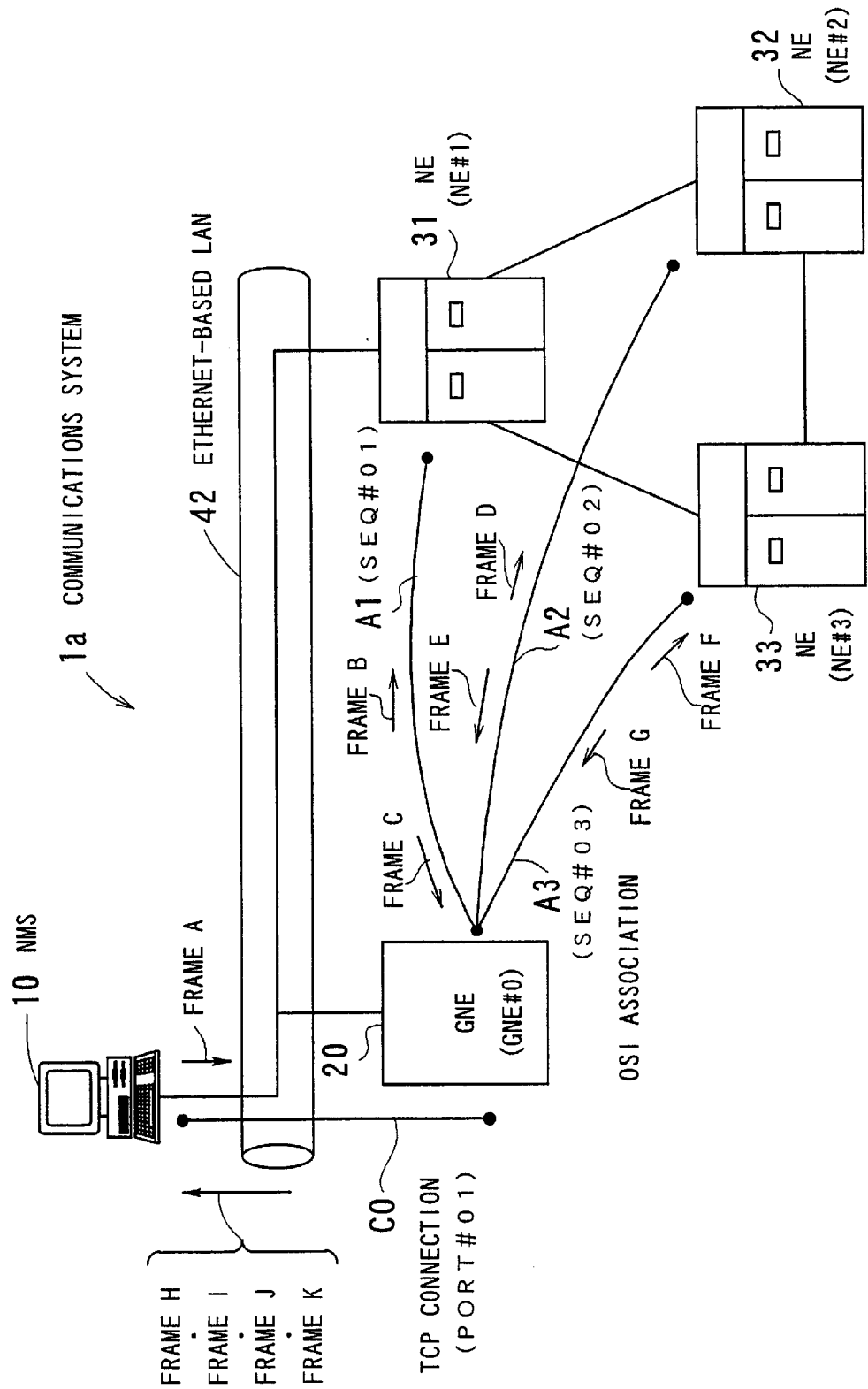
FIG. 12 is a diagram showing a situation where a TCP/IP connection and OSI associations have been established.

FIG. 12 shows a situation where a TCP/IP connection and OSI associations have been established. More specifically, a TCP/IP connection C0 has been established between the NMS 10 and GNE 20, and OSI associations A1 to A3 have been established between the GNE 20 and NEs 31 to 33. It is assumed here that the TCP/IP connection C0 has an identifier PORT#01, and that the OSI associations A1 to A3 have their identifiers SEQ#01 to SEQ#03, respectively.

In the communications system 1a, the network nodes exchange various frames having different structures, which include the following types. "Frame A" denotes a downstream frame to be sent from the NMS 10 to the GNE 20. "Frames H, I, J, and K" denote upstream frames to be sent from the GNE 20 to the NMS 10. "Frame B" denotes a downstream frame to be sent from the GNE 20 to the NE 31. "Frame C" denotes an upstream frame to be sent from the NE 31 to the GNE 20. "Frame D" denotes a downstream frame to be sent from the GNE 20 to the NE 32. "Frame E" denotes an upstream frame to be sent from the NE 32 to the GNE 20. "Frame F" denotes a downstream frame to be sent from the GNE 20 to the NE 33. "Frame G" denotes an upstream frame to be sent from the NE 33 to the GNE 20. The details of each frame structure will be discussed later.

FIG. 13 shows a connection database 23 for the communications system 1a. This connection database 23 comprises three tables #1 to #3. The first table #1 contains the following items:
Identifier PORT#01 of the connection C0 established on the TCP/IP network,
Identifier SEQ#01 of the association A1 established on the OSI network, and
TID NE#1 of the NE 31 at the far end of the established association A1.

The second table #2 contains the following items:
Identifier PORT#01 of the connection C0 established to TCP/IP network,
Identifier SEQ#02 of the association A2 established on the OSI network, and
TID NE#2 of the NE 32 at the far end of the established association A2.

The third table #3 contains the following items:
Identifier PORT#01 of the connection C0 established to TCP/IP network,
Identifier SEQ#03 of the association A3 established on the OSI network, and
TID NE#3 of the NE 33 at the far end of the established association A3.

Referring now to the flowchart of FIG. 14, a process of transmitting a frame A will be described below. The NMS 10 sends a frame A to the GNE 20 according to the following steps.

(S1) The NMS 10 retrieves the GNE 20's IP address (192.10.56.2) from its local database.

(S2) According to the TCP/IP protocols, the NMS 10 sets up a TCP connection C0, thereby defining PORT#01 to interface with the GNE 20. This connection is referred to hereafter by its identifier "PORT#01."

(S3) The NMS 10 assembles a frame A containing the following commands in its data field, and transmits it to the GNE 20 through PORT#01.
ACT_G.PDU: ACT-USER command with GNE 20's TID (GNE#0)
ACT_1.PDU: ACT-USER command with NE 31's TID (NE#1)
ACT_2.PDU: ACT-USER command with NE 32's TID (NE#2)
ACT_3.PDU: ACT-USER command with NE 33's TID (NE#3)

(S4) The GNE 20 receives the above frame A from the NMS 10. It then extracts the ACT_G.PDU command from TCP/IP data field of the received frame A, thus detecting that the target identifier GNE#0 specified in the command agrees with its own TID. The GNE 20 also examines the other commands (ACT_1.PDU, ACT_2.PDU, and ACT_3.PDU) embedded in the same TCP/IP field, and thus finds their respective TIDs (NE#1, NE#2, and NE#3). it detects that none of those specified identifiers agrees with its own TID (GNE#0).

(S5) As a consequence of step S4, the GNE 20 forwards the ACT_G.PDU command to a relevant application running on itself, thereby initiating a log-in session.

(S6) The GNE20 tries to get NSAP addresses of the destination NEs 31 to 33 on the OSI network 43, according to TARP.

(S7) Obtaining the NSAP addresses of the NEs 31 to 33, the GNE 20 stores them in its local cache memory.

Figure 15:
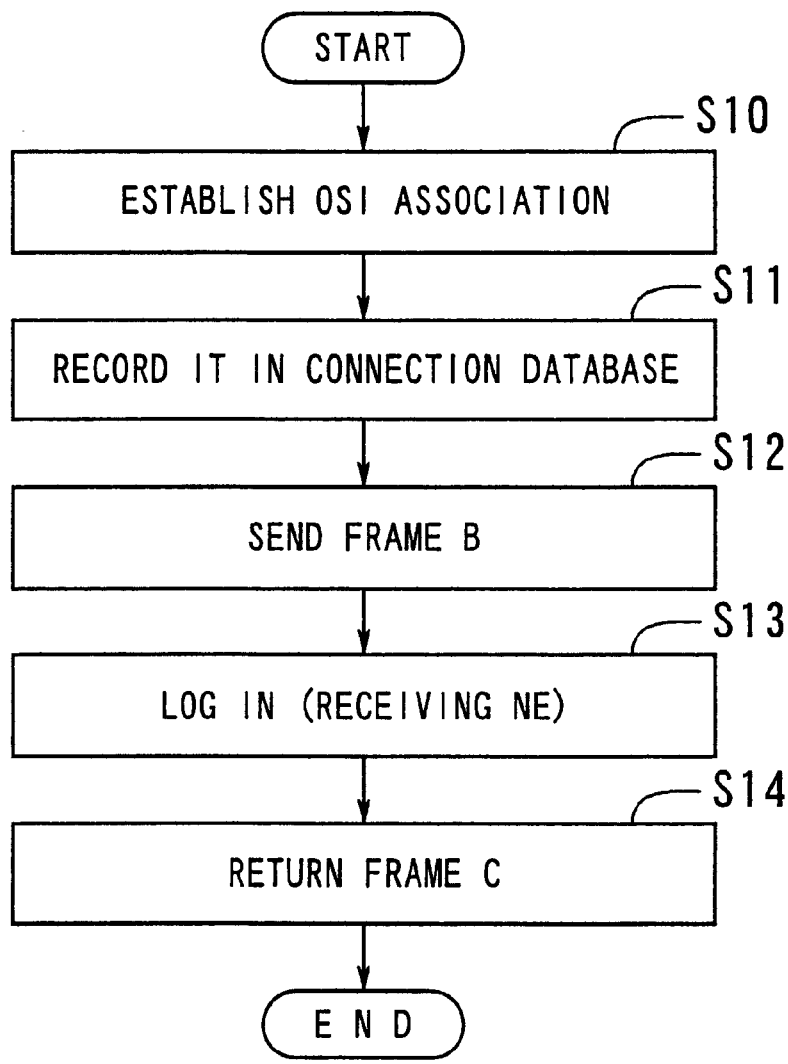
FIG. 15 is a flowchart which shows how frames B and C are exchanged between GNE and NE.

Referring next to the flowchart of FIG. 15, a process of transmitting frames B and C will be described below. The GNE 20 sends a frame B and receives a frame C to/from the NE 31 according to the following steps.

Figure 14:
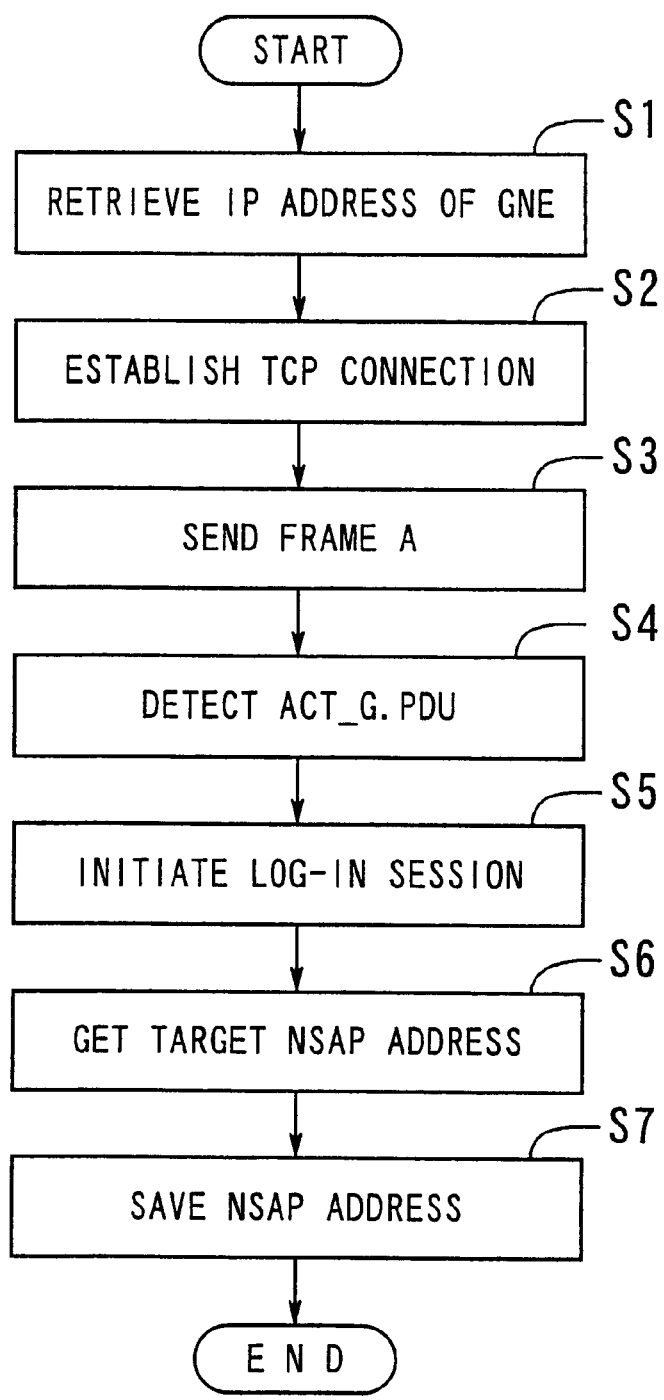
FIG. 14 is a flowchart which shows how a frame A is sent from NMS to GNE.

(S10) The GNE 20 obtains the NSAP address of the NE 31 from its local cache memory mentioned in step S7 (FIG. 14). The GNE 20 then establishes an OSI association A1 to reach the NE 31 according to the OSI protocols. This association will be referred to hereafter by its identifier SEQ#01.

(S11) The GNE 20 enters a record to the connection database 23. This record, called "table #1," has the following values: PORT#01, SEQ#01, and NE#1.

(S12) The GNE 20 extracts ACT_1.PDU out of the frame A received from the NMS 10 and assembles a frame B by inserting the extracted ACT_1.PDU to its OSI data field. The GNE 20 then sends this frame B to its destination, NE 31, through the association SEQ#01.

(S13) Receiving the frame B from the GNE 20, the NE 31 extracts and forwards the ACT_1.PDU command to a relevant application running on itself, thereby initiating a log-in session.

(S14) After the log-in session is completed, the NE 31 produces a frame C by inserting a C0MPLD response message (referred to as COMP_1.PDU) to its OSI data field. The NE 31 returns this frame C to the GNE 20 through the association SEQ#01.

Figure 16:
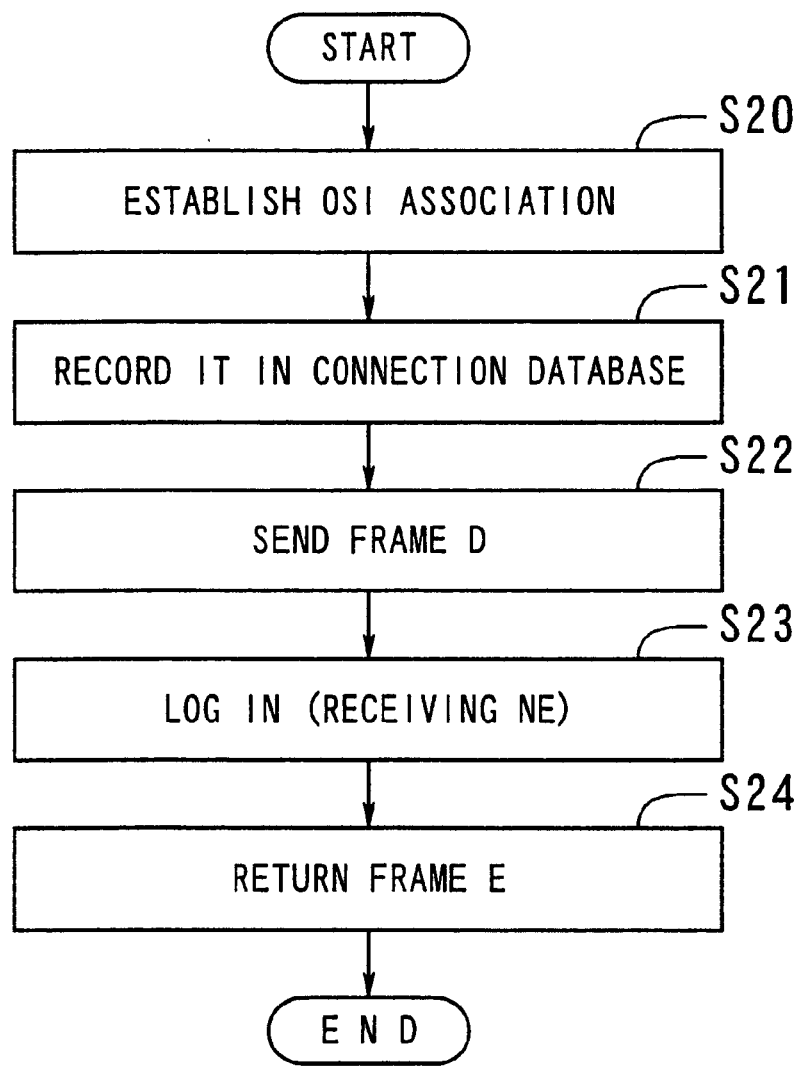
FIG. 16 is a flowchart which shows how frames D and E are exchanged between GNE and NE.

Referring next to the flowchart of FIG. 16, a process of transmitting frames D and E will be described below. The GNE 20 sends a frame D and receives a frame E to/from the NE 32 according to the following steps.

(S20) The GNE 20 obtains the NSAP address of the NE 32 from its local cache memory mentioned in step S7 (FIG. 14). The GNE 20 then establishes an OSI association A2 to reach the NE 32 according to the OSI protocols. This association will be referred to hereafter by its identifier SEQ#02.

(S21) The GNE 20 enters a record to its connection database 23. This record, called "table #2," has the following values: PORT#01, SEQ#02, and NE#2.

(S22) The GNE 20 extracts ACT_2.PDU out of the frame A received from the NMS 10 and assembles a frame D by inserting the extracted ACT_2.PDU to its OSI data field. The GNE 20 then sends this frame D to its destination, NE 32, through the association SEQ#02.

(S23) Receiving the frame D from the GNE 20, the NE 32 extracts and forwards the ACT_2.PDU command to a relevant application running on itself, thereby initiating a log-in session.

(S24) After the log-in session is completed, the NE 32 produces a frame E by inserting a C0MPLD response message (COMP_2.PDU) to its OSI data field. The NE 32 returns this frame E to the GNE 20 through the association SEQ#02.

Figure 17:
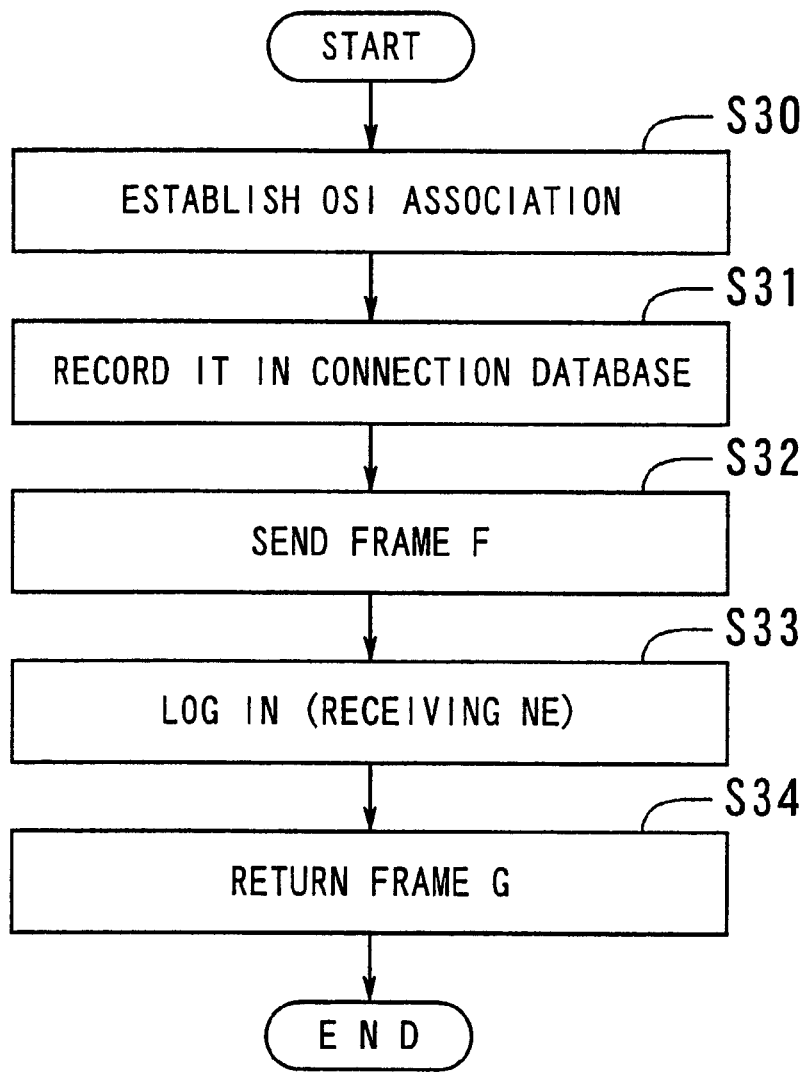
FIG. 17 is a flowchart which shows how frames F and G are exchanged between GNE and NE.

Referring next to the flowchart of FIG. 17, a process of transmitting frames F and G will be described below. The GNE 20 sends a frame F and receives a frame G to/from the NE 33 according to the following steps.

(S30) The GNE 20 obtains the NSAP address of the NE 33 from its local cache memory mentioned in step S7 (FIG. 14). The GNE 20 then establishes an OSI association A3 to reach the NE 33 according to the OSI protocols.

This association will be referred to hereafter by its identifier SEQ#03.

(S31) The GNE 20 enters a record to the connection database 23. This record, called "table #3," has the following values: PORT#01, SEQ#03, and NE#3.

(S32) The GNE 20 extracts ACT_3.PDU out of the frame A received from the NMS 10 and assembles a frame F by inserting the extracted ACT_3.PDU to its OSI data field. The GNE 20 then sends this frame F to its destination, NE 33, through the association SEQ#03.

(S33) Receiving the frame F from the GNE 20, the NE 33 extracts and forwards the ACT_3.PDU command to a relevant application running on itself, thereby initiating a log-in session.

(S34) After the log-in session is completed, the NE 33 produces a frame G by inserting a C0MPLD response message (COMP_3.PDU) to its OSI data field. The NE 33 returns this frame G to the GNE 20 through the association SEQ#03.

Figure 18:
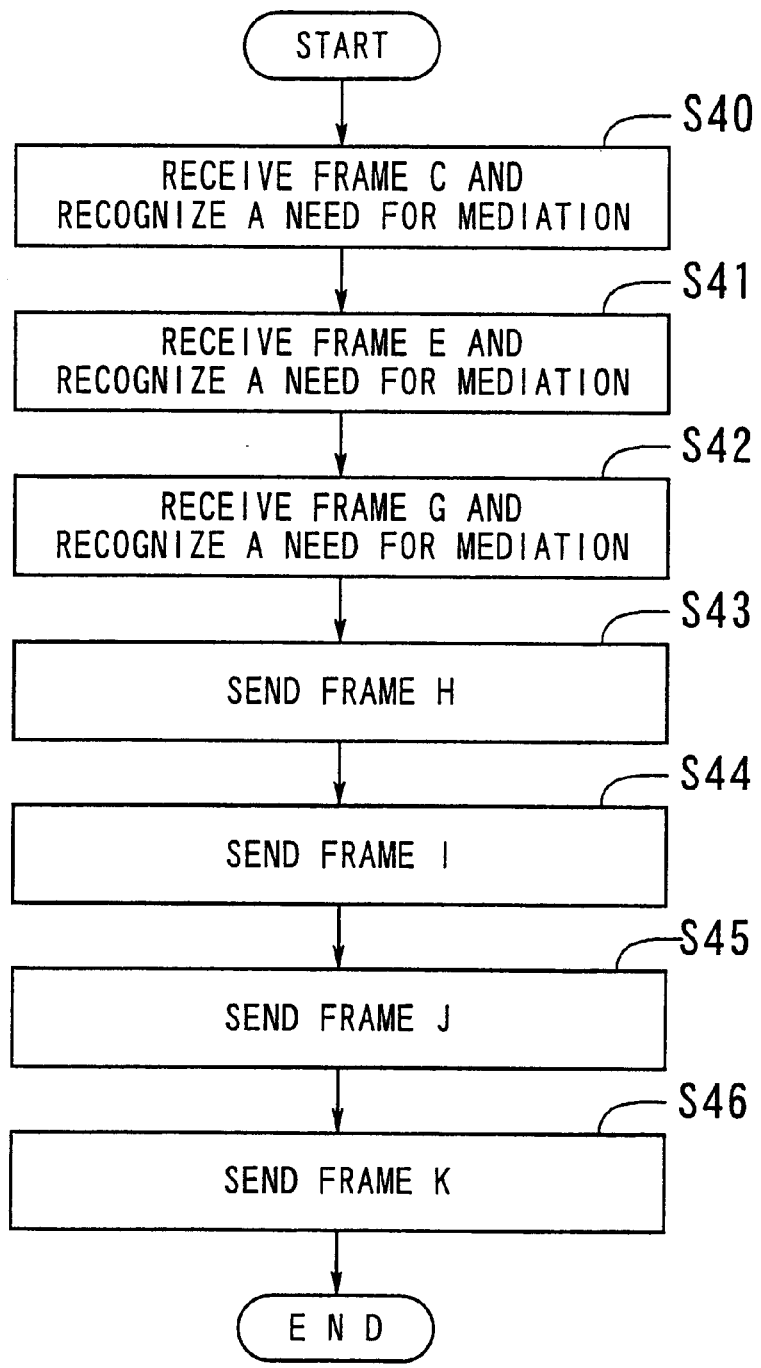
FIG. 18 is a flowchart which shows how frames H, I, J, and K are sent from GNE to NMS.

Referring next to the flowchart of FIG. 18, a process of transmitting frames H, I, J, and K will be described below. The GNE 20 sends these frames back to the NMS 10 according to the following steps.

(S40) Receiving the frame C through SEQ#01, the GNE 20 consults its connection database 23 to find a relevant record (i.e., table). From the table #1, it recognizes that the received frame C should be mediated to PORT#01.

(S41) Receiving the frame E through SEQ#02, the GNE 20 consults its connection database 23 to find a relevant table. From the table #2, it recognizes that the received frame E should be mediated to PORT#01.

(S42) Receiving the frame G through SEQ#03, the GNE 20 consults its connection database 23 to find a relevant table. From the table #3, it recognizes that the received frame G should be mediated to PORT#01.

(S43) When the log-in session at step S5 (FIG. 14) is completed, the GNE 20 produces a frame H by inserting a C0MPLD message (COMP_G.PDU) into its TCP/IP data field. The GNE 20 then sends out this frame H to the NMS 10, through the connection PORT#01.

(S44) Regarding the received frame C, the GNE 20 produces a frame I by inserting a COMP_1.PDU message to the TCP/IP data field. The GNE 20 then sends out this frame I to the NMS 10, through the connection PORT#01 that it has recognized at step S40.

(S45) Regarding the received frame E, the GNE 20 produces a frame J by inserting a COMP_2.PDU message to the TCP/IP data field. The GNE 20 then sends out this frame J to the NMS 10, through the connection PORT#01 that it has recognized at step S41.

(S46) Regarding the received frame G, the GNE 20 produces a frame K by inserting a COMP_3.PDU message to the TCP/IP data field. The GNE 20 then sends out this frame K to the NMS 10, through the connection PORT#01 that it has recognized at step S42.

Figure 19:
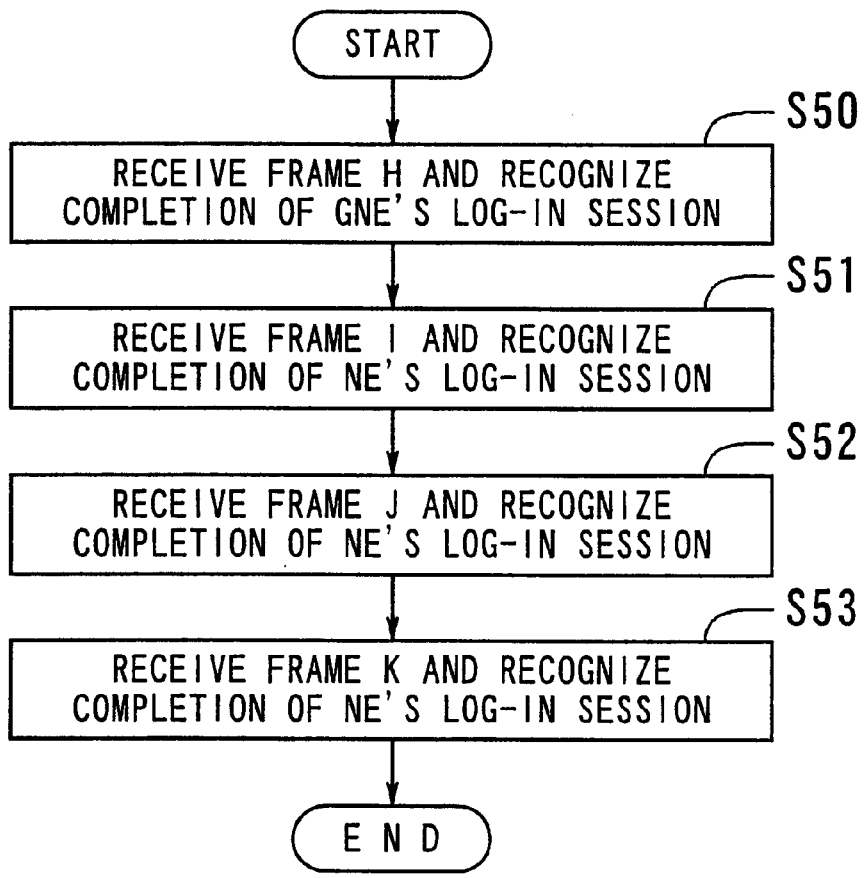
FIG. 19 is a flowchart which shows how the NMS receives frames H, I, J, and K.

Referring next to the flowchart of FIG. 19, a process of receiving frames H, I, J, and K will be described below. The NMS 10 receives these frames according to the following steps.

(S50) Receiving the frame H through PORT#01, the NMS 10 examines the TID contained in the received COMP_G.PDU message. From this TID value "GNE#0," the NMS 10 recognizes that the frame H is a response from the GNE 20 to indicate the completion of its log-in session.

(S51) Receiving the frame I through PORT#01, the NMS 10 examines the TID contained in the received COMP_1.PDU message. From this TID value "NE#1," the NMS 10 recognizes that the frame I is a response from the NE 31 to indicate the completion of its log-in session.

(S52) Receiving the frame J through PORT#01, the NMS 10 examines the TID contained in the received COMP_1.PDU message. From this TID value "NE#2," the NMS 10 recognizes that the frame J is a response from the NE 32 to indicate the completion of its log-in session.

(S53) Receiving the frame K through PORT#01, the NMS 10 examines the TID contained in the received COMP_1.PDU message. From this TID value "NE#3," the NMS 10 recognizes that the frame K is a response from the NE 33 to indicate the completion of its log-in session.

Referring next to FIGS. 20 to 25, the detailed formats of the above described frames will be described below.

Figure 20:
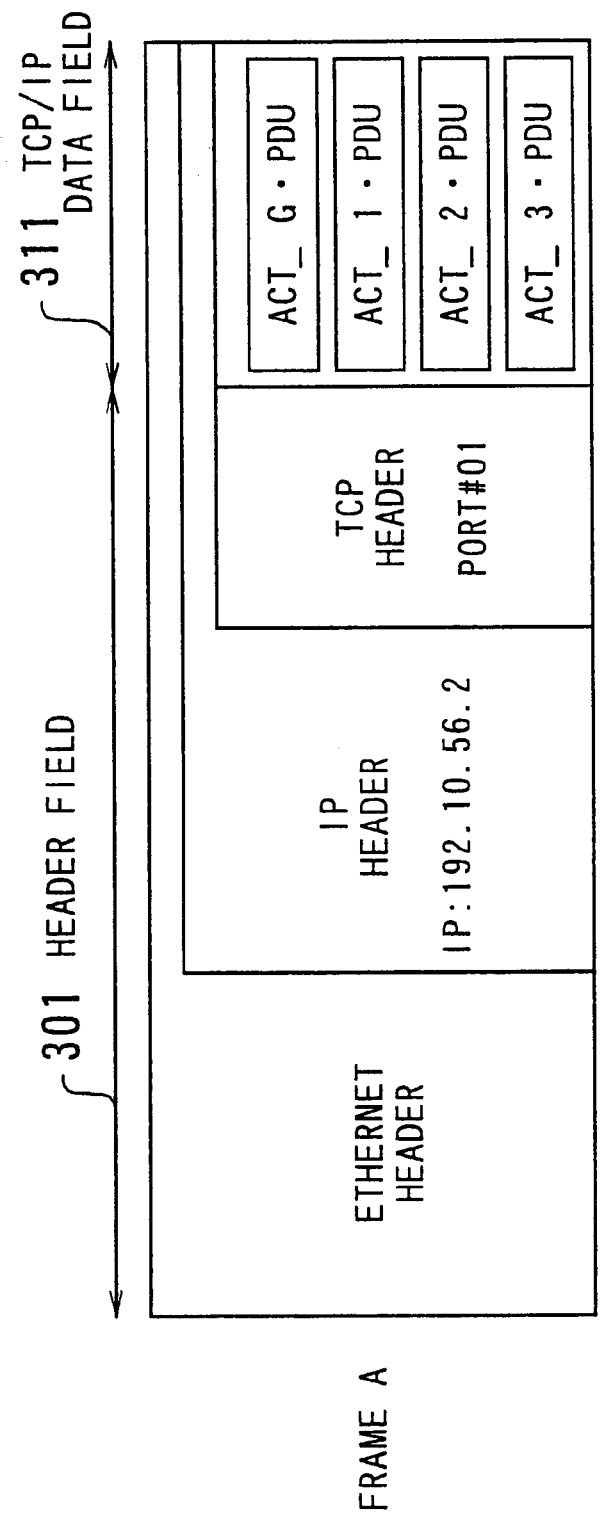
FIG. 20 is a diagram which shows the structure of a frame A.

First, FIG. 20 shows the structure of frame A. The frame A consists of a header field 301 and a TCP/IP data field 311. The header field 301 comprises the following sub-fields: Ethernet header, IP header, and TCP header. The IP header contains "192.10.56.2" as the GNE 20's IP address, while the TCP header carries the identifier PORT#01 of the TCP connection C0 being established between the NMS 10 and GNE 20. The TCP/IP data field 311 holds the following command information: ACTG.PDU addressed to the GNE 20, ACT_1.PDU addressed to the NE 31, ACT_2.PDU addressed to the NE 32, and ACT_3.PDU addressed to the NE 33.

FIGS. 21(A) and 21(B) show the structures of frames B and C, respectively. Referring first to FIG. 21(A), the frame B consists of a header field 401 and an OSI data field 411. The header field 401 comprises the following sub-fields: Ethernet header, CLNP header, and TP4 header. The CLNP header contains "NSAP001" as the NSAP address of the NE 31, while the TP4 header carries the identifier SEQ#01 of the OSI association A1 being established between the GNE 20 and NE 31. The OSI data field 411 holds an ACT_1.PDU command addressed to the NE 31. Referring to FIG. 21(B), the frame C consists of a header field 401a and an OSI data field 411a. The header field 401a comprises the following sub-fields: Ethernet header, CLNP header, and TP4 header. The CLNP header contains "NSAP000" as the NSAP address of the GNE 20, while the TP4 header carries the identifier SEQ#01 of the OSI association A1 being established between the GNE 20 and NE 31. The OSI data field 411a carries a COMP_1.PDU message addressed to the GNE 20.

FIGS. 22(A) and 22(B) show the structures of frames D and E, respectively. Referring first to FIG. 22(A), the frame D consists of a header field 402 and an OSI data field 421. The header field 402 comprises the following sub-fields: Ethernet header, CLNP header, and TP4 header. The CLNP header contains "NSAP002" as the NSAP address of the NE 32, while the TP4 header carries the identifier SEQ#02 of the OSI association A2 being established between the GNE 20 and NE 32. The OSI data field 421 carries an ACT_2.PDU command addressed to the NE 32. Referring to FIG. 22(B), the frame E consists of a header field 402a and an OSI data field 421a. The header field 402a comprises the following multiple sub-fields: Ethernet header, CLNP header, and TP4 header. The CLNP header contains "NSAP000" as the NSAP address of the GNE 20, while the TP4 header carries the identifier SEQ#02 of the OSI association A2 being established between the GNE 20 and NE 32. The OSI data field 421a carries a COMP_2.PDU message addressed to the GNE 20.

FIGS. 23(A) and 23(B) show the structures of frames F and G, respectively. Referring first to FIG. 23(A), the frame F consists of a header field 403 and an OSI data field 431. The header field 403 comprises the following multiple sub-fields: Ethernet header, CLNP header, and TP4 header. The CLNP header contains "NSAP003" as the NSAP address of the NE 33, while the TP4 header carries the identifier SEQ#03 of the OSI association A3 being established between the GNE 20 and NE 33. The OSI data field 431 carries an ACT_3.PDU command addressed to the NE 33. Referring to FIG. 23(B), the frame G consists of a header field 403a and an OSI data field 431a. The header field 403a comprises the following multiple sub-fields: Ethernet header, CLNP header, and TP4 header. The CLNP header contains "NSAP000" as the NSAP address of the GNE 20, while the TP4 header carries the identifier SEQ#03 of the OSI association A3 being established between the GNE 20 and NE 33. The OSI data field 431a carries a COMP_3.PDU message addressed to the GNE 20.

FIGS. 24(A) and 24(B) show the structures of frames H and I, respectively. Referring first to FIG. 24(A), the frame H consists of a header field 301a and a TCP/IP data field 311a-1. The header field 301a comprises the following multiple sub-fields: Ethernet header, IP header, and TCP header. The IP header contains "192.10.56.1" as the IP address of the NMS 10, while the TCP header carries the identifier PORT#01 of the TCP connection C0 being established between the NMS 10 and GNE 20. The TCP/IP data field 311a-1 carries a COMP_G.PDU message addressed to the NMS 10. Referring to FIG. 24(B), each frame I consists of a header field 301a (as in the above-described frame H) and a TCP/IP data field 311a-2. The TCP/IP data field 311a-2 carries a COMP_1.PDU message addressed to the NMS 10.

FIGS. 25(A) and 25(B) show the structures of frames J and K, respectively. Referring first to FIG. 25(A), the frame J consists of a header field 301a and a TCP/IP data field 311a-3. The TCP/IP data field 311a-3 carries a COMP_2.PDU message addressed to the NMS 10. Referring to FIG. 25(B), each frame K consists of a header field 301a and a TCP/IP data field 311a-4. The TCP/IP data field 311a-4 carries a COMP_3.PDU message addressed to the NMS 10.

Figure 26:
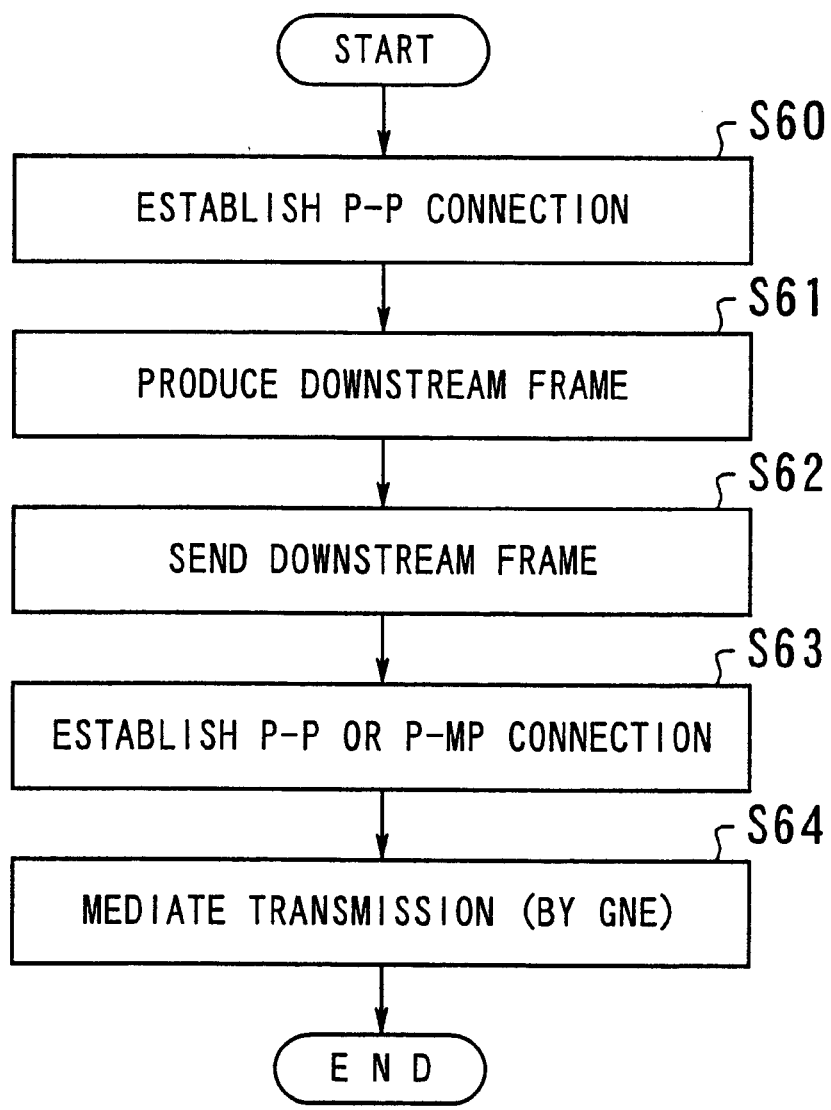
FIG. 26 is a flowchart which shows an internetworking method according to the present invention.

While the above section has discussed the internetworking system, the following section will now present an internetworking method according to the present invention. FIG. 26 is a flowchart which shows how the proposed method will be executed. It is assumed here that a network management station (NMS) and a gateway network element (GNE) are on a first network, and the GNE is linked with at least one network element (NE) over a second network. The first and second networks use different communication protocols. The proposed internetworking method comprises the following steps.

(S60) A first connection is established in the first network. This first connection is a point-to-point (P-P) connection which links the NMS with the GNE.

(S61) The NMS produces a downstream frame containing the identifier of an NE to be reached.

(S62) The NMS transmits a downstream frame through the first connection. The NMS also processes upstream frames received from the GNE through the first connection.

(S63) The GNE establishes a second connection on the second network to reach the NE that is specified by the identifier. This second connection is either a point-to-point or a point-to-multipoint (P-MP) connection.

(S64) The GNE mediates the transmission of the produced downstream frame to the NE through the second connection. The GNE also receives upstream frames from the NE through the second connection and forwards them to the upstream device, thereby mediating upstream transmission.

To make the above processing possible, the GNE employs a connection database which records at least one of the following items: the identifier of the first connection, the identifier of the second connection, and the identifier of the target NE. Based on this connection database, the GNE translates different protocols of the first and second networks, thereby mediating between those networks.

As described thus far, the internetworking system 1 and internetworking method realize the communication between an NMS 10 and remote NEs on a different network by interposing a GNE 20 with enhanced features according to the invention. Since this GNE 20 provides network mediation functions, the NMS 10 need not to coordinate other mediation devices for remote access. Another advantage of the present invention is that it does not require any changes in the protocols implemented in the NMS 10 and individual NEs. Still another advantage of the invention is that the NMS 10 only has to set up a single connection, even when it communicates with a plurality of remote NEs on a plurality of networks. That is, the NMS 10 can send such a frame that is addressed to a plurality of NEs at a time, without the need for troublesome management of multiple connections. This feature will contribute to improved network performance.

The next section will now describe an internetworking system 100, another embodiment of the present invention. Unlike the internetworking system 1, which mediates between two networks using different protocols, this system 100 enables a network management station to communicate with a remote network element beyond two or more incompatible networks.

Figure 27:
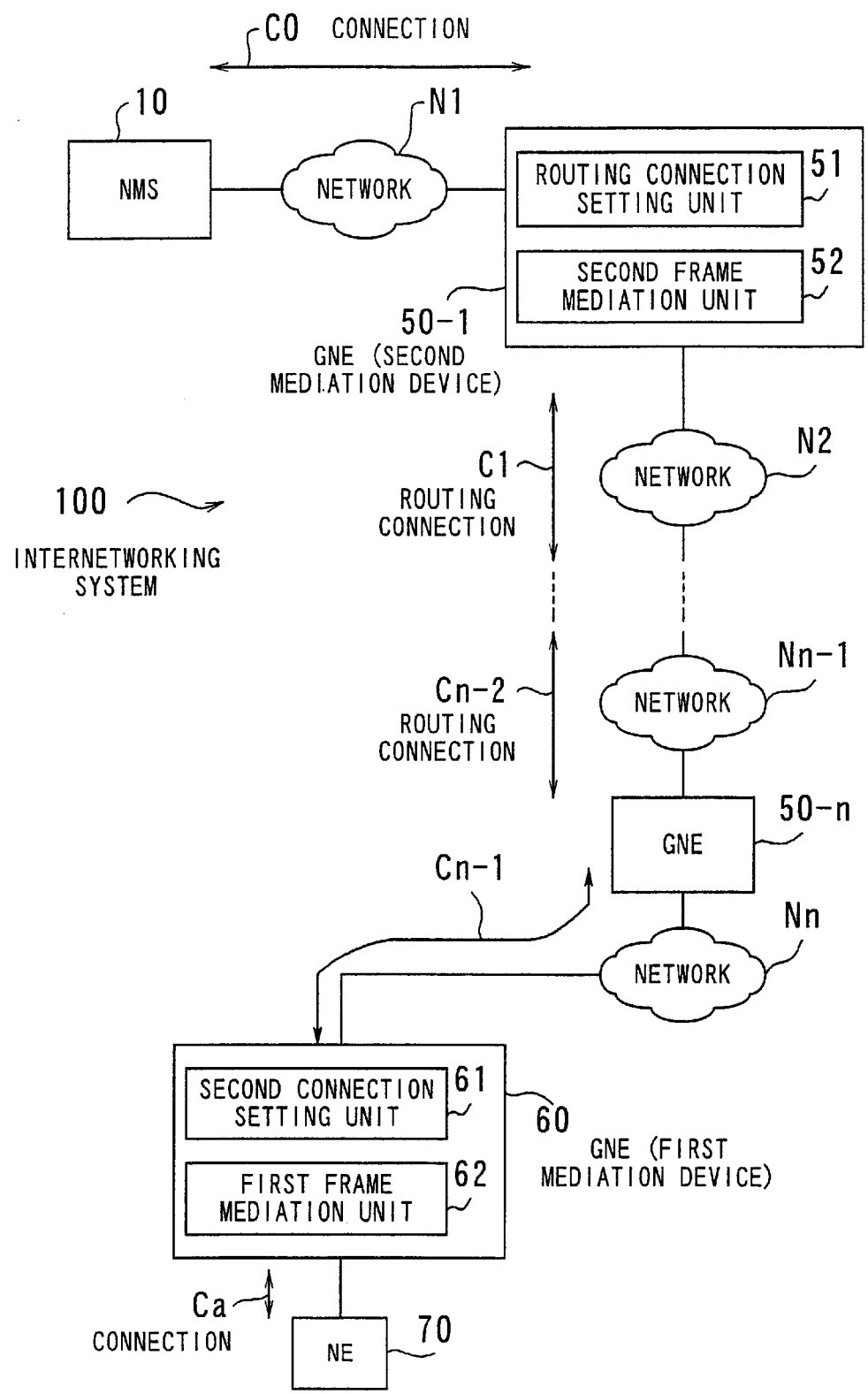
FIG. 27 is a conceptual view of another internetworking system according to the present invention.

FIG. 27 provides a conceptual view of the internetworking system 100 according to the present invention. This system 100 comprises: a network management station (NMS) 10; a gateway network element (GNE) 60 serving as a first mediation device; a network element (NE) 70 which is linked to the GNE 60 and reachable from the NMS 10; and a plurality of GNEs 50-1 to 50-n serving as second mediation devices. The NMS 10 provides the same functions as described earlier in FIG. 1. While FIG. 27 shows only one NE, any number of network elements can be connected to the GNE 60 or intermediary GNEs 50-1 to 50-n.

The NMS 10 and GNE 50-1 are interconnected via a network N1. The GNEs 50-1 to 50-n are linked in series via networks N2 to Nn-1. Further, the last GNE 50-n is connected to the GNE 60 through a network Nn. The protocols used in the networks N1 to Nn may be different from each other, or some of them may be the same. Although all network elements are arranged in a linear topology in the system of FIG. 27, it is not intended to limit the preferred embodiment to this particular topology.

As FIG. 27 shows, the GNE 60 comprises a second connection setting unit 61 and a first frame mediation unit 62. The second connection setting unit 61 sets up a point-to-point connection Ca (second connection) extending to the NE 70. (If the NMS 10 has to interact with two or more like NEs in the neighborhood of the GNE 60, the second connection setting unit 61 will establish a point-to-multipoint connection, instead of a point-to-point connection.) The first frame mediation unit 62 mediates the transport of downstream and upstream frames through the connection Ca.

On the other hand, each of the GNEs 50-1 to 50-n has a routing connection setting unit 51 and a second frame mediation unit 52. With their routing control capability, the routing connection setting units 51 establish routing connections C1 to Cn-1 toward the GNE 60. The second frame mediation units 52 mediate the transport of downstream and upstream frames through those routing connections C1 to Cn-1.

Figure 28:
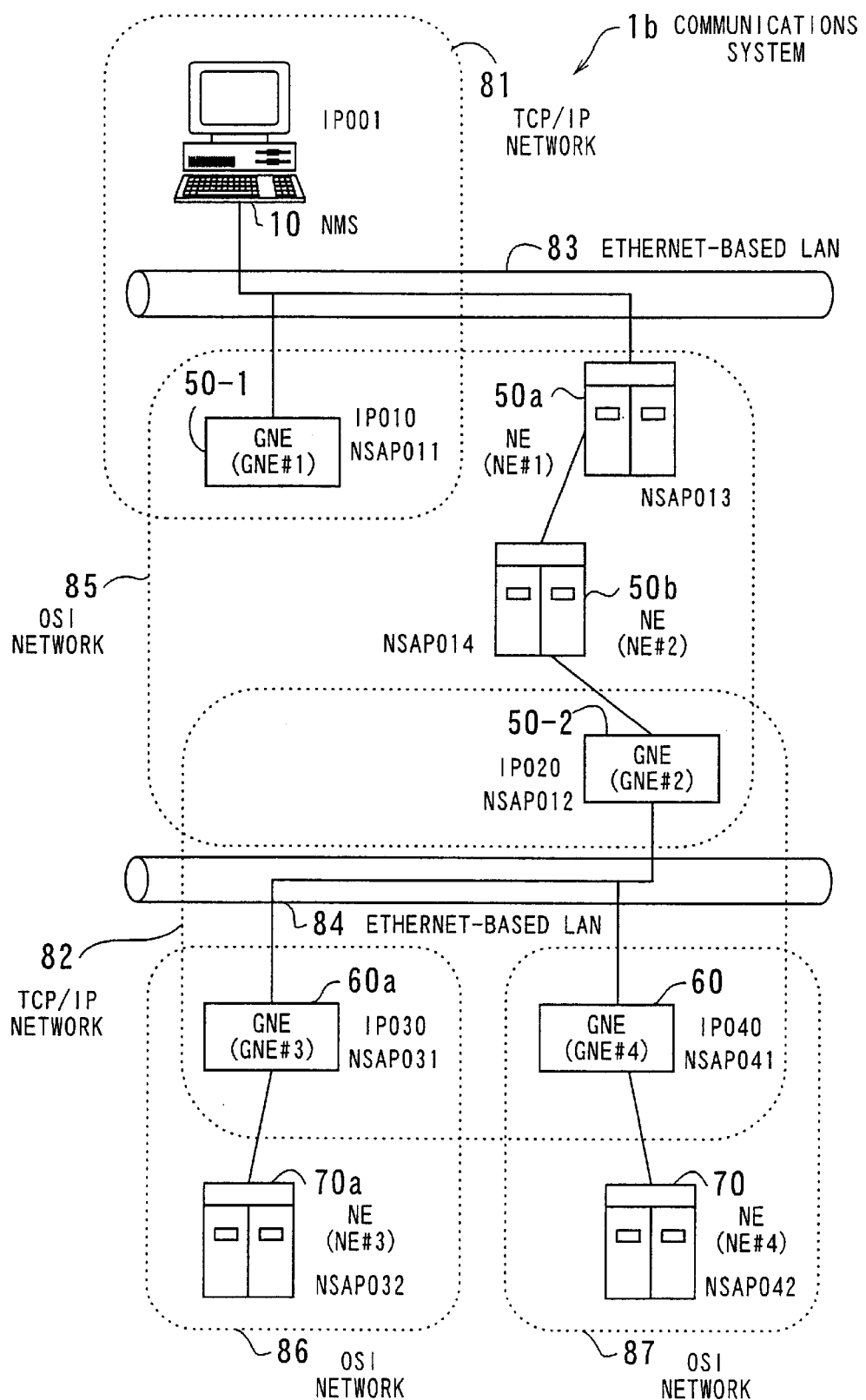
FIG. 28 is a diagram showing the structure of another communications system where the present invention is implemented.

Referring next to FIG. 28, a specific communications system will now be described below, as an implementation of the above internetworking system 100 according to the present invention. This communications system 1b provides a heterogeneous network environment including two TCP/IP networks 81 and 82, two Ethernet-based LANs 83 and 84, and three OSI networks 85 to 87. The first TCP/IP network 81 includes an NMS 10 and GNE 50-1 as its network nodes. The first OSI network 85 includes the GNE 50-1 and another GNE 50-2, as well as two NEs 50a and 50b. The second TCP/IP network 82 includes the GNE 50-2 and two other GNEs 60 and 60a. The second OSI network 86 includes the GNE 60a and an NE 70a. The third OSI network 87 includes the GNE 60 and an NE 70. The NMS 10, GNE 50-1, and NE 50a are interconnected by the Ethernet-based LAN 83. The NE 50a, NE 50b, and GNE 50-2 are linked together. Also, the GNE 50-2 is linked with the GNEs 60a and 60 through the Ethernet-based LAN 84. Further, the GNE 60a is linked with the NE 70a, and the GNE 60 is linked with the NE 70. Transmission media used in this system include fiber optic cables.

In terms of the communication protocols, the system 1b is configured as follows. The NMS 10 employs a TCP/IP protocol stack, while the NEs 50a, 50b, 70a, and 70 have an OSI protocol stack. Further, the GNEs 50-1, 50-2, 60a, and 60 are armed with both TCP/IP and OSI protocol stacks.

The GNE 50-1 mediates the communication between the TCP/IP network 81 and OSI network 85 via the Ethernet-based LAN 83. The GNE 50-2 mediates between the OSI network 85 and TCP/IP network 82. The GNE 60a mediates between the TCP/IP network 82 and OSI network 86 via the Ethernet-based LAN 84. Further, the GNE 60 mediates between the TCP/IP network 82 and OSI network 87 via the Ethernet-based LAN 84.

The GNEs 50-1, 50-2, 60a, and 60, and NEs 50a, 50b, 70a, and 70 have their own target identifiers (TIDs), allowing application entities to uniquely identify each of those network elements. More specifically, the GNE 50-1 has its unique TID "GNE#1." Likewise, the other GNEs 50-2, 60a, and 60 have their own TIDs "GNE#2," "GNE#3," and "GNE#4," respectively. Further, the NEs 50a, 50b, 70a, and 70 have their own TIDs "NE#1," "NE#2," "NE#3," and "NE#4," respectively.

For illustrative purposes, it is assumed that the NMS 10 and GNE 50-1 have their respective IP addresses "IP001" and "IP010" in the domain of the TCP/IP network 81. It is also assumed that the GNE 50-2, GNE 60a, and GNE 60 have their respective IP addresses "IP020," "IP030," and "IP040" in the domain of the TCP/IP network 82. With respect to the OSI network services, suppose that, within the OSI network 85, the GNE 50-1, 50-2, NE 50a, 50b are identified by NSAP addresses "NSAP011," "NSAP012," "NSAP013," "NSAP014," respectively. It is also assumed that, within the OSI network 86, the GNE 60a, NE 70a are referred to by their respective NSAP addresses "NSAP031" and "NSAP032." Within the OSI network 87, the GNE 60 and NE 70 are given their NSAP addresses "NSAP041" and "NSAP042."

Consider here that, in the communications system 1b, the NMS 10 sends an ACT-USER command toward the NE 70 on the OSI network 87 to initiate its log-in session. In response to this command, the NE 70 returns a COMPLD message to the NMS 10 to indicate a response to the ACT-USER command. The following section will provide the details of this scenario.

Figure 29:
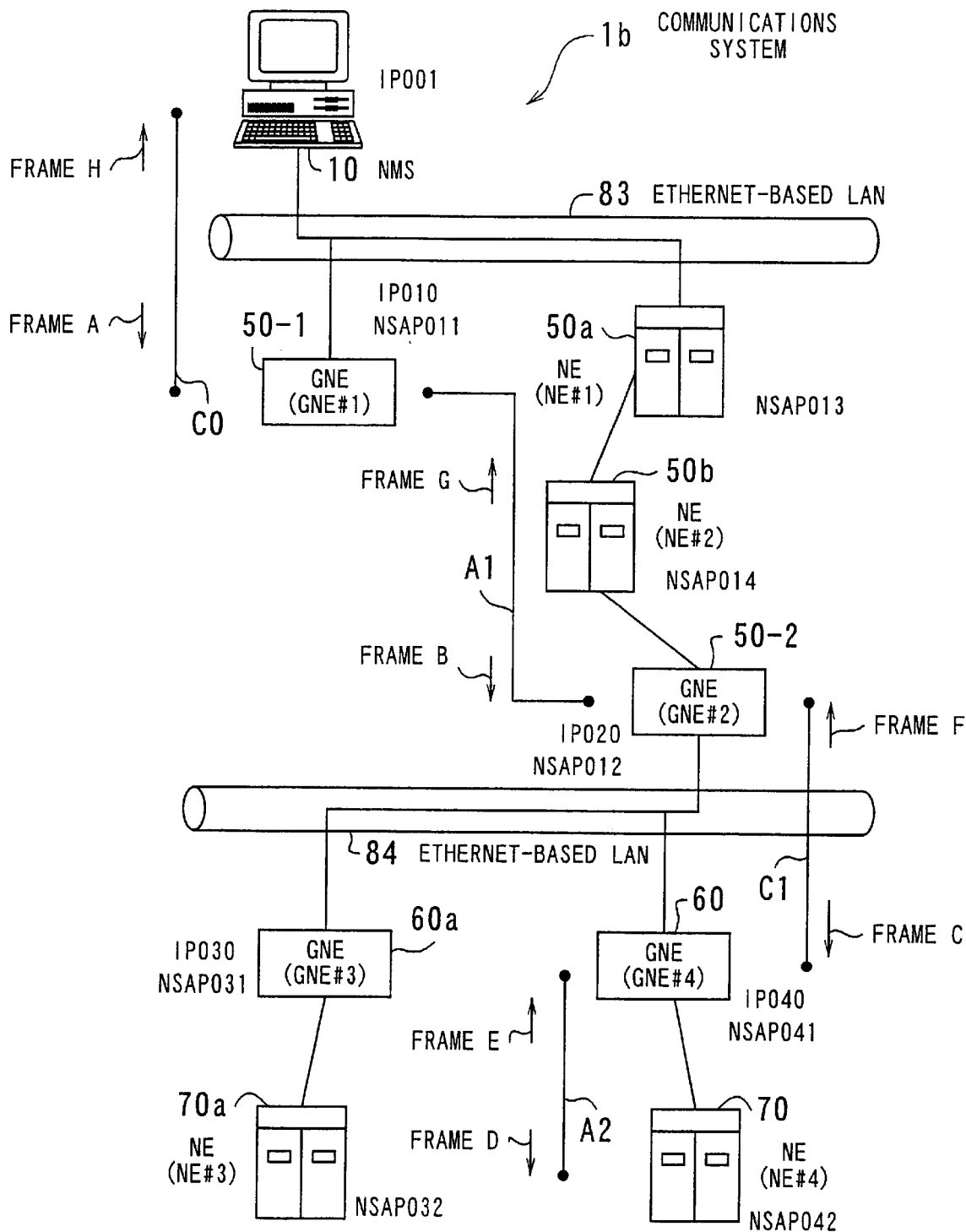
FIG. 29 is a diagram showing a situation where several TCP/IP connections and OSI associations have been established.

FIG. 29 shows a situation where necessary TCP/IP connections and OSI associations have been established. More specifically, the following connections are available in the system 1b:

TCP/IP connection C0 (first connection) between NMS 10 and GNE 50-1

OSI association A1 (routing connection) between GNE 50-1 and GNE 50-2.

TCP/IP connection C1 (routing connection) between GNE 50-2 and GNE 60

OSI association A2 (second connection) between GNE 60 and NE 70

FIG. 29 also shows various frames flowing over the above connections. More specifically, "Frame A" denotes a downstream frame to be sent from the NMS 10 to the GNE 50-1.

"Frame B" denotes a downstream frame to be sent from the GNE 50-1 to the GNE 50-2. "Frame C" denotes a downstream frame to be sent from the GNE 50-2 to the GNE 60. "Frame D" denotes a downstream frame to be sent from the GNE 60 to the NE 70. "Frame E" denotes an upstream frame to be sent from the NE 70 to the GNE 60. "Frame F" denotes an upstream frame to be sent from the GNE 60 to the GNE 50-2. "Frame G" denotes an upstream frame to be sent from the GNE 50-2 to the GNE 50-1. "Frame H" denotes an upstream frame to be sent from the GNE 50-1 to the NMS 10. The detailed structures of those frames A to H will now be explained below, with reference to FIGS. 30(A) to 33(B),.

Figure 30A:
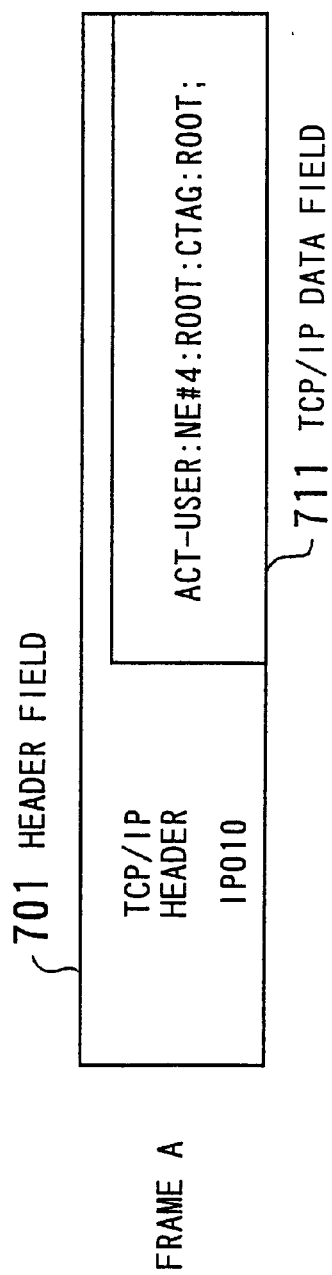
FIG. 30(A) is a diagram which shows the structure of a frame A.
Figure 30B:
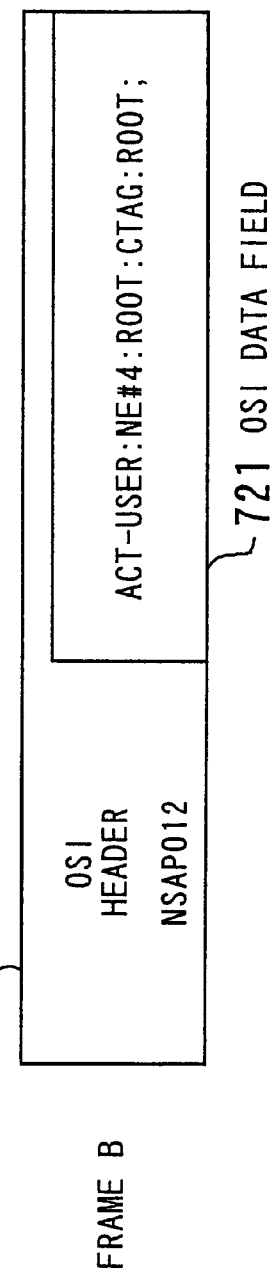
FIG. 30(B) is a diagram which shows the structure of a frame B.
Figure 32:
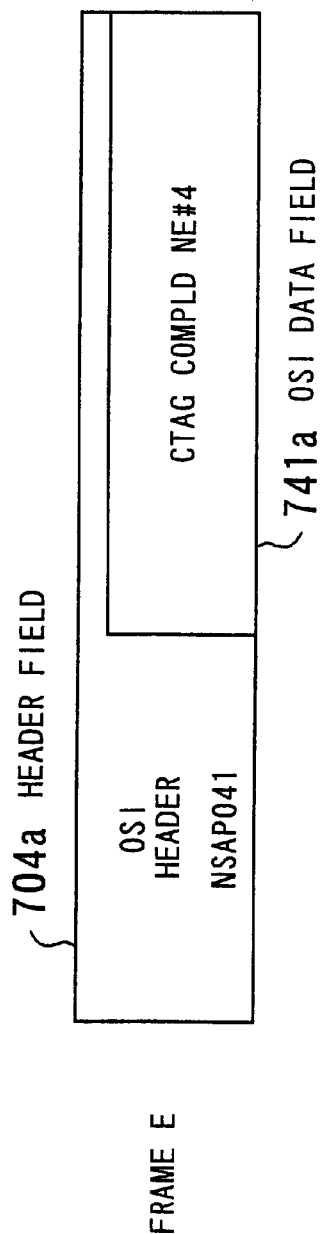
FIG. 32(A) is a diagram which shows the structure of a frame E.
FIG. 32(B) is a diagram which shows the structure of a frame F.
Figure 32:
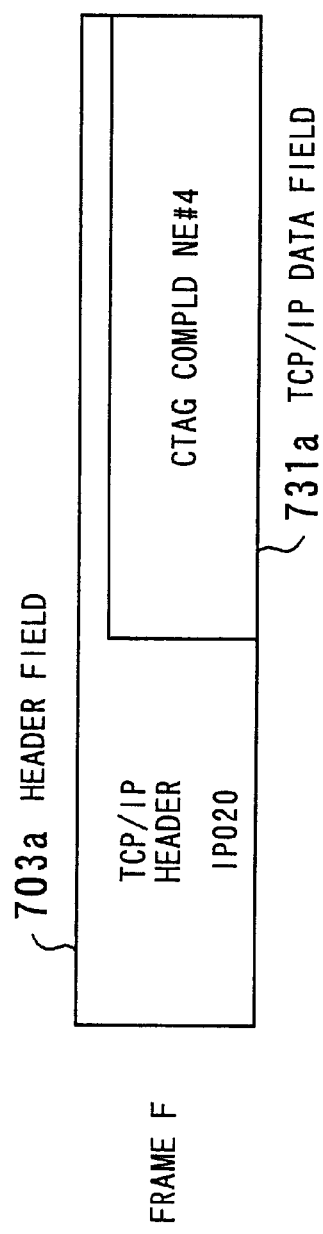

FIGS. 30(A) and 30(B) show the structures of frames A and B, respectively. Referring first to FIG. 30(A), the frame A consists of a header field 701 and a TCP/IP data field 711. The header field 701 carries a TCP/IP header containing an address "IP010." This address value indicates that the frame is destined for the GNE 50-1. The TCP/IP data field 711 carries an ACT-USER command message addressed to the NE 70. More specifically, the command line reads as follows:

ACT-USER:NE#4:ROOT:CTAG:ROOT;

Referring to FIG. 30(B), the frame B consists of a header field 702 and an OSI data field 721. The header field 702 carries an OSI header containing an address "NSAP012." This address value indicates that the frame is directed to the GNE 50-2. The OSI data field 721 carries an ACT-USER command message addressed to the NE 70, whose actual command line reads as follows:

ACT-USER:NE#4:ROOT:CTAG:ROOT;

FIGS. 31(A) and 31(B) show the structures of frames C and D, respectively. Referring first to FIG. 31(A), the frame C consists of a header field 703 and a TCP/IP data field 731. The header field 703 carries a TCP/IP header containing an address "IP040," which indicates that the frame is directed to the GNE 60. The TCP/IP data field 731 carries an ACT-USER command message addressed to the NE 70, whose actual command line reads as follows:

ACT-USER:NE#4:ROOT:CTAG:ROOT;

Referring to FIG. 31(B), the frame D consists of a header field 704 and an OSI data field 741. The header field 704 carries an OSI header containing an address "NSAP042," which indicates that the frame is directed the NE 70. The OSI data field 741 carries an ACT-USER command message addressed to the NE 70, whose actual command line reads as follows:

ACT-USER:NE#4:ROOT:CTAG:ROOT;.

FIGS. 32(A) and 32(B) show the structures of frames E and F, respectively. Referring first to FIG. 32(A), the frame E consists of a header field 704a and an OSI data field 741a. The header field 704a carries an OSI header containing an address "NSAP041," which indicates that the frame is directed to the GNE 60. The OSI data field 741a carries a C0MPLD response message addressed to the NMS 10, whose actual command line reads as follows:

CTAG C0MPLD NE#4.

Referring to FIG. 32(B), the frame F consists of a header field 703a and a TCP/IP data field 731a. The header field 703a carries a TCP/IP header containing an address "IP020," which indicates that the frame is directed to the GNE 50-2. The TCP/IP data field 731a carries a C0MPLD response message addressed to the NMS 10, whose actual command line reads as follows:

CTAG C0MPLD NE#4.

FIGS. 33(A) and 33(B) show the structures of frames G and H, respectively. Referring first to FIG. 33(A), the frame G consists of a header field 702a and an OSI data field 721a. The header field 702a carries an OSI header containing an address NSAP011, which indicates that the frame is directed to the GNE 50-1. The OSI data field 721a carries a C0MPLD response message addressed to the NMS 10, whose actual command line reads as follows:

CTAG C0MPLD NE#4.

Referring to FIG. 33(B), the frame H consists of a header field 701a and a TCP/IP data field 711a. The header field 701a carries a TCP/IP header containing an address "IP001," which indicates that the frame is directed to the NMS 10. The TCP/IP data field 711a carries a C0MPLD response message addressed to the NMS 10, whose actual command line reads as follows:

CTAG C0MPLD NE#4.

Figure 34:
FIG. 34 is a diagram which shows a database.

FIG. 34 shows a database T1 that the GNE 50-2 owns. This database T1 has two data fields to record IP addresses and TIDs. For instance, the first entry of the database T1 records a combination of IP address "IP030" and its corresponding TID "GNE#3."

Referring now to the flowcharts of FIGS. 35 to 38, the following section will now describe how a command message is delivered from the NMS 10 to the NE 70.

Figure 35:
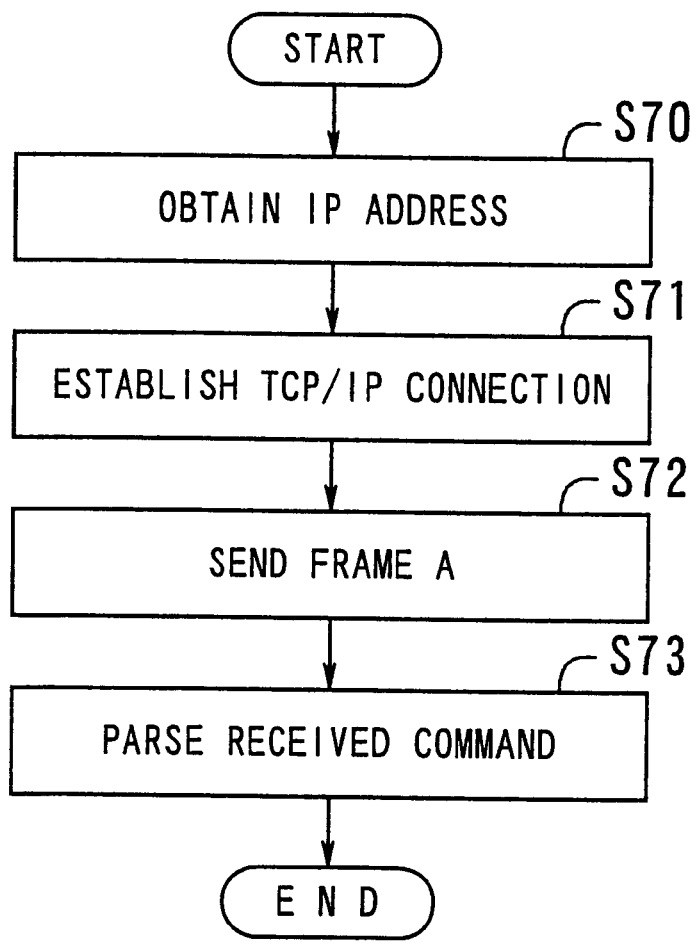
FIG. 35 is a flowchart which shows how a frame A is sent from NMS to GNE.

FIG. 35 is a flowchart which shows how the NMS 10 sends a frame A to the GNE 50-1. In the following sequence, the step S71 is executed actually by the first connection setting unit 11 in the NMS 10.

(S70) The NMS 10 obtains the IP address "IP010" of the GNE 50-1 by searching its local database, or by receiving information from a user.

(S71) With this IP address "IP010," the NMS 10 sets up a TCP/IP connection C0 to reach the GNE 50-1 according to the TCP/IP protocol.

(S72) The NMS 10 produces a frame A by inserting an ACT-USER command with a TID value "NE#4" into its TCP/IP data field 711. The NMS 10 transmits this frame A to the GNE 50-1 through the established TCP/IP connection C0.

(S73) Upon receipt of the frame A, the GNE 50-1 parses the command line extracted from its TCP/IP data field 711, according to the TCP/IP protocol specifications.

Figure 36:
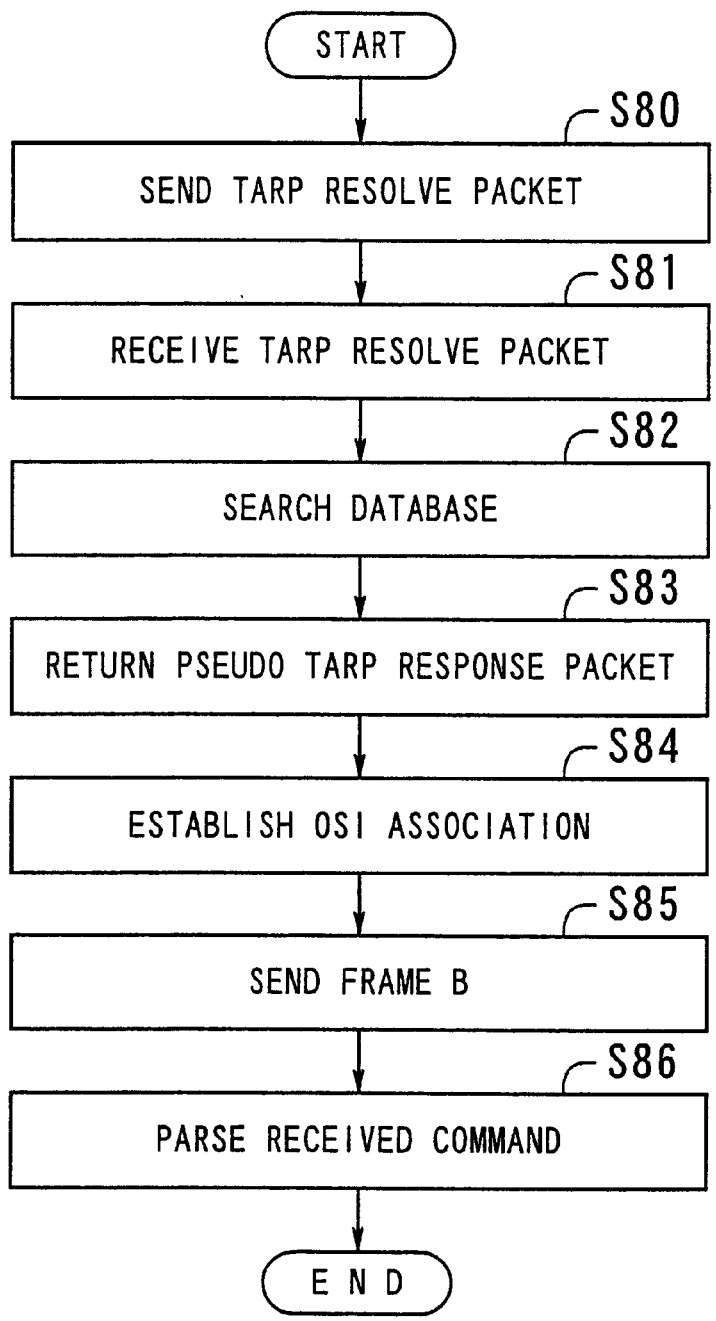
FIG. 36 is a flowchart which shows how a frame B is sent from one GNE to another GNE.

FIG. 36 is a flowchart which shows how a frame B is sent from the GNE 50-1 to the GNE 50-2. In the following sequence, the step S84 (i.e., set-up of OSI association A1) is executed by the routing connection setting unit 51 in the GNE 50-1.

(S80) The received command has a TID value "NE#4." Comparing this value with its own TID, the GNE 50-1 understands that the command is destined for some other network element. Now that the NSAP address corresponding to this TID is needed, the GNE 50-1 broadcasts a TARP resolve packet over the OSI network 85, according to the OSI protocol specifications. As part of the OSI protocols, the TARP resolve packets are used to get the NSAP address associated with a specific TID.

(S81) Receiving the TARP resolve packet, the GNE 50-2 understands that the GNE 50-1 is seeking the NSAP address associated with NE#4.

(S82) The GNE 50-2 searches its local database T1, thus finding out that the target network element having the TID "NE#4" is located on a remote network that is reachable through the GNE 60.

(S83) The GNE 50-2 sends back to the GNE 50-1 a pseudo TARP response packet containing the NSAP address "NSAP012" of the GNE 50-2 itself.

(S84) The GNE 50-1 receives the pseudo TARP response packet. With the NSAP address "NSAP012" obtained from this packet, the GNE 50-1 sets up an OSI association A1 reaching the GNE 50-2, according to the OSI protocol.

(S85) The GNE 50-1 produces a frame B by inserting an ACT-USER command with a TID "NE#4" into its OSI data field 721. It then transmits this frame B to the GNE 50-2 through the pre-established OSI association A1.

(S86) Upon receipt of the frame B, the GNE 50-2 parses the command line extracted from its OSI data field 721, according to the OSI protocol specifications.

Figure 37:
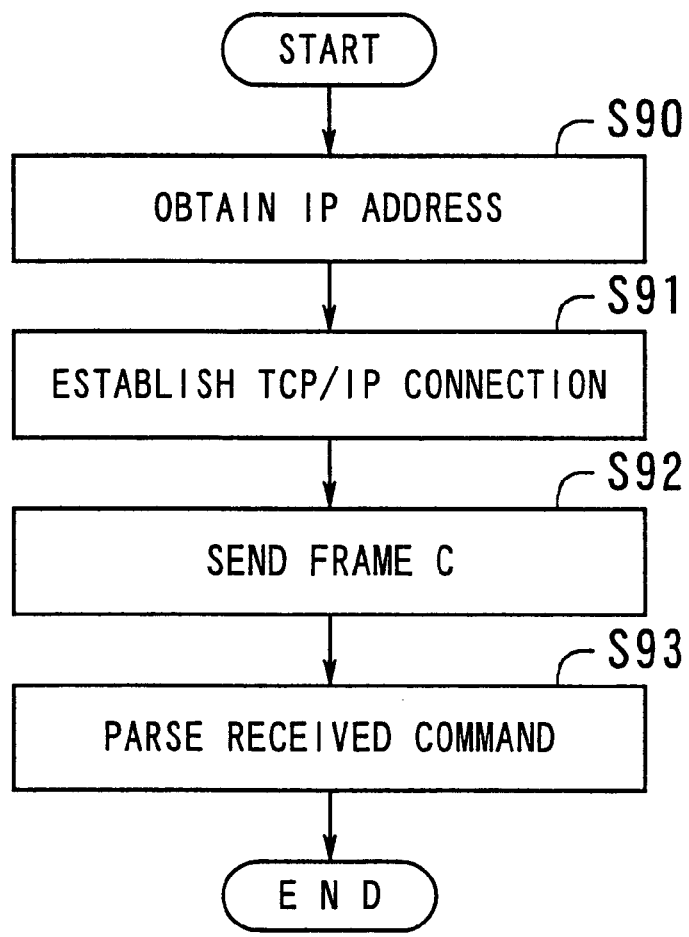
FIG. 37 is a flowchart which shows how a frame C is sent from one GNE to another GNE.

FIG. 37 is a flowchart which shows how a frame C is sent from the GNE 50-2 to the GNE 60. In the following sequence, the step S91 (i.e., set-up of TCP/IP association C1) is executed by the routing connection setting unit 51 in the GNE 50-2.

(S90) The received command has a TID value "NE#4." Comparing this value with its own TID, the GNE 50-2 understands that the command is destined for some other network element. The GNE 50-2 collects an IP address "IP040" from the GNE 60.

(S91) According to the TCP/IP protocols, the GNE 50-2 sets up a TCP/IP connection C1 reaching the GNE 60.

(S92) The GNE 50-2 produces a frame C by inserting an ACT-USER command with a TID "NE#4" into its TCP/IP data field 731. It then transmits this frame C to the GNE 60 through the established TCP/IP connection C1.

(S93) Upon receipt of the frame C, the GNE 60 extracts a command from the TCP/IP data field 731 and parses it according to the TCP/IP protocol specifications.

Figure 38:
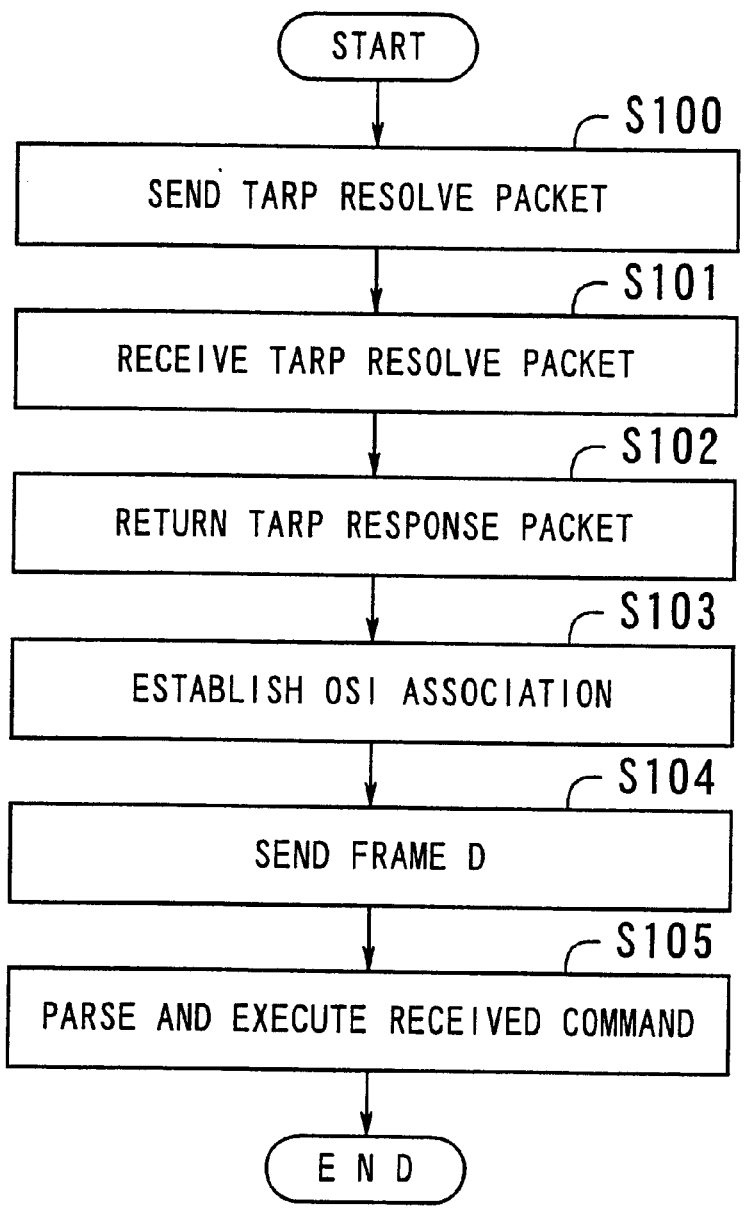
FIG. 38 is a flowchart which shows how frame D are sent from GNE to NE.

FIG. 38 is a flowchart which shows how a frame D is sent from the GNE 60 to the NE 70. In the following sequence, the step S103 (i.e., set-up of OSI association A2) is executed actually by the second connection setting unit 51 in the GNE 60.

(S100) The received command has a TID value "NE#4." Comparing this value with its own TID, the GNE 60 understands that the command is destined for some other network element. Seeking the NSAP address associated with this TID, the GNE 60 broadcasts a TARP resolve packet over the OSI network 87, in accordance with the OSI protocol specifications.

(S101) Receiving the TARP resolve packet, the NE 70 understands that the GNE 60 is seeking the NSAP address associated with NE#4.

(S102) The NE 70 sends back to the GNE 60 a TARP response packet containing the NSAP address "NSAP042" of the NE 70 itself.

(S103) With the obtained NSAP address "NSAP042," the GNE 60 sets up an OSI association A2 reaching the NE 70, according to the OSI protocols.

(S104) The GNE 60 produces a frame D by inserting an ACT-USER command with the TID "NE#4" into its OSI data field 741. It then transmits this frame D to the NE 70 through the established OSI association A2.

(S105) Upon receipt of the frame D, the NE 70 parses the command line extracted from its OSI data field 741, according to the OSI protocol specifications. Recognizing it as an ACT-USER command, the NE 70 initiates a log-in session.

When the log-in session is finished, the NE 70 returns a response message to notify the NMS 10 of the completion. More specifically, the NE 70 produces a frame E containing a response message and passes it to the GNE 60. The GNE 60 then creates and sends a frame F to the GNE 50-2, which subsequently causes the GNE 50-2 to assemble and send a frame G to the GNE 50-1. Finally, the GNE 50-1 produces and sends a frame H to the NMS 10. In this way, the response message is reloaded into different frames by a plurality of GNEs, while being relayed over the pre-established TCP/IP connections and OSI associations.

The next section will present another version of the communications system 1b. Recall that the above-described system 1b established the following four connections to relay the frames:

TCP/IP connection C0 between NMS 10 and GNE 50-1,

OSI association A1 between GNE 50-1 and GNE 50-2,

TCP/IP connection C1 between GNE 50-2 and GNE 60, and

OSI association A2 between GNE 60 and NE 70.

In contrast to this, the modified communication system 1c establishes only two connections to do the same. They are:

TCP/IP connection C0 between NMS 10 and GNE 50-1, and

Direct connection between GNE 50-1 and NE 70.

Figure 39:
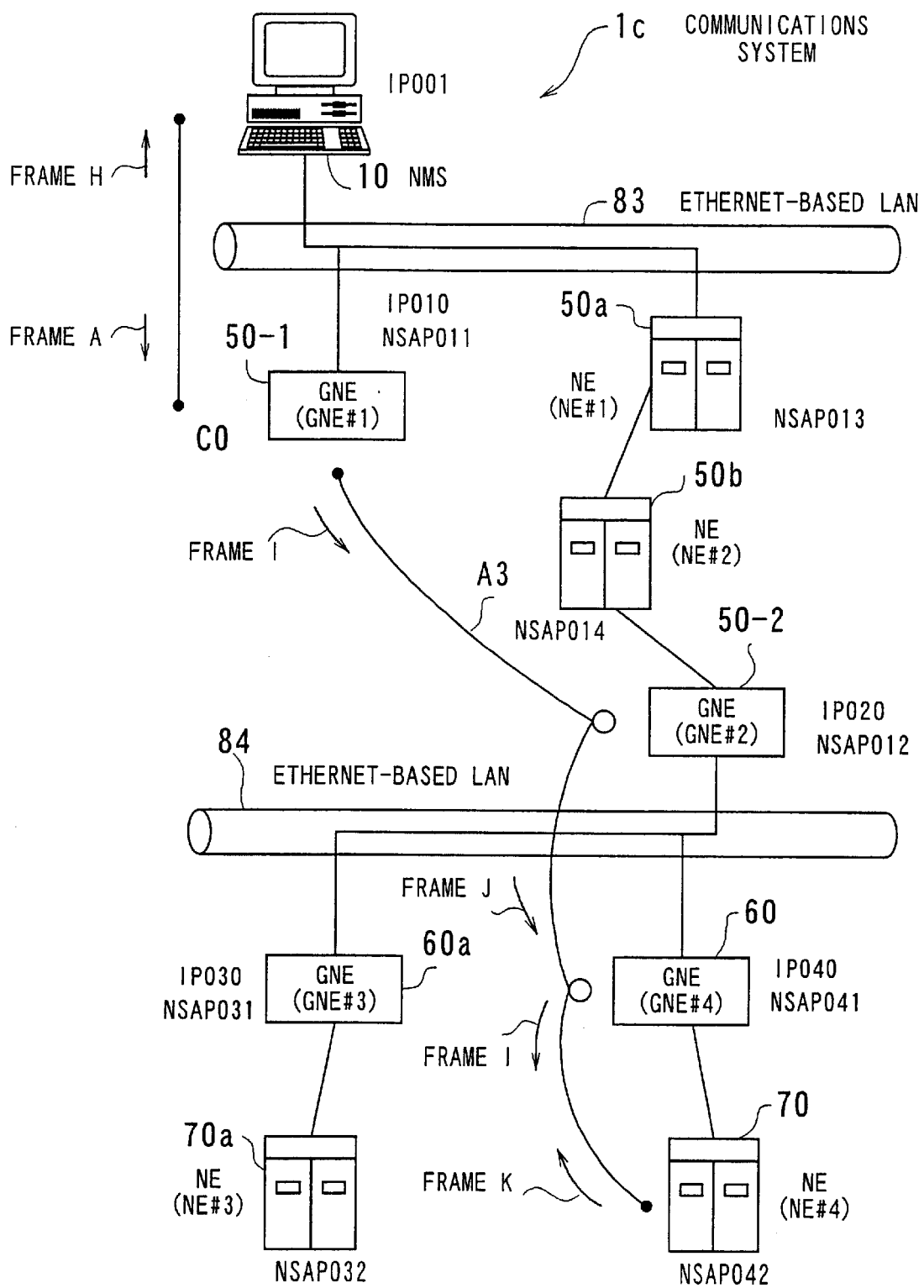
FIG. 39 is a diagram showing a situation where one TCP/IP connection and one OSI association have been established in a modified communications system.

FIG. 39 shows a situation where the above-noted TCP/IP connection and OSI association have been established in the modified communications system 1c. Here, the system 1c has set up a TCP/IP connection C0 between the NMS 10 and GNE 50-1 and an OSI association between the GNE 50-1 and NE 70.

FIG. 29 also shows various frames flowing over the above connections. More specifically, "Frame A" denotes a downstream frame to be sent from the NMS 10 to the GNE 50-1. "Frame I" denotes a downstream frame to be sent from the GNE 50-1 or GNE 60 toward the NE 70. "Frame J" denotes a downstream frame to be sent from the GNE 50-2 to the GNE 60. "Frame K" denotes an upstream frame to be sent from the NE 70 to the GNE 50-1. "Frame H" denotes an upstream frame to be sent from the GNE 50-1 to the NMS 10.

Figure 41:
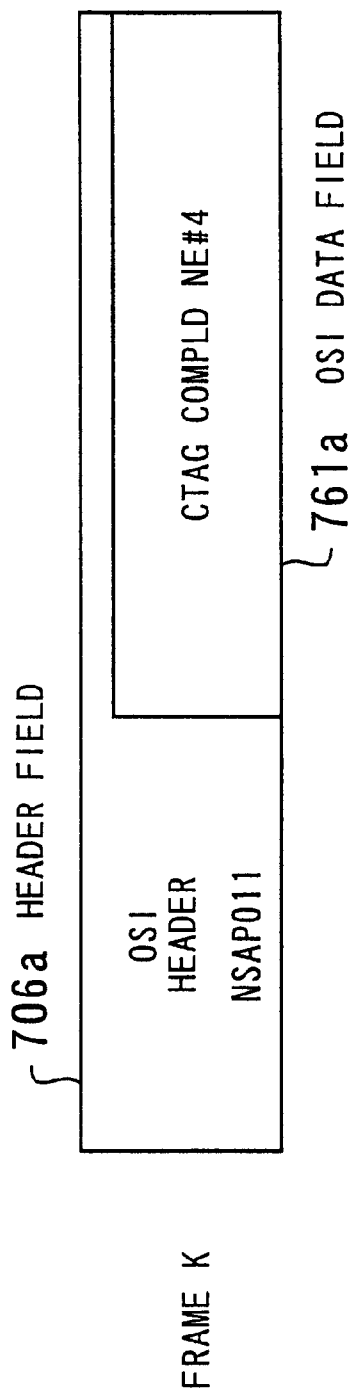
FIG. 41 is a diagram which shows the structure of a frame K.

Referring next to FIGS. 40(A), 40(B), and 41, the structures of frames I, J, and K will be explained in detail below. (See earlier part of the specification for details of other frames A and H)

FIGS. 40(A) and 40(B) show the structures of frames I and J, respectively. Referring first to FIG. 40(A), the frame I has a header field 705 and an OSI data field 751. The header field 705 carries an OSI header containing an address "NSAP042." This address value indicates that the frame I is directed the NE 70. The OSI data field 751 carries an ACT-USER command addressed to the NE 70. More specifically, the command line reads as follows:

ACT-USER:NE#4:ROOT:CTAG:ROOT;

Referring to 40(B), the frame J has a header field 706 and a TCP/IP data field 761. The header field 706 carries a TCP/IP header containing an address IP address "IP040," which indicates that the frame is destined for the GNE 60. The TCP/IP data field 761 is loaded with the frame I as a whole.

FIG. 41 shows the structure of frame K. The frame K consists of a header field 706a and an OSI data field 761a. The header field 706a carries an OSI header containing an address "NSAP011," which indicates that the frame is directed to the GNE 50-1. The OSI data field 761*a* carries a C0MPLD response message addressed to the GNE 50-1, which reads as follows:

CTAG C0MPLD NE#4.

Figure 42A:
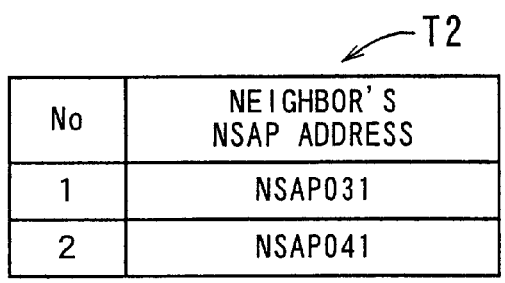
FIGS. 42(A) and 42(B) are diagrams which show databases.
Figure 42B:
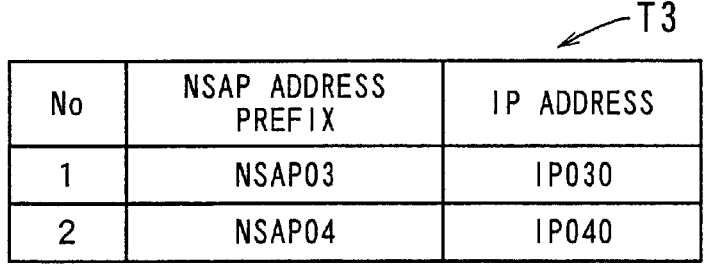

FIG. 42 shows databases T2 and T3 being employed in the GNE 50-2 to store the configuration data of the communications system 1*c*. The database T2 has a data field entitled "Neighbor's NSAP Address." In the present context, this field stores the NSAP addresses of the GNEs 60*a* and 60 which are adjacent to the GNE 50-2. The database T3, on the other hand, has the following data fields: "NSAP Address Prefix" and "IP Address." The first entry, for example, shows a combination of NSAP address prefix "NSAP03" and IP address "IP030," which are parameters of the GNE 60*a*. The next entry indicates another combination of NSAP address prefix "NSAP04" and IP address "IP040," which are parameters of the GNE 60.

Figure 43:
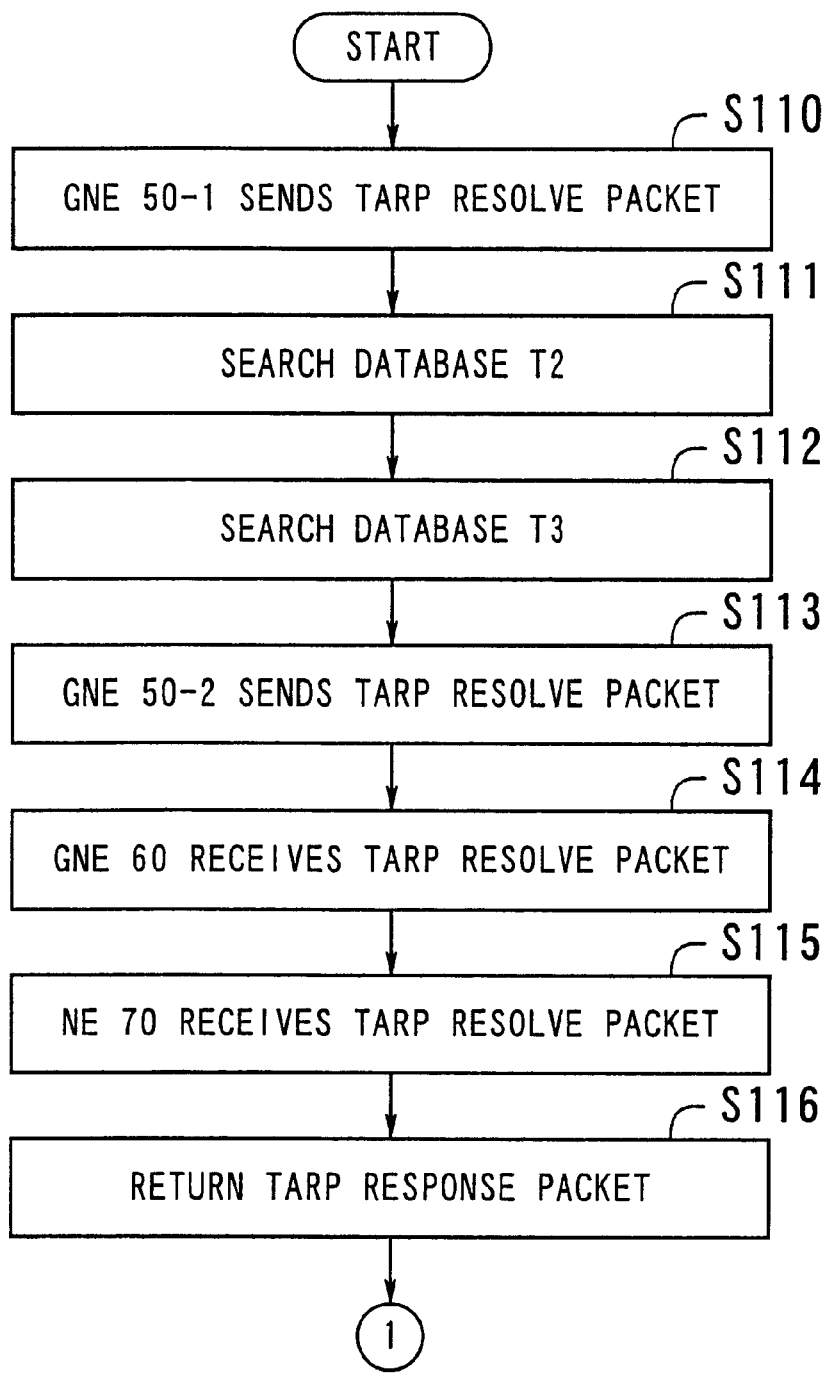
FIGS. 43 and 44 show a flowchart describing how frames I and J are sent from GNE to NE.
Figure 44:
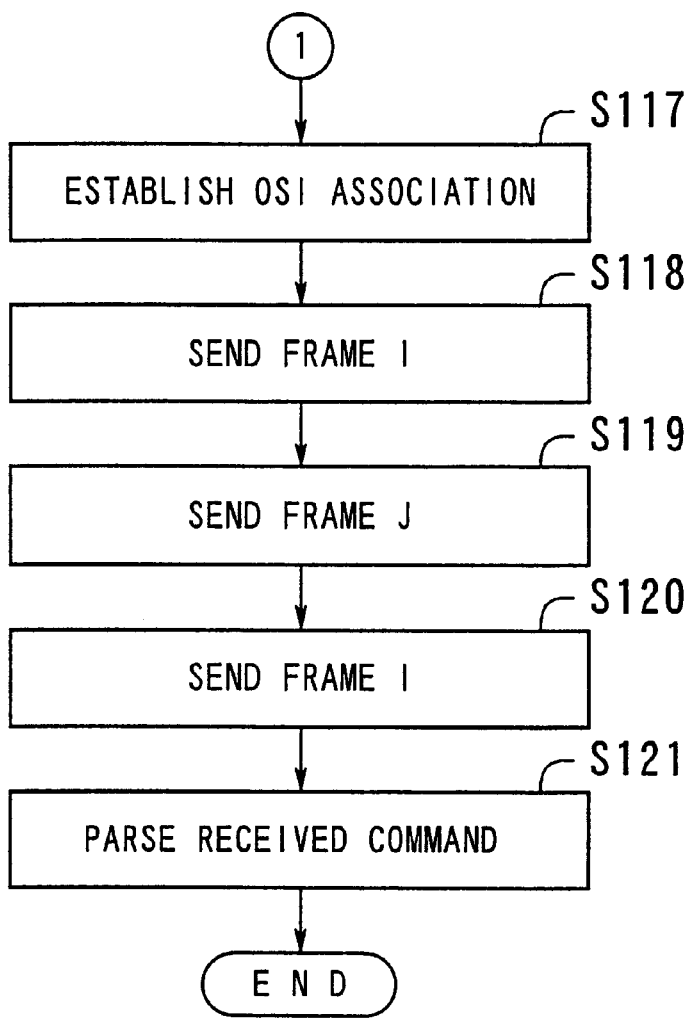

FIGS. 43 and 44 show a flowchart describing how the GNE 50-1 delivers a specific frame to the NE 70. It is assumed here that the NMS 10 has transmitted a frame A to the GNE 50-1. This process, however, will not be explained here, because it is similar to what has been described earlier in FIG. 35.

(S110) The GNE 50-1 receives the frame A with a TID value "NE#4." Comparing this value with its own TID, the GNE 50-1 understands that the command is destined for some other network element. Seeking the NSAP address associated with this TID, the GNE 50-1 broadcasts a TARP resolve packet over the OSI network 85, in accordance with the OSI protocol specifications.

(S111) The GNE 50-2 receives the TARP resolve command packet. It then searches its local database T2 to obtain the NSAP address "NSAP041" of the GNE 60.

(S112) The GNE 50-2 searches another local database T3 by using "NSAP041" as the keyword. This search yields the IP address "IP040" assigned to the GNE 60.

(S113) The GNE 50-2 redirects the TARP resolve packet to the obtained IP address "IP040," i.e., to the GNE 60.

(S114) Receiving the TARP resolve packet from the GNE 50-2, the GNE 60 broadcasts it over the OSI network 87.

(S115) Receiving the TARP resolve packet, the NE 70 understands that the GNE 50-1 is seeking the NSAP address of the NE 70 itself.

(S116) The NE 70 transmits to the GNE 50-1 a TARP response packet containing its own NSAP address "NSAP042."

(S117) With obtained NSAP address "NSAP042," the GNE 50-1 sets up an OSI association A3 reaching the NE 70, according to the OSI protocol.

(S118) The GNE 50-1 produces a frame I by inserting an ACT-USER command with a TID "NE#4" into its OSI data field 751. The GNE 50-1 then sends it out through the OSI association A3.

(Sl19) Upon receipt of the frame I, the GNE 50-2 produces a frame J by inserting the received frame I into the TCP/IP data field 761. The GNE 20 then sends out this frame J to the GNE 60.

(S120) When the frame J arrives, the GNE 60 extracts the frame I from the received frame J and sends it to the NE 70.

(S121) Upon receipt of the frame I, the NE 70 extracts and parses its command line according to the OSI protocol specifications. Recognizing it as an ACT-USER command, the NE 70 initiates a log-in session.

When the log-in session is finished, the NE 70 returns a response message to notify the NMS 10 of the command completion. More specifically, the NE 70 produces a frame K containing a response message and sends it to the GNE 50-1 through the OSI association A3. The GNE 50-1 then produces a frame H and sends it to the NMS 10.

Figure 45:
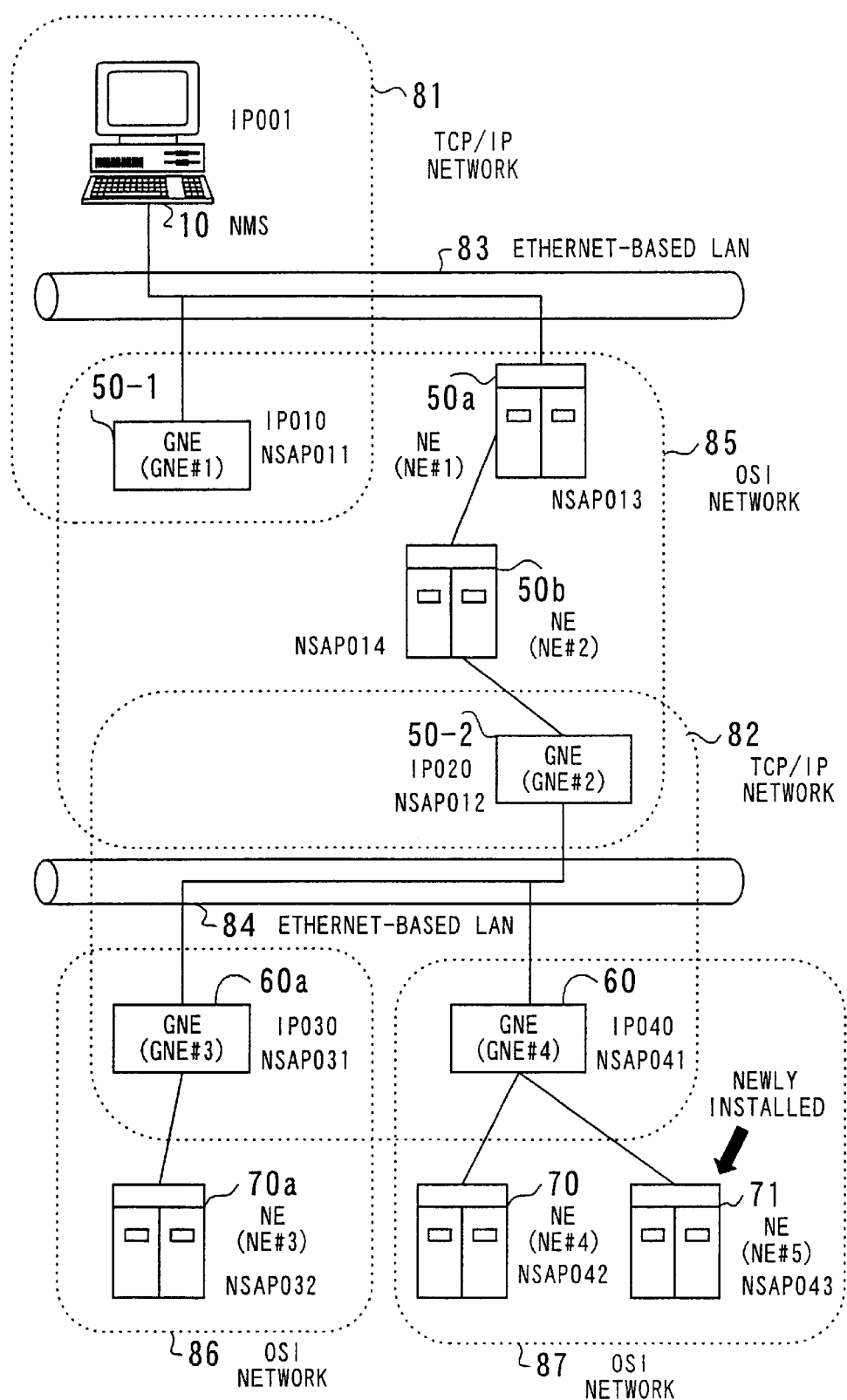
FIG. 45 is a diagram showing a situation where one NE has been newly added to the system.

The next section will now describe how the GNEs update their databases. FIG. 45 shows a situation where one NE 71 has been newly added to the above-described communication system 1*b*. More specifically, this new NE 71 is assigned a TID "NE#5" and NSAP address "NSAP043" and connected to the GNE 60 as a node on the OSI network 87. The other elements of the system are the same as those shown in FIG. 28.

Figure 46:
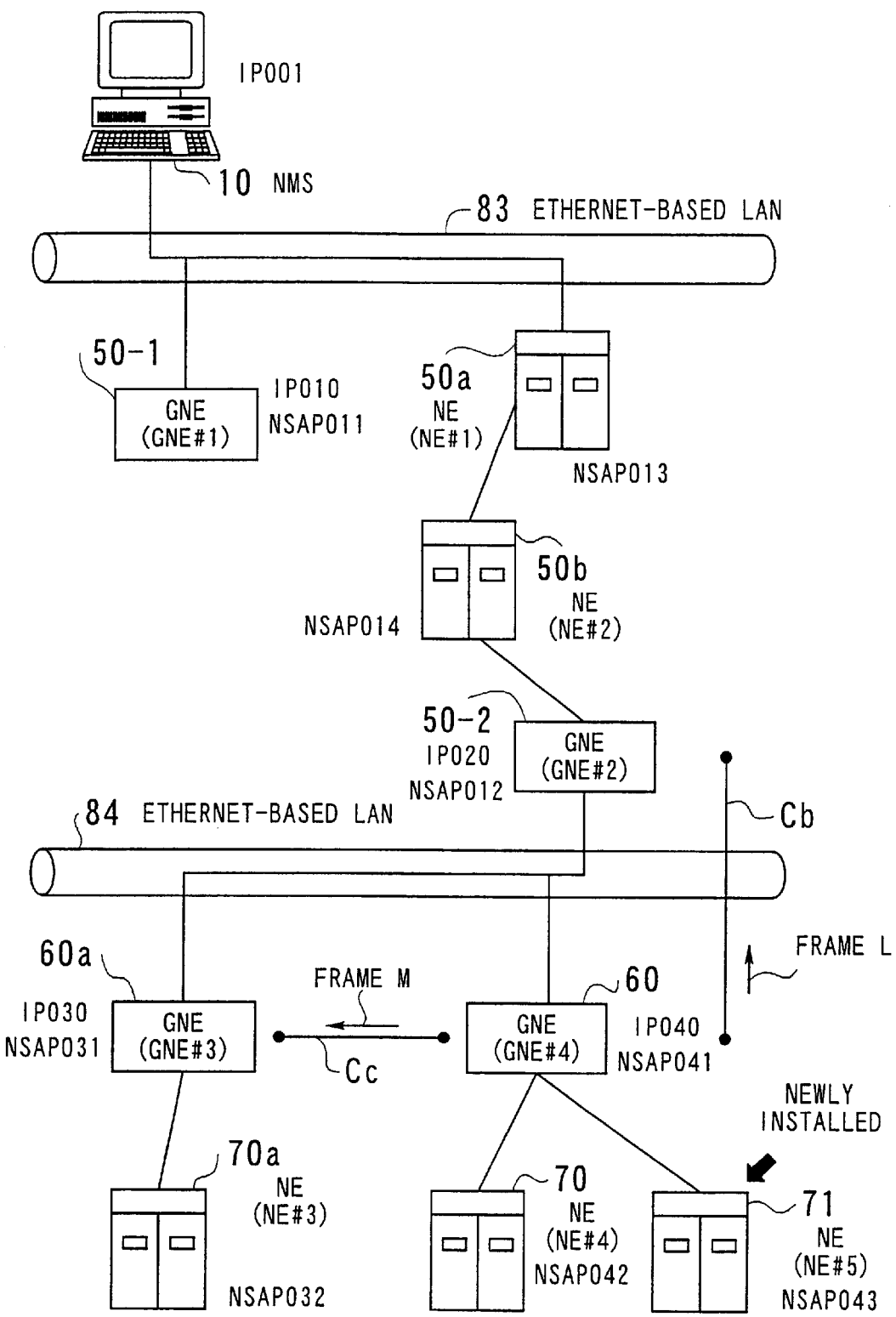
FIG. 46 is a diagram which shows a situation where several TCP/IP connections have been established.

FIG. 46 shows a situation where two TCP/IP connections have been established in the system of FIG. 45. Those TCP/IP connections are intended for the use in a process of updating the databases so as to cover the newly added NE 71. The established connections include: a TCP/IP connection Cb between the GNE 60 and GNE 50-2, and a TCP/IP connection Cc between the GNE 60 and GNE 60*a*. In FIG. 46, "Frame L" denotes a frame to be sent from the GNE 60 to the GNE 50-2, while "Frame M" denotes a frame to be sent from the GNE 60 to the GNE 60*a*.

Figure 47:
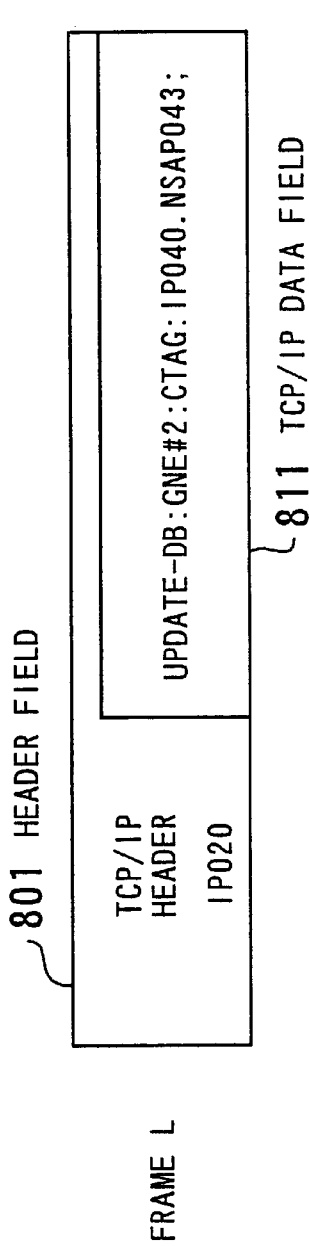
FIG. 47(A) is a diagram which shows the structure of a frame L.
FIG. 47(B) is a diagram which shows the structure of a frame M.
Figure 47:
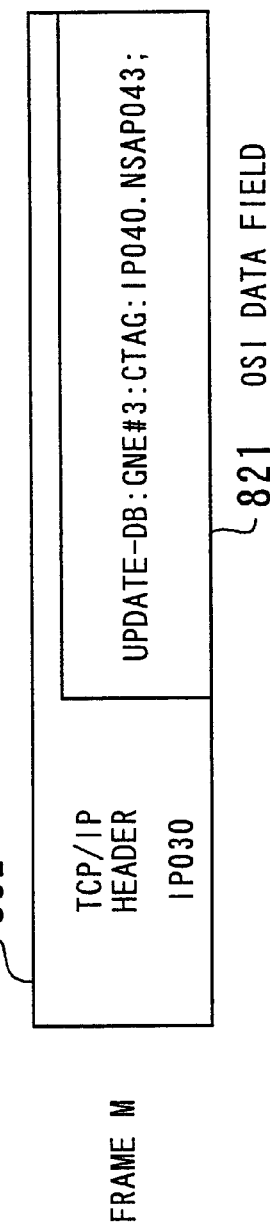
Figure 48:
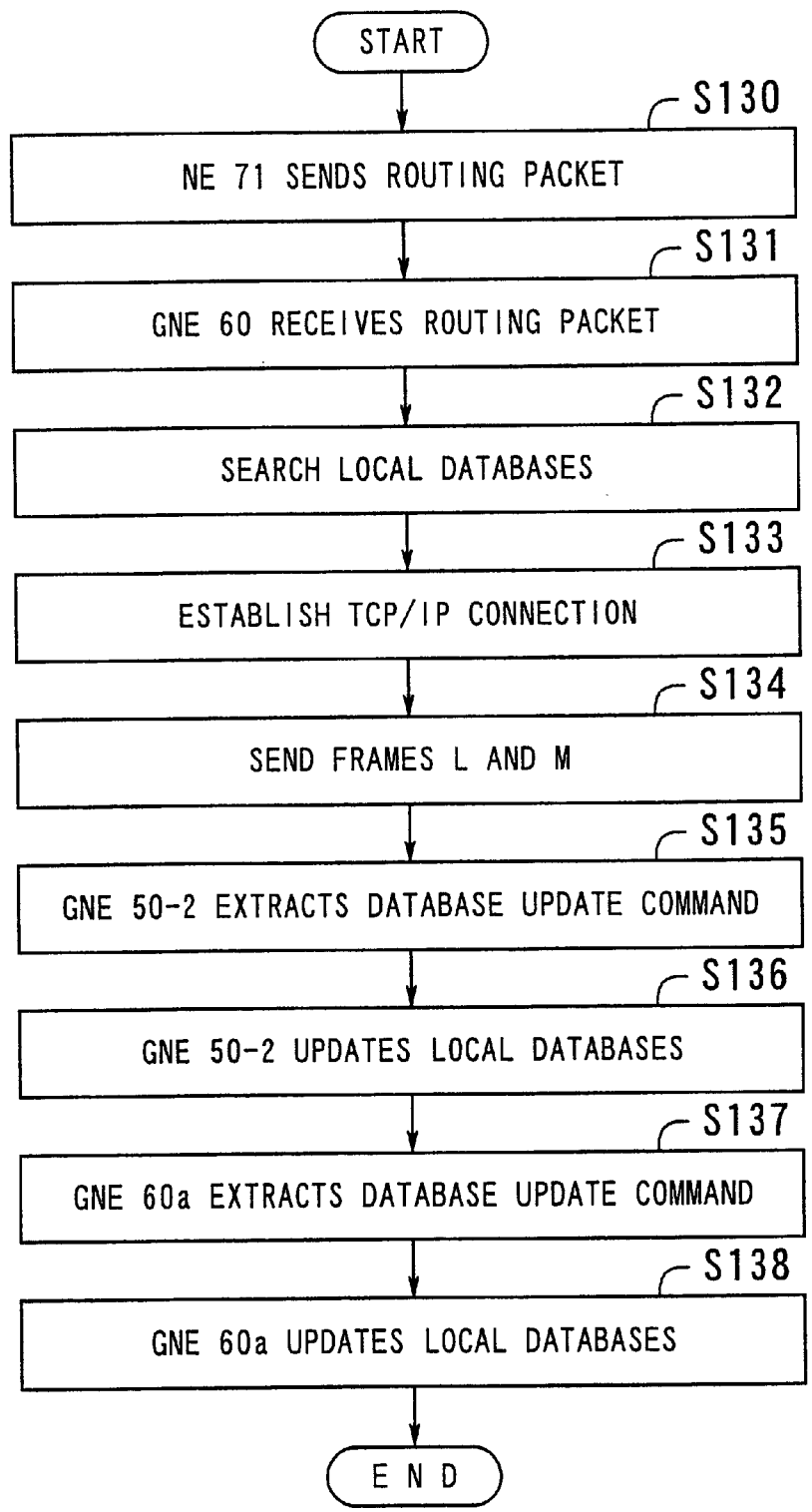
FIG. 48 is a flowchart which shows a process to update a database automatically.

Referring now to FIGS. 47(A) and 47(B), the detailed structures of frames L and M will be described below. FIGS. 47(A) and 47(B) show the structures of frames L and M, respectively. Referring first to FIG. 47(A), the frame L consists of a header field 801 and a TCP/IP data field 811. The header field 801 carries a TCP/IP header containing an address IP address "IP020," which indicates that the frame is directed to the GNE 50-2. The TCP/IP data field 811*a* conveys an UPDATE-DB command which requests the recipient (i.e., GNE 50-2) to update its database. More specifically, this command line reads as follows:

UPDATE-DB:GNE#2:CTAG:IP040.NSAP043;

Referring to FIG. 47(B), the frame M consists of a header field 802 and a TCP/IP data field 821. The header field 802 carries a TCP/IP header containing an IP address "IP030," indicating that the frame is addressed to the GNE 60*a*. The TCP/IP data field 821 conveys an UPDATE-DB command which requests the recipient (i.e., GNE 60*a*) to update its database. More specifically, this command line reads as follows:

UPDATE-DB:GNE#3:CTAG:IP040.NSAP043;

FIG. 48 is a flowchart describing how the recipients of an UPDATE-DB command update their databases. The following explanation assumes that a new NE 71 is added to the OSI network 87 (physically, connected to the GNE 60) as previously noted.

(S130) According to the OSI protocols, the NE 71 sends a routing packet which indicates that it has become a new member of the OSI network 87.

(S131) The GNE 60 receives the routing packet. Comparing the contents of the packet with the records in its local database, the GNE 60 understands that some change has occurred in the network configuration.

(S132) The GNE 60 then obtains the GNE 50-2's IP address "IP020" and the GNE 60*a*'s IP address "IP030," consulting its local database.

(S133) Using the obtained IP addresses (IP020 and IP030), the GNE 60 sets up two TCP/IP connections reaching the GNEs 50-2 and 60*a*.

(S134) The GNE 60 produces frames L and M containing a database update command in their TCP/IP data field. The database update command in the frame L has a TID "GNE#2," while that in the frame M has a TID "GNE#3." The GNE 60 transmits those frames L and M to the GNE 50-2 and 60a, respectively, through the TCP/IP connections.

(S135) The GNE 50-2 receives the frame L, and extracts the database update command from its TCP/IP data field according to the TCP/IP protocol specifications.

(S136) The GNE 50-2 extracts the TID "GNE#2" from the received database update command. Recognizing that the command is directed to itself, the GNE 50-2 updates its local databases, parsing the command line. (S137) The GNE 60a receives the frame M, and extracts the database update command from its TCP/IP data field according to the TCP/IP protocol specifications.

(S138) The GNE 60a extracts the TID "GNE#3" from the received database update command. Recognizing that the command is directed to itself, the GNE 60a updates its local databases, parsing the command line.

Figure 49:
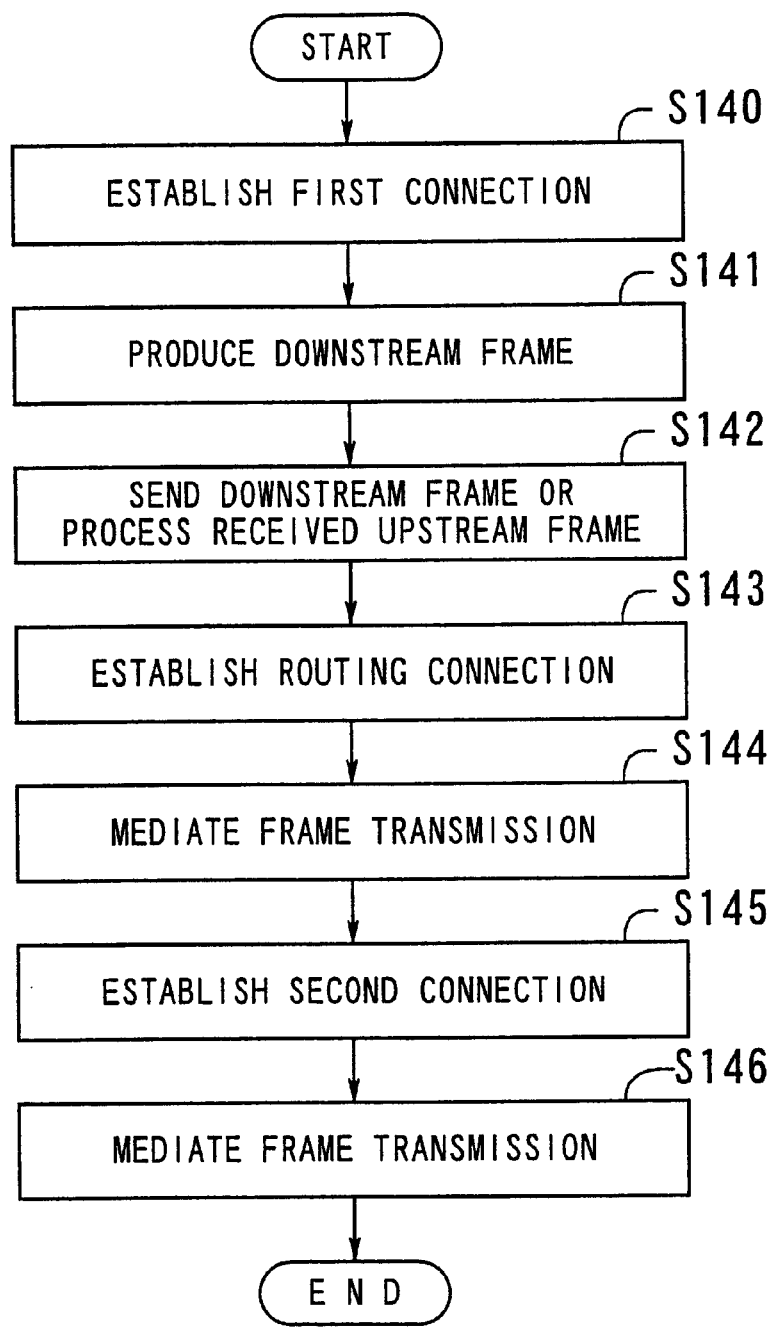
FIG. 49 is a flowchart which shows another internetworking method according to the present invention.

The above section has discussed the internetworking system using routing connections. The following section will now present an internetworking method according to the present invention, with reference to the flowchart of FIG. 49. The explanation assumes the communications system 1b described earlier in FIG. 29.

(S140) The NMS 10 sets up a first connection (TCP/IP connection C0) reaching the GNE 50-1.

(S141) The NMS 10 produces a downstream frame containing the identifier of the NE 70 of interest.

(S142) The NMS 10 sends out the downstream frame through the connection C0. The NMS 10 also handles upstream frames received through the connection C0, if any.

(S143) With its routing control functions, the GNE 50-1 sets up a routing connection (OSI association A1) reaching the GNE 50-2.

(S144) The GNE 50-1 mediates the transport of downstream and upstream frames through the routing connection.

(S145) The GNE 60 sets up a second connection (OSI association A2) reaching the NE 70.

(S146) The GNE 60 mediates the transport of downstream and upstream frames through the second connection.

The above-described invention provides an internetworking system 100 and internetworking method which use GNEs deployed on the network to render mediation services. Each GNE employs its local databases for storing records about neighboring nodes, which allows the GNE itself to provide routing services (selection of routing paths) according to a given destination address. This feature enables more efficient internetworking in multiprotocol environments. Further, the databases are automatically updated when any changes occur in the network configuration, which improves the system's flexibility and simplifies the user tasks of network monitoring and maintenance.

All the above discussion will now be summarized below. According to the present invention, the internetworking system comprises a network management station and a mediation device. For transport of frames, they establish a first connection between them in a point-to-point fashion, as well as a second connection between the mediation device and the intended network elements in a point-to-multipoint fashion. This feature of the invention enables heterogeneous networks to efficiently communicate with each other, mediating between different protocols.

Also, the proposed internetworking method establishes a first connection in a point-to-point fashion and a second connection in a point-to-multipoint fashion to transport frames. This enables heterogeneous networks to efficiently communicate with each other, mediating between different protocols.

Further, the present invention proposes another internetworking system. This system establishes a first connection between a network management station and a second mediation device in a point-to-point fashion, and then a routing connection from the second mediation device to a first mediation device. It further establishes a second connection from the first mediation device to an intended network element(s) in a point-to-multipoint or point-to-multipoint fashion. Frames are transported over those connections. This enables heterogeneous networks to efficiently communicate with each other, mediating between different protocols.

Further, according to another proposed internetworking method, a first connection (point-to-point), a routing connection, and a second connection (point-to-point or point-to-multipoint) are established to transport frames. This enables heterogeneous networks to efficiently communicate with each other, mediating between different protocols.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An internetworking system for interconnecting first and second networks that use different protocols, comprising:
   (a) a network management station on the first network, comprising:
      first connection setting means for establishing a point-to-point connection over the first network,
      downstream frame producing means for producing a downstream frame containing identifiers of a plurality of network elements on the second network that said network management station intends to interact with, and
      frame communication means for sending out the downstream frame through the point-to-point connection; and
   (b) a mediation device disposed between the first and second networks, comprising:
      second connection setting means for establishing a point-to-multipoint connection over the second network to reach the plurality of network elements, in association with the point-to-point connection over the first network, and
      frame mediation means for receiving the downstream frame through the point-to-point connection and forwarding the received downstream frame to the plurality of network elements through the point-to-multipoint connection.

2. The internetworking system according to claim 1, wherein said mediation device further comprises a connection database that records the identifiers of the plurality of network elements and associated point-to-point and point-to-multipoint connections.

3. The internetworking system according to claim 2, wherein said frame mediation means converts between different protocols used in the first and second networks, based on said connection database, thereby mediating between the first and second networks.

4. A network management station disposed on a first network to manage a plurality of network elements on a second network whose protocol is different from the first network's protocol, the first and second network being interconnected by a mediation device, the network management station comprising:

connection setting means for establishing a point-to-point connection to the mediation device over the first network, as well as causing the mediation device to establish a point-to-multipoint connection reaching the plurality of network elements in association with the point-to-point connection;

downstream frame producing means for producing a downstream frame containing identifiers of the plurality of network elements that the network management station intends to interact with; and frame communication means for sending out the downstream frame through the point-to-point connection, thereby causing the mediation device to relay the downstream frame to the plurality of network elements through the point-to-multipoint connection.

5. A mediation device which mediates between first and second networks that use different protocols, the mediation device comprising:

connection setting means for establishing a point-to-multipoint connection to reach a plurality of network elements on the second network, in association with a point-to-point connection that a network management station on the first network establishes to reach the mediation device; and frame mediation means for relaying a downstream frame from the network management station on the first network to the plurality of network elements on the second network through the point-to-multipoint connections, the downstream frame containing identifiers of the plurality of network elements on the second network.

6. An internetworking method for interconnecting first and second networks that use different protocols, comprising the steps of:

(a) at a network management station on the first network, establishing a point-to-point connection to a mediation device disposed between the first and second networks;

(b) at the network management station, producing a downstream frame containing identifiers of a plurality of network elements on the second network whose communication protocol is different from that of the first network;

(c) sending out the downstream frame from the network management station through the point-to-point connection;

(d) at the mediation device, establishing a point-to-multipoint connection over the second network to reach the plurality of network element in association with the point-to-point connection; and (e) at the mediation device, receiving the downstream frame through the point-to-point connection over the first network and forwarding the received downstream frame to the network elements on the second network through the point-to-multipoint connection.

7. The internetworking method according to claim 6, further comprising the step of providing a connection database in the mediation device that records the identifiers of the plurality of network elements and associated point-to-point and point-to-multipoint connections, wherein said receiving and forwarding step (e) converts between different protocols used in the first and second networks, based on said connection database, thereby mediating between the first and second networks.

8. An internetworking system for interconnecting first and second networks that use different protocols, the first and second networks being separated by at least one intermediate network, comprising:

(a) a network management station on the first network, comprising:
first connection setting means for establishing a point-to-point connection over the first network,
downstream frame producing means for producing a downstream frame containing identifiers of a plurality of network elements on the second network that said network management station intends to interact with, and
frame communication means for sending out the downstream frame through the point-to-point connection, (b) a first mediation device disposed between the second network and the intermediate network, comprising:
second connection setting means for establishing a point-to-multipoint connection over the second network to reach the plurality of network elements, in association with the point-to-point connection over the first network, and
first frame mediation means for relaying the downstream frame to the plurality of network elements through the point-to-multipoint connection; and (c) a second mediation device disposed between the first network and intermediate network, comprising:
routing connection setting means for establishing a routing connection over the intermediate network to reach the first mediation device, by performing routing control, thereby substantially extending the point-to-point connection up to the first mediation device, and
second frame mediation means for relaying the downstream frame from the network management station to the first mediation device through the routing connection.

9. The internetworking system according to claim 8, wherein first and second mediation devices further comprise a database storing neighborhood records about neighboring network elements.

10. The internetworking system according to claim 9, wherein said database is automatically updated with a new neighborhood record, according to a change in the neighboring network elements.

11. A mediation device for use in an internetworking system having first and second networks separated by an intermediate network, the mediation device being disposed between the first network and intermediate network, a point-to-point connection being established over the first network, a point-to-multipoint connection established over the second network, the mediation device comprising:

routing connection setting means for establishing a routing connection over the intermediate network in association with the point-to-point connection by performing routing control, thereby substantially extending the point-to-point connection up to another mediation device that is disposed between the intermediate network and second network; and frame mediation means for relaying a downstream frame from a network management station on the first network to said another mediation device through the established routing connection, the downstream frame containing identifiers of a plurality of network elements on the second network that the network management station intends to interact with;

whereby the downstream frame from the network management station on the first network is delivered to the plurality of network elements on the second network through the point-to-point connection, routing connection, and point-to-multipoint connection.

12. A mediation device for use in an internetworking system having first and second networks separated by an intermediate network, the mediation device being disposed between the intermediate network and second network, a point-to-point connection being established over the first network, a routing connection being established over the intermediate network, the mediation device comprising:

connection setting means for establishing a point-to-multipoint connection over the second network in association with the routing connection over the intermediate network, to reach a plurality of network elements on the second network; and frame mediation means for relaying a downstream frame from a network management station on the first network to the plurality of network elements through the established the point-to-multipoint connection, the downstream frame containing identifiers of the plurality of network elements on the second network that the network management station intends to interact with;

whereby the downstream frame from the network management station on the first network management station on the first network is delivered to the plurality of network elements on the second network through the point-to-point connection, routing connection, and point-to-multipoint connection.

13. An internetworking method for interconnecting first and second networks that use different protocols, the first and second network being separated by at least one intermediate network, the method comprising the steps of:

(a) at a network management station on the first network, establishing a point-to-point connection to a second mediation device disposed between the first network and intermediate network;

(b) at the network management station, producing a downstream frame containing identifiers of a plurality of network elements on the second network;

(c) sending out the downstream frame from the network management station through the point-to-point connection;

(d) at the second mediation device, establishing a routing connection over the intermediate network by performing routing control, thereby extending the point-to-point connection up to a first mediation device that is disposed between the intermediate network and second network;

(e) at the second mediation device, relaying the downstream frame from the network management station to the first mediation device through the routing connection;

(f) at the first mediation device, establishing point-to-multipoint connection to reach the network elements; and (g) at the first mediation device, relaying the downstream frame from the second mediation device to the plurality of network elements through the point-to-multipoint connection.

* * * * *